United States Patent [19]
Azadegan et al.

[11] Patent Number: 5,612,900
[45] Date of Patent: Mar. 18, 1997

[54] VIDEO ENCODING METHOD AND SYSTEM WHICH ENCODES USING A RATE-QUANTIZER MODEL

[75] Inventors: Faramarz Azadegan, Waltham, Mass.; Hiroaki Unno, Ichikawa, Japan; Hideki Mimura, Yokohama, Japan; Tetsuya Kitamura, Komea, Japan

[73] Assignee: Kabushiki Kaisha Toshiba, Kawasaki, Japan

[21] Appl. No.: 522,495

[22] Filed: Aug. 31, 1995

Related U.S. Application Data

[63] Continuation of Ser. No. 473,783, Jun. 6, 1995, which is a continuation-in-part of Ser. No. 438,014, May 8, 1995, abandoned.

[51] Int. Cl.⁶ .................................................. G06F 17/00
[52] U.S. Cl. .................................................. 364/514 R
[58] Field of Search .......................... 364/514 R, 514 A, 364/715.02, 725; 348/390, 395, 396, 394, 404, 409, 12, 13, 19, 607, 391; 395/162

[56] References Cited

U.S. PATENT DOCUMENTS

| | | |
|---|---|---|
| 4,517,596 | 5/1985 | Suzuki . |
| 5,016,010 | 5/1991 | Sugiyama . |
| 5,028,999 | 7/1991 | Vogel . |
| 5,283,646 | 2/1994 | Bruder . |
| 5,335,016 | 8/1994 | Nakagawa . |
| 5,381,275 | 1/1995 | Nitta et al. . |
| 5,400,077 | 3/1995 | Cookson et al. . |
| 5,488,570 | 1/1996 | Agarwal ........................ 364/514 R |
| 5,535,138 | 7/1996 | Keith ............................ 364/514 R |

FOREIGN PATENT DOCUMENTS

| | | |
|---|---|---|
| 6-326435 | 12/1994 | Japan . |
| 7-81298 | 4/1995 | Japan . |
| 7-85693 | 4/1995 | Japan . |

OTHER PUBLICATIONS

Visual Communication And Image Processing '91: Visual Communication, Kou–Hu Tzou, Toshio Koga, Chairs/Editors, 11–13 Nov. 1991 Boston, Massachusetts, SPIE Volum 1605, Part One of Two Parts.

Motion–Compensated Video Coding With Adaptive Perceptual Quantization –Atul Puri and R. Aravind, IEEE Transactions on Circuits and Systems for Video Technology, vol. 1, No. 4, Dec. 1991.

JPEG++: Selective Compression For High Quality Color Desktop Publishing –Adriaan Ligtenberg, Storm Technology, Inc.—IEEE Compcon 1991 Spring.

The Art Of Video Encoding—Optimizing MPEG Video Compression Through Human–Assist Methods, Mauro Bonomi, Minerva Systems, Inc., Santa Clara, CA.

(List continued on next page.)

*Primary Examiner*—Ellis B. Ramirez
*Attorney, Agent, or Firm*—Oblon, Spivak, McClelland, Maier & Neustadt, P.C.

[57] ABSTRACT

A system and method for determining quantization level versus bit-rate characteristics of raw video signals in video frames during a pre-encoding phase for video technologies such as MPEG and MPEG-2. During a pre-encoding phase, various quantization levels are assigned to various parts of a frame, and the frame is then pre-encoded to determine a bit-rate for each quantization level used in the pre-encoding phase. Depending on the embodiment, quantization levels are assigned in one of many ways: checkerboard style, block style or any other distribution that avoids statistical anomalies. The method and system repeat the pre-encoding for plural frames, recording all quantization level versus bit-rate statistics on a frame by frame basis. These statistics are then used during encoding or re-encoding of a digital video to control the number of bits allocated to one segment of the digital video as compared to another segment, based on a target quality and target storage size for each segment. The resulting encoded digital video is stored on a digital storage medium, such as a compact disc.

35 Claims, 54 Drawing Sheets

OTHER PUBLICATIONS

Joint Multi–Channel Bit–Rate Control For Multiplexed MPEG Video Using Rate–Distortion Curves –D. Reininger, Kuriacose Joseph and Lee Chun An, David Sarnoff Research Center, Princeton, NJ 08513–5300.

Information Technology—Generic Coding Of Moving Pictures And Associated Audio Information—Part 1: Systems—Draft International Standard ISO/IEC DIS 13818–1.

Information Technology—Generic Coding Of Moving Pictures And Associated Audio Information—Part 2: Video—Draft International Standard ISO/IEC DIS 13818–2.

Information Technology—Generic Coding Of Moving Pictures And Associated Audio Information—Part 3: Audio—Draft International Standard ISO/IEC DIS 13818–3.

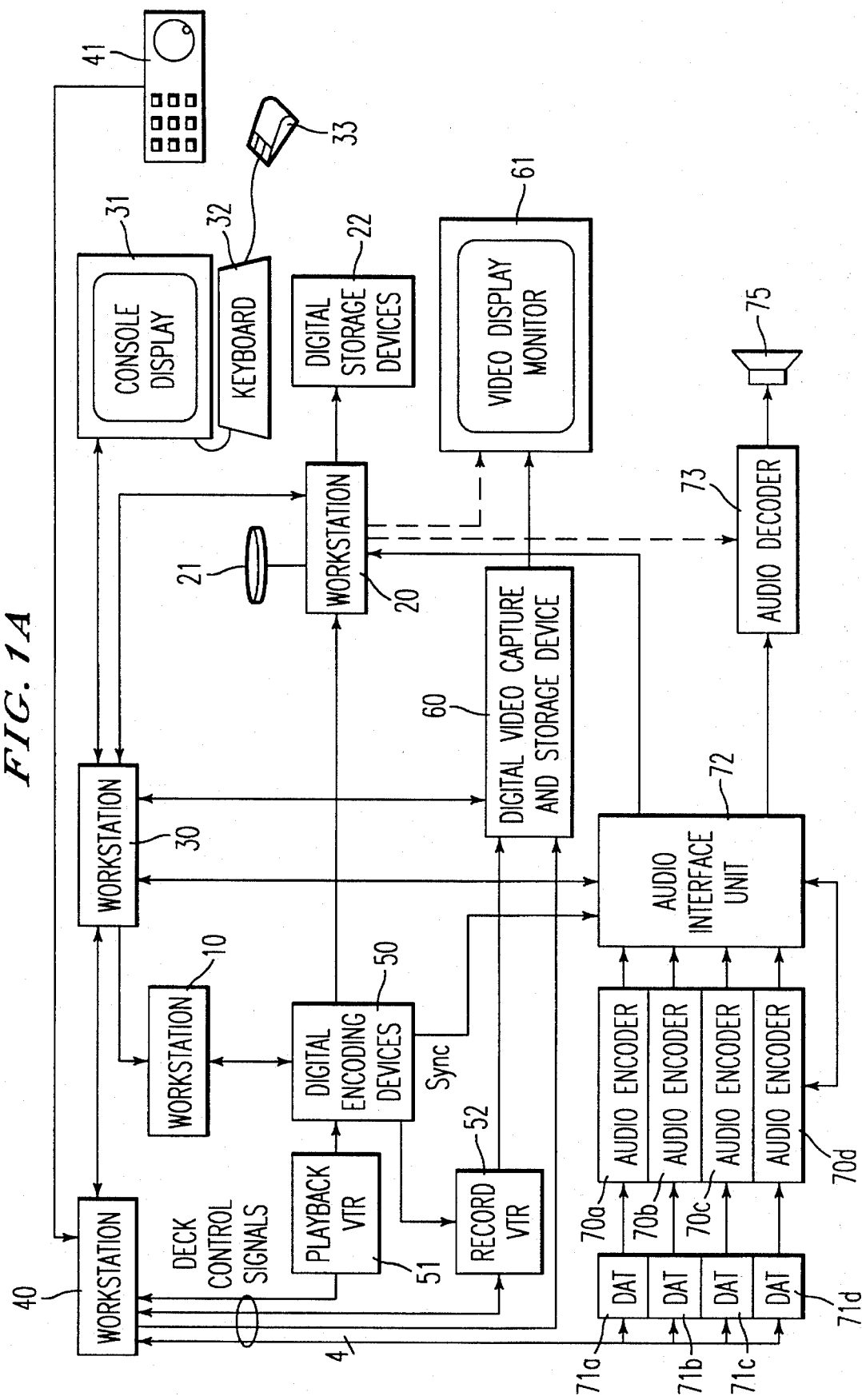

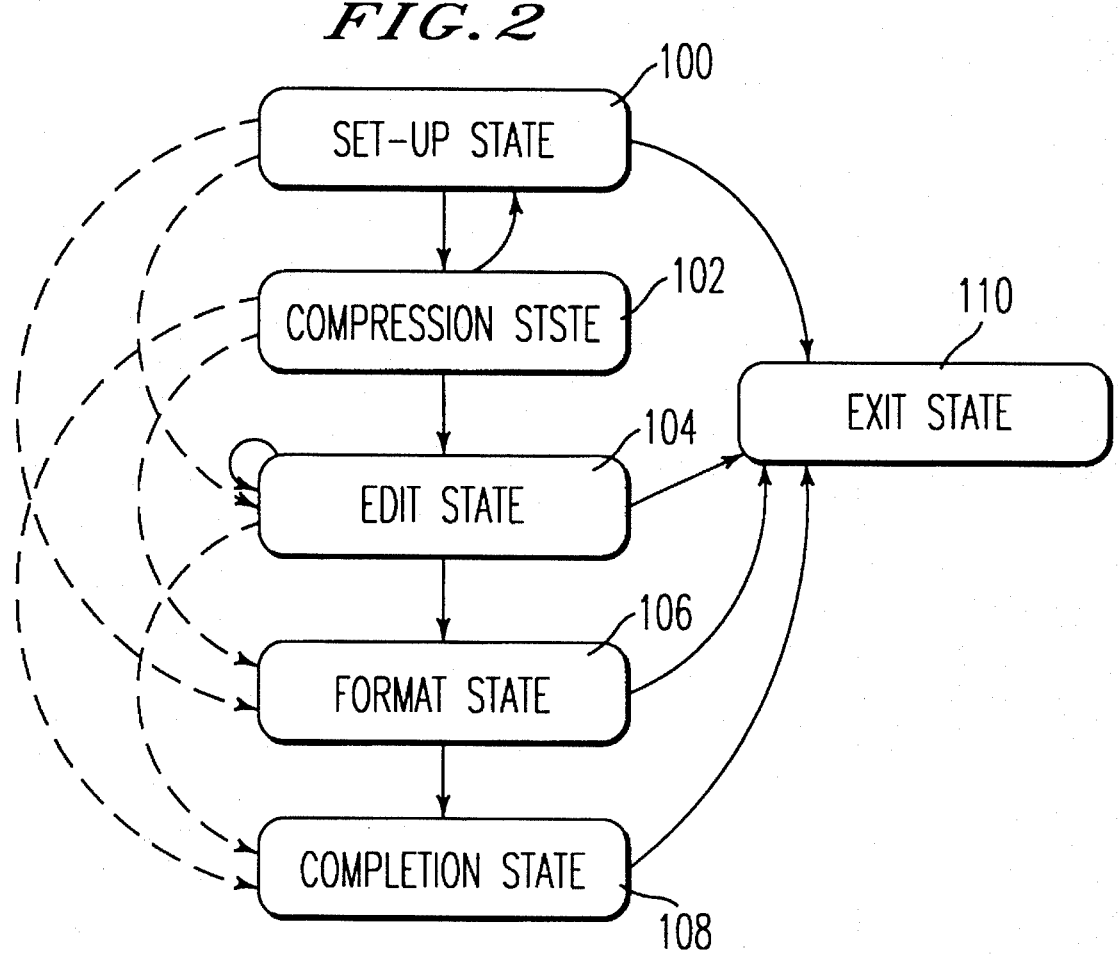

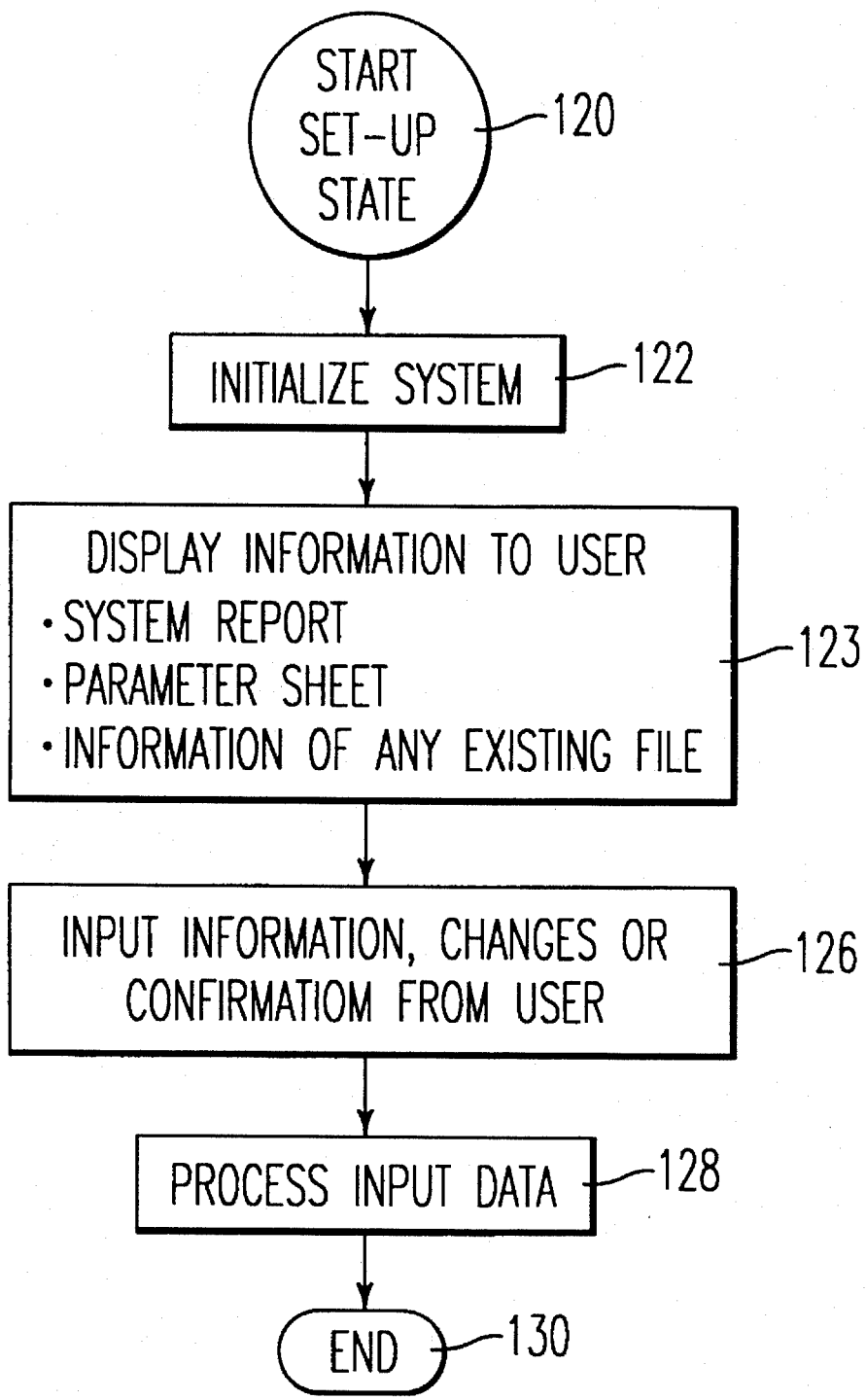

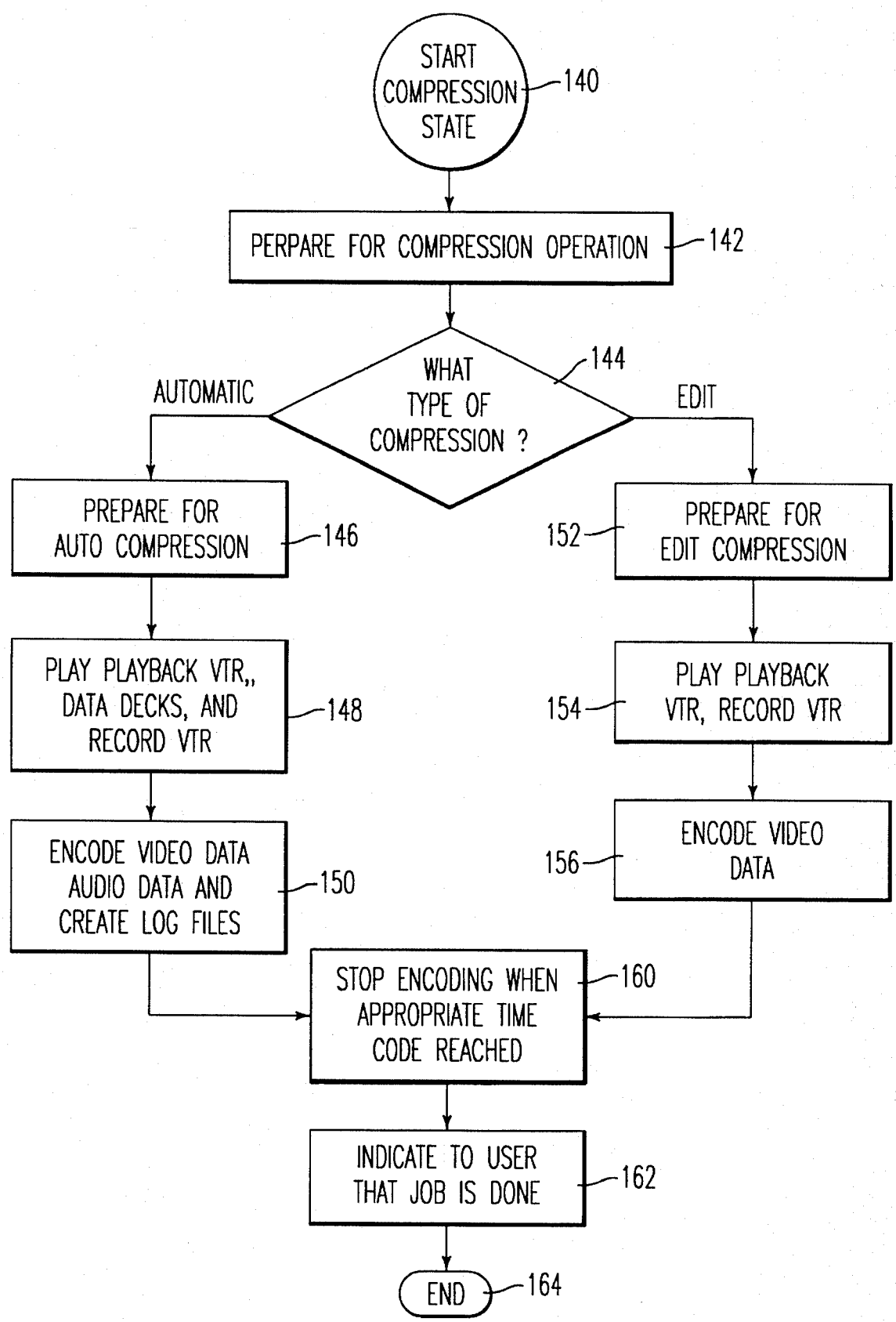

FIG. 8A

| | bits | bit fieeld | contents |
|---|---|---|---|
| version | 8 | [31..28] | parameter format version |
| begin_tc | 24 | [23..0] | begin timecode |
| | | | |
| end -tc | 24 | [31..8] | end limecode |
| ntsc_pal | 1 | [7..7] | ntsc:0, pal: 1 |
| low_delay | 1 | [6..6] | lowdelay: 1. else: 0 |
| enable_3_2 | 1 | [5..5] | nse 3 2 pull down; 1, else: 0 |
| MPEG1_2 | 1 | [4..4] | MPEG1: 0, MPEG2: 1 |
| MEmode | 2 | [3..3] | fixed: 0, adaptive: 1 |
| Mmax | 1 | [2..1] | maximum size ofm |
| cbr_vbr | | [0..0] | CBR: 0, VBR: 1 |
| | | | |
| MB_hsize | 6 | [31..26] | MB width of the picture |
| MB_vsize | 6 | [25..20] | MB height of the picture |
| initial_delay | 15 | [19..6] | initial buffer fullness |
| word_boundary2 | 5 | [5..0] | reversed for word boundry |
| | | | |
| bit_rate | 24 | [31..8] | average bit rate |
| m | 2 | [7..6] | If M is varable, M is 0. |
| n | 6 | [5..0] | IF N is varable, N is 0. |
| | | | |
| VBV_size | 24 | [31..8] | VBV buffer size in bits |
| word_boundary4 | 8 | [7..0] | reserved for boundary |
| | | | |
| number_of_coded_picture | 32 | [31..0] | number of total coded pictures |

FROM FIG.8A

| | | | |
|---|---|---|---|
| intra_q1 [64] | 8x64 | [7..0] | intra q-matrix 1 |
| intra_q2 [64] | 8x64 | [7..0] | intra q-matrix 2 |
| non_intra_q1 [64] | 8x64 | [7..0] | non-intra q-matrix 1 |
| non_intra_q2 [64] | 8x64 | [7..0] | non-intra q-matrix 2 (zigzag scan order) |
| total_bits_q2 [2] | 32x2 | [31..0] | total number of the bitstream most significant 32 bits ([0]) least significant 32 bits ([1]) |
| max_bit_rate | 24 | [31..8] | maximum bit rate for VBR mode |
| word_boundary5 | 8 | [7..0] | reserved for word boundary |
| Ki | 8 | [31..24] | rate control constant |
| Kp | 8 | [23..16] | rate control constant |
| Kb | 8 | [15..8] | rate control constant |

FROM FIG.8B

| name | bits | bit field | contents |
|---|---|---|---|
| rc_type | 8 | [7..0] | rate control type |
| Ki2 | 8 | [31..24] | rate control constant |
| Kp2 | 8 | [23..16] | rate control constant |
| Kb2 | 8 | [15..8] | rate control constant |
| rc_type2 | 8 | [7..0] | rate control type2 |
| display_hsize | 14 | [31..18] | display horizontal size |
| display_vsize | 14 | [17..4] | display vertical size |
| word_doundary75 | 4 | [3..0] | reserved for word boundary |
| run_mode | 2 | [31..30] | running mode<br>0: loop control<br>1: timecode control<br>2: timecode start and loop ctrl |
| loops | 18 | [29..12] | specified loops in loop control |
| pulldown_load_mode | 2 | [11..10] | the way to get pulldown phase<br>0: auto, 1: from log,<br>2: from data file |
| scene_change_adp-enable | 1 | [9..9] | 1 : scene change adaption on |
| sequence_header_mode | 1 | [8..8] | 1 : before every GOP header |
| pan_scan_enable | 1 | [7..7] | 1 : enable |
| MB_parameter_mode | 1 | [6..6] | 1 : full, 0 : short |
| buffer_check_enable | 2 | [5..4] | 0 : disable 1-3 : enable |

FROM FIG.8C

| | | | |
|---|---|---|---|
| frame_memory_channel | 2 | [3..2] | 0 : CH1, 1 : CH2, 2: thorugh |
| timecode_check_enable | 1 | [1..1] | 1 : enable |
| word_boundary76 | 1 | [0..0] | reserved for word boundary |
| frame_memory_file_num | 5 | [31..27] | frame memory file number |
| initial_pulldown_th | 18 | [26..9] | initial pulldown threshold |
| word_boundary77 | 9 | [8..0] | reserved for word boundary |
| scene_change_threshold | 32 | [31..0] | for scene change adaptation |
| pulldown_phase_threshold_file | 8x256 | | file name for pulldown phase |
| MB_ctrl_file | 8x256 | | file name for MB control |
| pan_scan_file | 8x256 | | file name for pan-scan date |
| VBR_parameter_file | 8x256 | | file name for VBR parameter |
| M_sequence_file | 8x256 | | file name for M-sequence |

FIG. 9A

|  | bits | bit field | contents |
|---|---|---|---|
| time_code | 24 | [31..8] | timecode |
| picture_code_type | 2 | [7..6] | picture coding type |
| top_field_first | 1 | [5..5] | top field first |
| repeat_first_field | 1 | [4..4] | repeat first field |
| display_repeat_field | 1 | [3..3] | repeat number of displaying picture |
| load_intra_qmat | 1 | [2..2] | load intra quantiser matrix |
| load_non_intra_qmat | 1 | [1..1] | load non-intra quantiser matrix |
| pan_scan | 1 | [0..0] | use picture_display_extension () |
| input_order | 32 | [31..0] | input order of the code picture |
| prefil_coeff | 4 | [31..28] | prefilter coefficients index |
| nr_coeff | 2 | [27..26] | NR coefficients index |
| mc_rom_type | 2 | [25..24] | mc_rom_type index |
| rlc_zero_type | 2 | [23..22] | rlc_zero_type index |
| vbc_zero_type | 21 | [21..1] | VBV occupancy Bn in MPEG2 DIS |
| MEmode_type | 1 | [0..] | interface: 0, non-interface : 1 |
| forward_ae | 23 | [31..9] | ME error for forward reference |
| mean_qscale | 8 | [8..1] | mean qscale x 4 |
| processing_type | 1 | [0..0] | 4:2:2  4:2:0 filter type  0: field / 1: frame |

FROM FIG.9A

| Field | Bits | Range | Description |
|---|---|---|---|
| backward_ae | 23 | [31..9] | NE error for backward reference |
| intra_q_matrex_type | 1 | [8..8] | intra quantizer matrex type |
| non_intra_q_matrex_type | 1 | [7..7] | non-intra quantizer matrex type |
| intra_dc_precision | 2 | [6..5] | intra DC precision |
| q_scale_type | 1 | [4..4] | qscale type |
| concealment_MVs | 1 | [3..3] | concealmemt MV |
| intra_vlc_format | 1 | [2..2] | intra VLC format |
| alternate_scan | 1 | [1..1] | alternate scan |
| progressive_frame | 1 | [0..0] | progressive frame |
| allocated_bit | 21 | [31..11] | allocated bit for the picture |
| temporal_reference | 10 | [10..1] | temporal reference |
| scene_change | 1 | [0..0] | 1 : scene change |
| generated_bit_picture | 21 | [31..11] | generated bit for the picture |
| word_boundary6 | 11 | [10..0] | reserved for word boundary |
| bits_sequence_header | 12 | [31..20] | If exists for the picture, sequence header bit |
| GOP_number | 20 | [19..0] | GOP number |
| bits_GOP_header | 12 | [31..20] | If exists for the picture, GOP header bit |

FROM FIG.9B

| | | | |
|---|---|---|---|
| stuffing_size | 20 | [19..0] | zero stuffing size of the picture |
| bits_picture_header | 12 | [31..20] | picture header bit |
| bits_MB_header | 20 | [19.0] | slice header, MB header, DC, and EOB bit |
| word_boundary10 | 2 | [31..30] | reserved for word boundary |
| mean_activity | 30 | [29..0] | mean activity |
| mc_error | 32 | [31..0] | MC error |
| coding_error | 32 | [31..0] | coding error |
| S1_1 | 32 | [31..0] | rate control status |
| S2_1 | 32 | [31..0] | rate control status |
| S1_P | 32 | [31..0] | rate control status |
| S2_P | 32 | [31..0] | rate control status |
| S1_B | 32 | [31..0] | rate control status |
| S2_B | 32 | [31..0] | rate control status |
| Qsum | 32 | [31..0] | sum of Q |
| reserved (4) | 32 | [31..0] | |

FIG. 10A

| MB parameters | bits | bit field | contents |
|---|---|---|---|
| word_boundary | 2 | [31..30] | reserved for word boundary |
| MB_type | 5 | [29..25] | macroblock type |
| MC_type | 2 | [24..23] | MC type |
| DCT_type | 1 | [22..22] | DCT type |
| header_length | 8 | [21..14] | MB header, DC bits |
| code_length | 14 | [13..0] | RLC bits |
| word_boundary2 | 1 | [31..31] | reserved for word boundary |
| MN_act | 15 | [30..16] | MB activity |
| mc_error_MB | 16 | [15..0] | MC error |
| q_scale | 5 | [31..27] | quantizer scale index |
| reserved | 27 | [26..0] | reserved for word boundary |

FIG. 10B

| MB parameters | bits | bit field | contents |
|---|---|---|---|
| MB_type | 5 | [31..27] | macroblock type |
| header_length | 8 | [26..19] | MB header, DC bits |
| code_length | 14 | [18..5] | RLC bits |
| q_scale | 5 | [4..0] | quantizer scale index |

FIG. 13

| IN | OUT | PRIORITY |
|---|---|---|
| 00:00:50:00 | 00:01:00:00 | P |
| 00:01:00:01 | 00:02:00:00 | −1 |
| 00:02:07:00 | 00:03:20:00 | −1 |
| 00:04:00:00 | 00:04:50:00 | 3 |

IN  00:00:00:00   OUT  00:00:00:00   PRIORITY  P

MINIMUM BIT RATE  5.678   BACKGROUND PRIORITY  P

[INSERT]  [RECALL]  [UPDATE]  [DELETE]

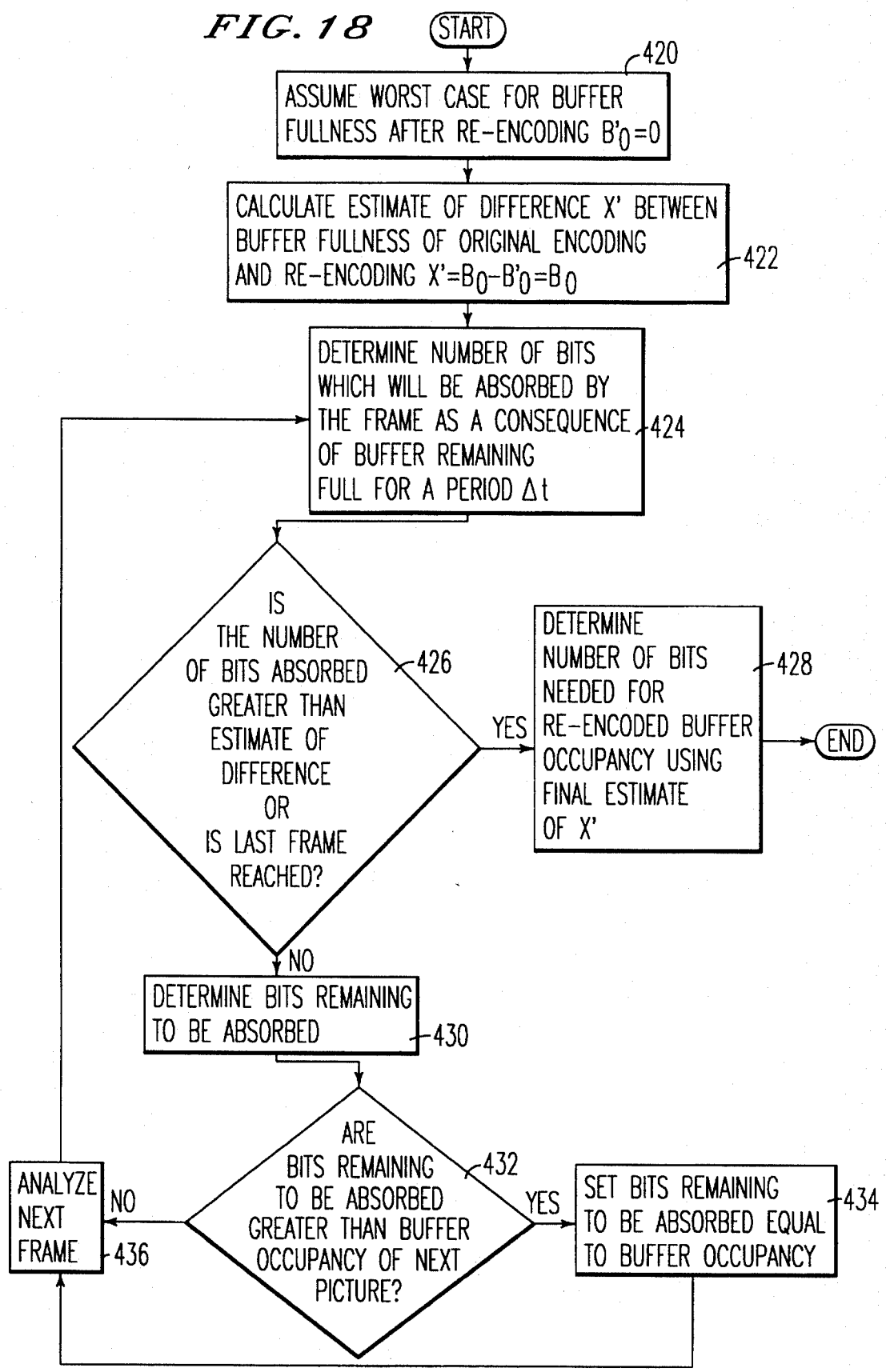

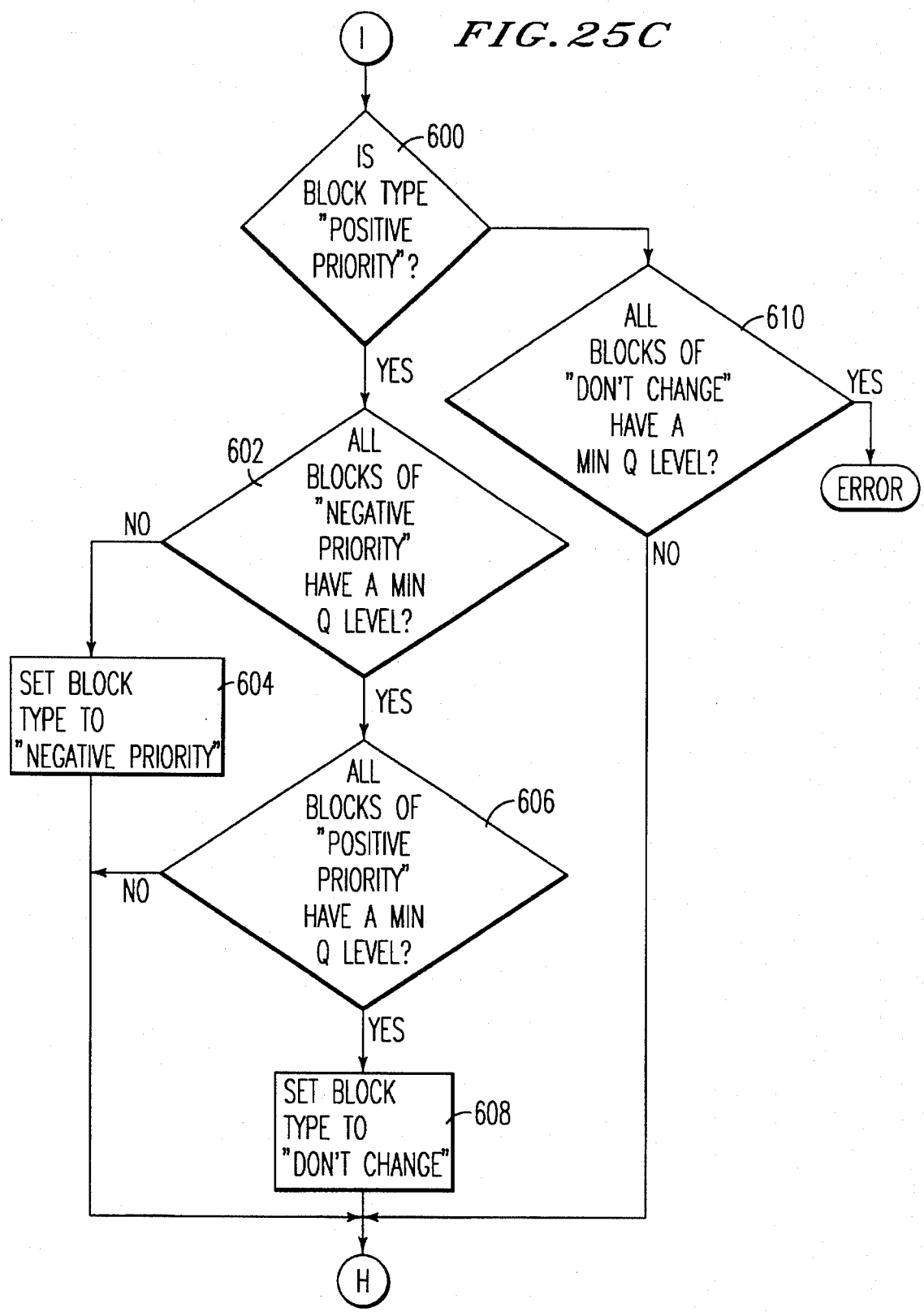

FIG. 27A

| $q_{i,j}$ | $q_{i+1,j}$ | | $q_{i+n-2,j}$ | $q_{i+n-1,j}$ | $q_{i+n,j}$ |
|---|---|---|---|---|---|
| $q_{i,j+1}$ | $q_{i+1,j+1}$ | | | | $q_{i+n,j+1}$ |
| | | | | | |
| | | | | | |
| | | | | | |
| | | | | | |

FIG. 27B

| $q_{i,j}$ | $q_{i+1,j}$ | | | $q_{i+n,j}$ |
|---|---|---|---|---|
| $q_{i,j+1}+\Delta 1$ | $q_{i+1,j+1}+\Delta 1$ | | | $q_{i+n,j+1}+\Delta 1$ |
| | | | | |
| | | | | |
| | | | | |
| | | | | |

FIG. 27C

| $q_{i,j}$ | $q_{i+1,j}$ | | | |
|---|---|---|---|---|
| $q_{i,j+1}+\Delta 1$ | $q_{i+1,j+1}+\Delta 1$ | | | $q_{i+n,j+1}+\Delta 1$ |
| $q_{i,j+2}+\Delta 2$ | $q_{i+1,j+1}+\Delta 2$ | | | $q_{i+n,j+2}+\Delta 2$ |
| | | | | |
| | | | | |
| | | | | |

FIG. 27D

| $q_{i,j}$ | $q_{i+1,j}$ | | | $q_{i+n,j}$ |
|---|---|---|---|---|
| $q_{i,j+1}$ | $q_{i+1,j+1}$ | | | $q_{i+n,j+1}$ |
| $q_{i,j+2}+\Delta 1$ | $q_{i+1,j+2}+\Delta 1$ | | | $q_{i+n,j+2}+\Delta 1$ |
| $q_{i,j+3}+\Delta 1$ | $q_{i+1,j+3}+\Delta 1$ | | | $q_{i+n,j+3}+\Delta 1$ |
| | | | | |

DISPLAY OF FRAME$_N$

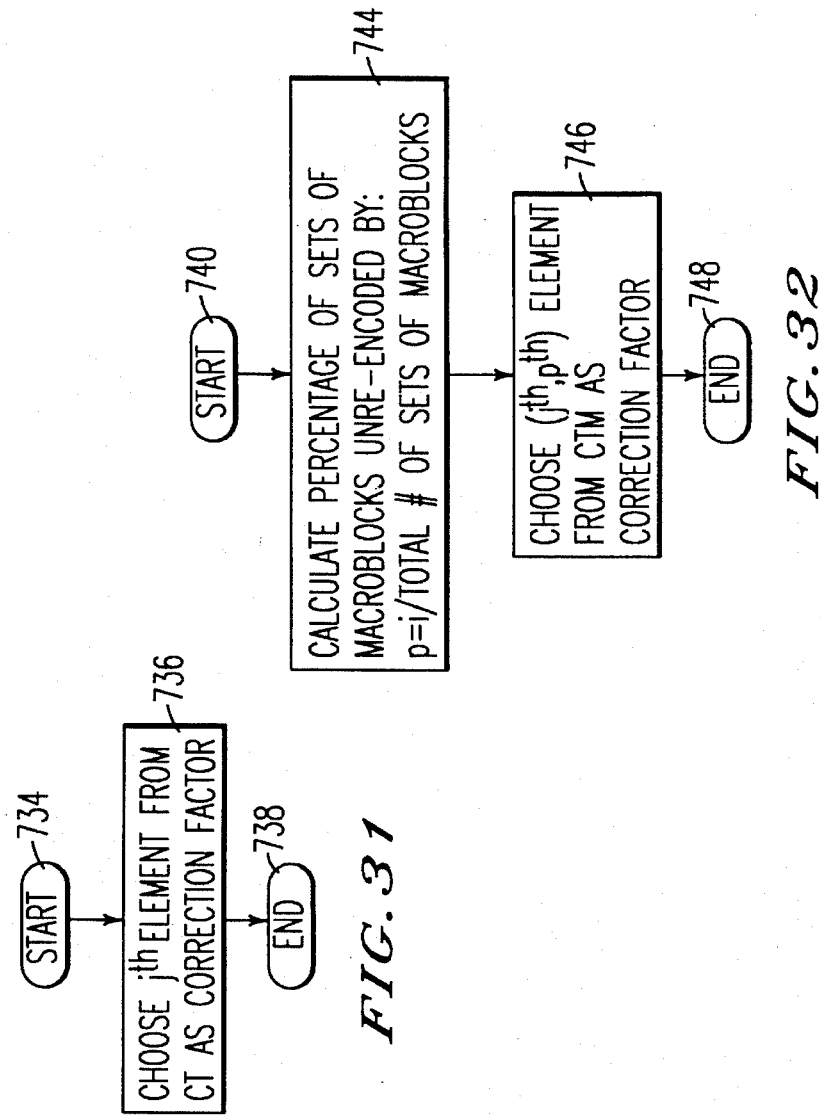
FIG. 32
FIG. 31
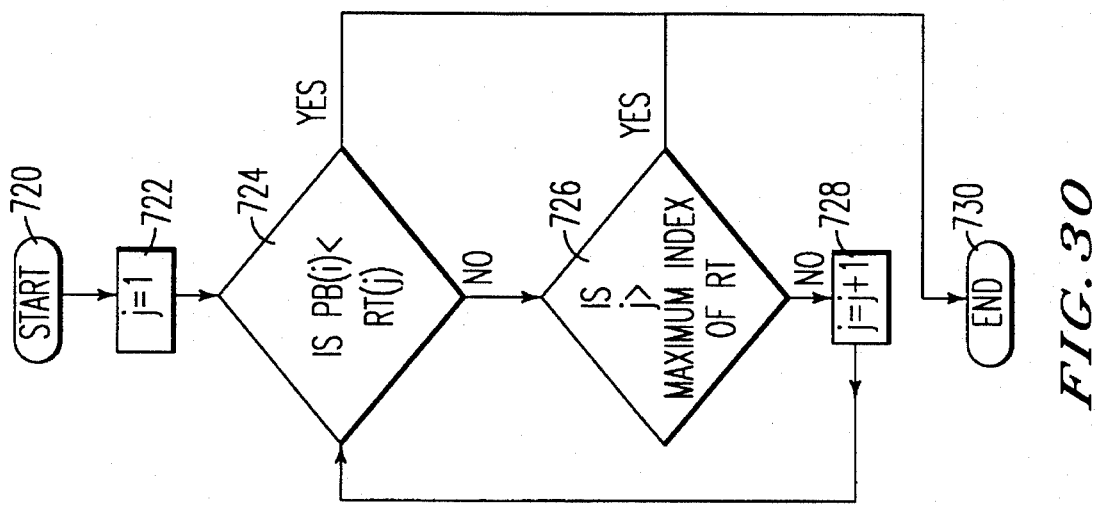
FIG. 30

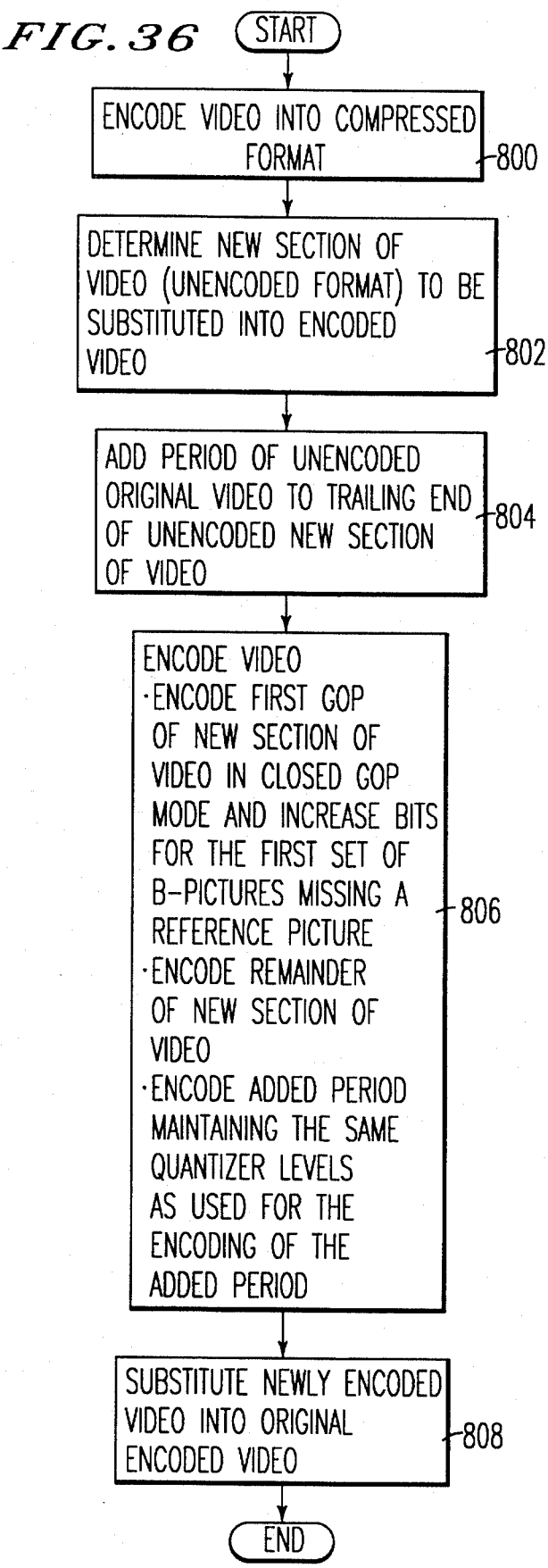

*FIG. 37A*

| q1 | q2 | q1 | q2 |
|----|----|----|----|
| q2 | q1 | q2 | q1 |
| q1 | q2 | q1 | q2 |
| q2 | q1 | q2 | q1 |

*FIG. 37B*

| q1 | q2 | q3 | q4 |
|----|----|----|----|
| q2 | q3 | q4 | q1 |
| q3 | q4 | q1 | q2 |
| q4 | q1 | q2 | q3 |

*FIG. 37C*

| q1 | q2 | q1 | q2 |
|----|----|----|----|
| q3 | q4 | q3 | q4 |
| q1 | q2 | q1 | q2 |
| q3 | q4 | q3 | q4 |

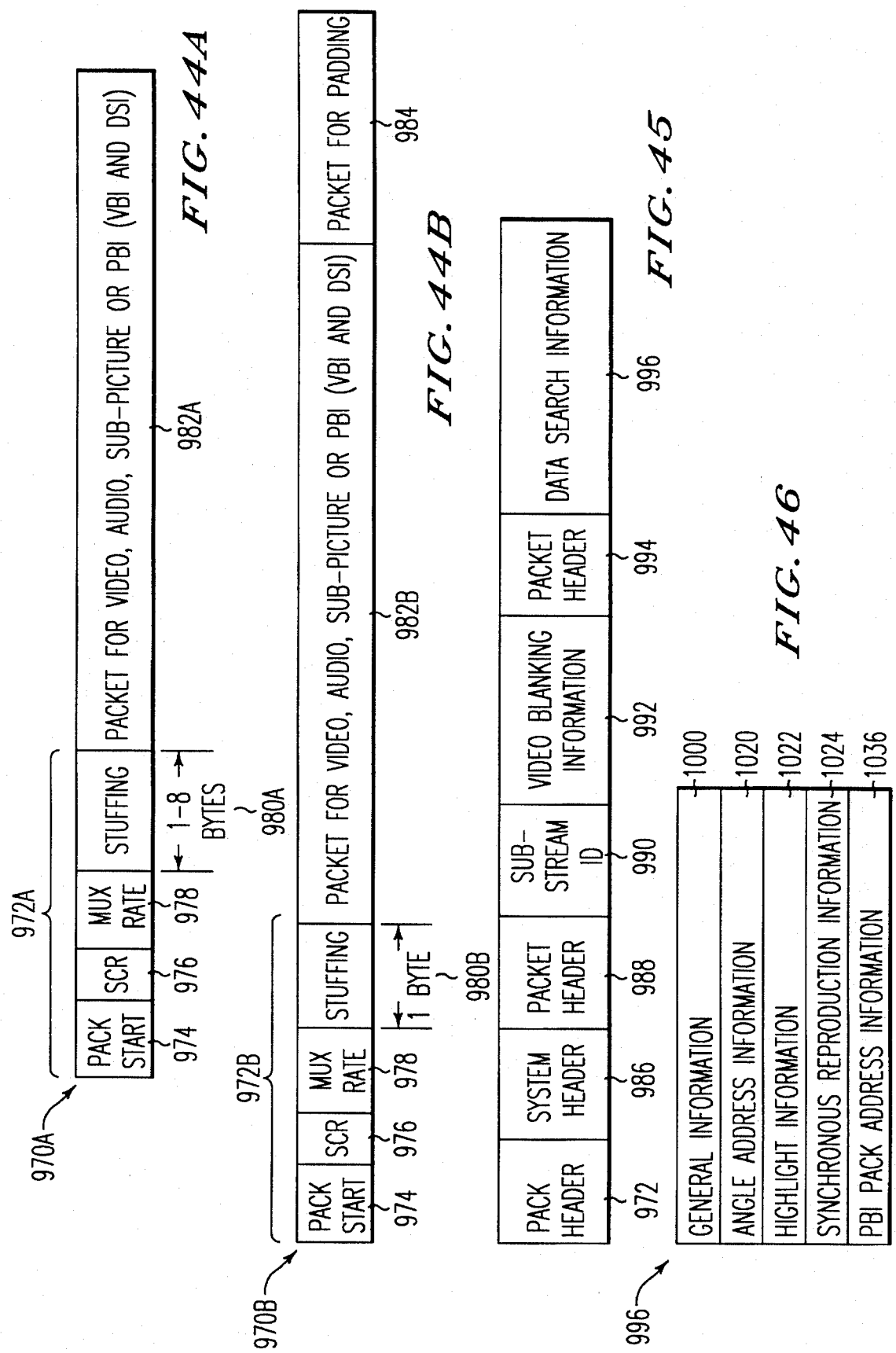

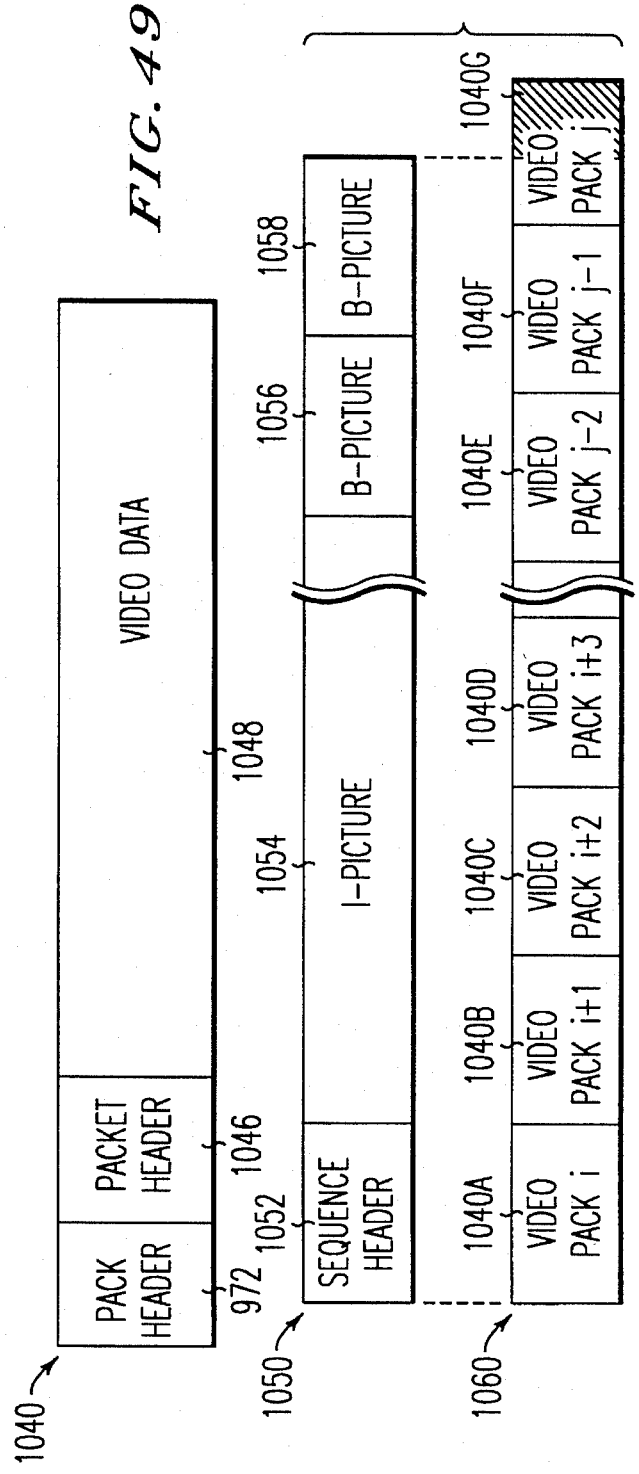
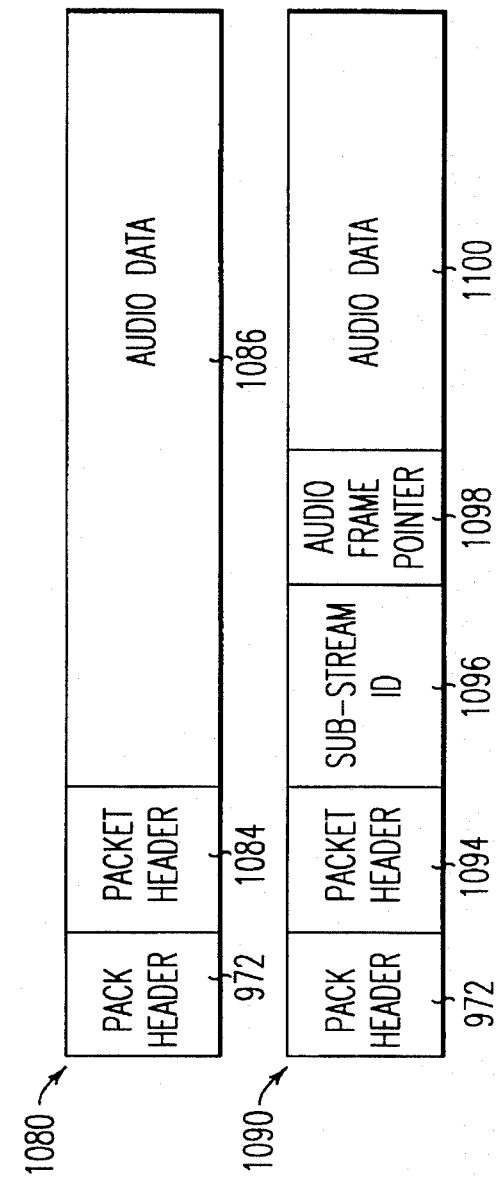
FIG. 49
FIG. 50
FIG. 51A
FIG. 51B

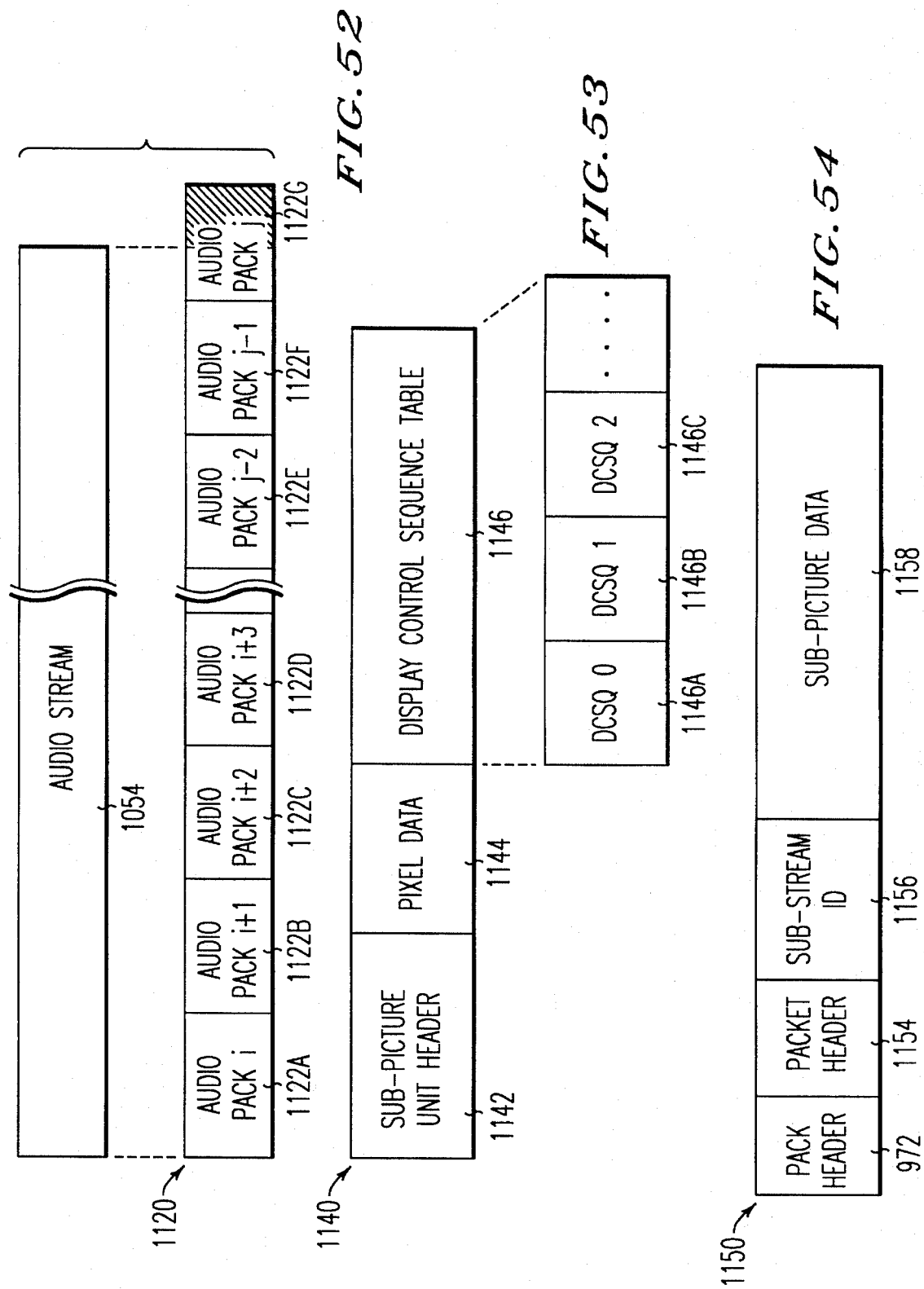

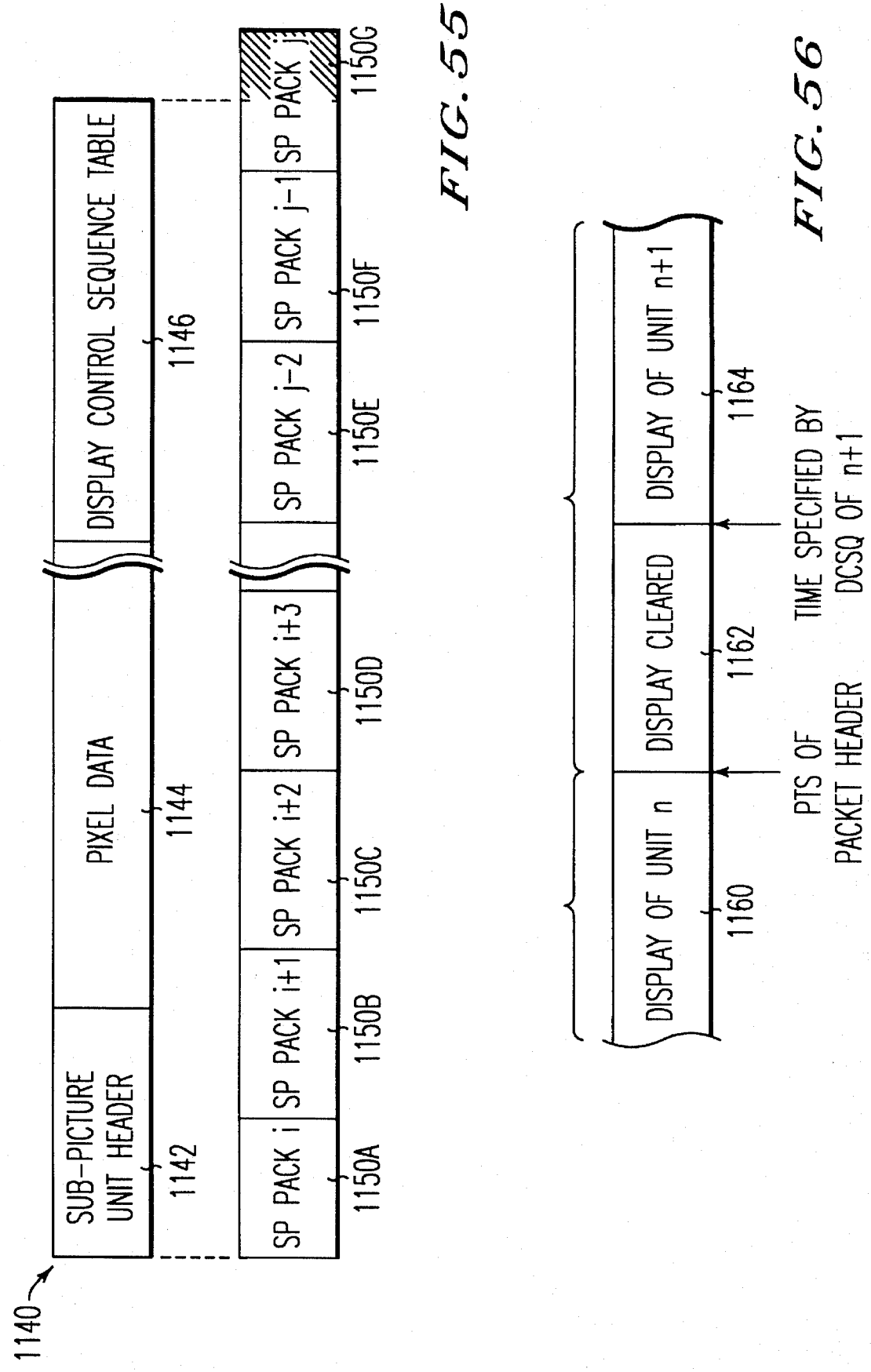

VIDEO ENCODING METHOD AND SYSTEM WHICH ENCODES USING A RATE-QUANTIZER MODEL

CROSS-REFERENCES TO RELATED APPLICATIONS

This application is a continuation of U.S. patent application Ser. No. 08/473,783, filed Jun. 6, 1995, which is a continuation-in-part application of U.S. patent application Ser. No. 08/438,014, now abandoned, entitled "METHOD AND SYSTEM TO REPLACE SECTIONS OF AN ENCODED VIDEO BITSTREAM", filed May 8, 1995, now abandoned, and incorporated herein by reference. This application is also related to and being concurrently filed with four other patent applications: These applications are U.S. patent application Ser. No. 08/467,991, entitled "AUDIOVISUAL ENCODING SYSTEM WITH A REDUCED NUMBER OF AUDIO ENCODERS", U.S. patent application Ser. No. 08/466,391, entitled "METHOD AND SYSTEM FOR A USER TO MANUALLY ALTER THE QUALITY OF PREVIOUSLY ENCODED VIDEO FRAMES", U.S. patent application Ser. No. 08/469,370, entitled "METHOD AND SYSTEM FOR A USER TO MANUALLY ALTER THE QUALITY OF A PREVIOUSLY ENCODED VIDEO SEQUENCE", and U.S. patent application Ser. No. 08/466,766, entitled "A RATE-CONTROLLED DIGITAL VIDEO EDITING METHOD AND SYSTEM WHICH CONTROLS BIT ALLOCATION OF A VIDEO ENCODER BY VARYING QUANTIZATION LEVELS", each filed on Jun. 6, 1995, and incorporated herein by reference.

BACKGROUND OF THE INVENTION

1. Field of the Invention

The present invention relates to video encoding systems, such as MPEG and MPEG-2 video encoders, and more particularly, to video pre-encoders which analyze the bit-rate of the pre-encoded digital video on a frame by frame basis to determine an average bit-rate for each quantization level used in the pre-encoding process. The present invention is used to encode digital video to fit within a fixed capacity storage medium based on bit-rates of future frames as determined in the pre-encoding process.

2. Discussion of the Background

Digital video encoding systems encode raw digital video signals representing the intensity of portions of a frame into compressed, encoded digital video for use in one of two different playback modes; these modes are a constant bit-rate (CBR) mode and a variable bit-rate (VBR) mode. The constant bit-rate mode is suitable for use in transmission technologies such as cable television and direct satellite broadcast which will often use a fixed bandwidth to deliver a signal from a transmitter to a remote receiver. The variable bit-rate mode is suitable for playing back digital video from digital storage media such as compact discs.

In CBR mode, the transmitter must send, typically, 30 frames per second to the receiver while avoiding video buffer underflow and overflow. Underflow occurs in constant bit-rate mode when at the end of a 1/30th of a second time interval, there is insufficient data in the video decoding buffer to construct a picture. Overflow in CBR mode occurs when there is too much video data placed in the buffer for the decoder to decode within the 1/30th of a second interval.

To control the bit-rate in the CBR mode, video encoders use a technique called adaptive quantization to vary the instantaneous bit-rate to meet the target bit-rate. Adaptive quantization involves estimating a number of bits to be generated by a series of macroblocks based on the quantization levels of the macroblocks, encoding the series of macroblocks, determining the number of bits of the encoded macroblocks, comparing the number of bits resulting from the encoding with the estimated number of bits and changing the quantization levels of a succeeding set of macroblocks based on the accuracy of the previous estimate.

In order to accurately estimate the number of bits that will be generated by a series of macroblocks, a quantizer level versus bit-rate model indicates what the average number of bits to be generated by a particular quantization level will be. In a paper entitled "Joint Multi-Channel Bit-Rate Control for Multiplexed MPEG Video Using Rate-Distortion Curves", by Reininger et al. and presented at Princeton Conference 1994, a constant bit-rate encoder is disclosed which splits the encoding process into two phases. In the first phase, a first frame is pre-encoded with parts of frames being pre-encoded using different quantization levels. This gives a quantization level versus bit-rate curve that describes how the first frame responds to the first phase. The first frame then enters a second phase where the quantization level versus bit-rate curve generated in the first phase is used to regulate the encoding of the first frame into part of the final encoded digital video stream. By using the curve generated in the first phase, the second phase may more accurately decide on the quantization levels to be assigned to each macroblock such that the frame is encoded to avoid underflow and overflow. In parallel with the second phase encoding of the first frame, the Reininger method begins the first phase on the second frame and gathers statistics. The process is repeated for all the frames in a movie. This technique, however, provides only a single frame look ahead which is limited in its ability to control rate.

In the VBR mode, overflow can be avoided by only reading data from the digital storage medium when the buffer can accept new data. In the VBR mode, underflow is still possible and results from too much rather than too little, data being used to represent video frames. When too much data represents a frame, the video decoder cannot perform all the necessary decoding operations in 1/30th of a second. An error results because a frame needs to be displayed before it has been totally decoded.

In order to provide encoded digital video representing a full-length movie on a single compact disc, various parts of the raw video may be encoded using different quantization levels to produce various image qualities. To determine the amount of space that a particular section of raw video will consume when encoded, the raw video can be pre-encoded at a particular quantization level and the resulting bit lengths of each frame recorded to aid in a later encoding process. To determine the resultant bit-rates for different quantization levels, this process can be repeated for the whole raw video multiple times, and the results recorded after encoding each frame. However, even though this technique provides the greatest accuracy with which the quantization model can be generated, it is very time consuming. As a typical movie will last between an hour and a half and two hours, even pre-encoding a movie twice using a different quantization level each time would take at least three hours.

SUMMARY OF THE INVENTION

Accordingly, one object of the present invention is to overcome the problems of video pre-encoding as outlined above.

A further object of this invention is to pre-encode raw video with at least two quantization levels such that a bit-rate versus quantization level model can be generated for plural frames of the raw video.

It is a further object of this invention that two quantization levels be uniformly assigned to the plural frames during the pre-encoding process so as to generate two quantization level versus bit-rate points in a line.

It is a further object of this invention that the two quantization levels be assigned to different regions of the plural frames in a checkerboard style fashion.

It is a further object of this invention that four quantization levels be assigned to different regions of the plural frames during the pre-encoding process.

It is a further object of this invention that four quantization levels be assigned uniformly to the plural frames such that four points on a quantization level versus bit-rate curve can be generated.

These and other objects are accomplished by a method and system which pre-encodes plural raw video frames based on a set of chosen quantization levels distributed uniformly across the plural frames. The method and system generate and record bit-rates for each quantization level for the plural frames during a pre-encoding process, such that these quantization level versus bit-rate statistics can be used in a later encoding of the raw video. Bit-rates for quantization levels not used in the pre-encoding process can be extrapolated using known quantization levels from the pre-encoding phase. Furthermore, because statistics have been gathered in advance of the encoding process, the encoder can be directed to use greater or fewer bits in a particular section of raw video based on future needs as indicated by quantization level versus bit-rate curves for later frames.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1A illustrates a block diagram of the encoder system architecture;

FIG. 2 is a flowchart illustrating the general operation of the system of FIG. 1;

FIG. 3 is a flowchart illustrating a process performed in the set-up state;

FIG. 4 illustrates a process performed in the compression state;

FIGS. 8A–8D illustrate the Sequence Layer log file format;

FIGS. 9A–9C illustrate the Picture Layer log file format;

FIGS. 10A and 10B illustrate the full and short forms of the Macroblock Layer log file format;

FIG. 13 illustrates a user interface which is used to input the parameters for changing the picture quality over various time periods;

FIG. 18 illustrates a flowchart for determining if buffer underflow will occur in frames after the edit segment due to changes made within the edit segment;

FIGS. 25A–25C illustrate a process for correcting for too few bits in a frame by reducing the quantizer levels of macroblocks within a frame in order to increase the number of bits;

FIG. 27A is a picture of a frame illustrating the pre-assigned quantization levels;

FIG. 27B is a picture of the frame of FIG. 27A when each set of macroblocks contains one slice and after the first set of macroblocks has been re-encoded, a first correction factor has been calculated and the first correction factor has been added to the second set of macroblocks;

FIG. 27C is a picture of the frame of FIG. 27B after the second set of macroblocks has been re-encoded, a second correction factor has been calculated and the second correction factor has been added to the third set of macroblocks;

FIG. 27D is a picture of the frame of FIG. 27A when each set of macroblocks contains two slices and after the first set of macroblocks has been re-encoded, a first correction factor has been calculated and the first correction factor has been added to the second set of macroblocks;

FIG. 30 is a flowchart illustrating how a correction factor index is determined from a ratio lookup table using an estimation ratio;

FIG. 31 is a flowchart illustrating how a correction factor is chosen from a correction factor table using a correction factor index;

FIG. 32 is a flowchart illustrating how a correction factor is calculated using both an estimation ratio and the number of remaining unre-encoded sets of macroblocks;

FIG. 36 illustrates a process for reducing decoding artifacts when editing an encoded video bitstream by encoding the substitute video using a closed group of pictures mode;

FIG. 37A is a frame of raw video that has two quantization levels assigned to it to generate quantization level versus bit-rate models in the pre-encoding phase;

FIG. 37B is a frame with four quantization levels assigned in a rotating pattern;

FIG. 37C is a frame with four quantization levels distributed in block formation;

FIG. 44A illustrates a data pack in which the data thereof does not require a stuffing packet and FIG. 44B illustrates a data pack which requires a packet for padding;

FIG. 45 illustrates a playback information pack;

FIG. 46 illustrates the information contained within the data search information 996 of FIG. 45;

FIG. 49 illustrates a video pack;

FIG. 50 illustrates the relation between a Group of Pictures (GOP) and a series of video packs;

FIG. 51A illustrates an audio pack encoded according to the MPEG audio encoding specification;

FIG. 51B illustrates an audio pack constructed according to AC-3 or linear PCM audio encoding;

FIG. 52 illustrates the relationship between the encoded audio stream and the audio packs;

FIG. 53 illustrates the structure of a sub-picture unit;

FIG. 54 illustrates the structure of a sub-picture pack;

FIG. 55 illustrates the structure of a sub-picture unit in relation to sub-picture packs; and FIG. 56 illustrates a transition between displaying sub-picture unit n and sub-picture unit n+1.

DESCRIPTION OF THE PREFERRED EMBODIMENTS

Figure 1B:
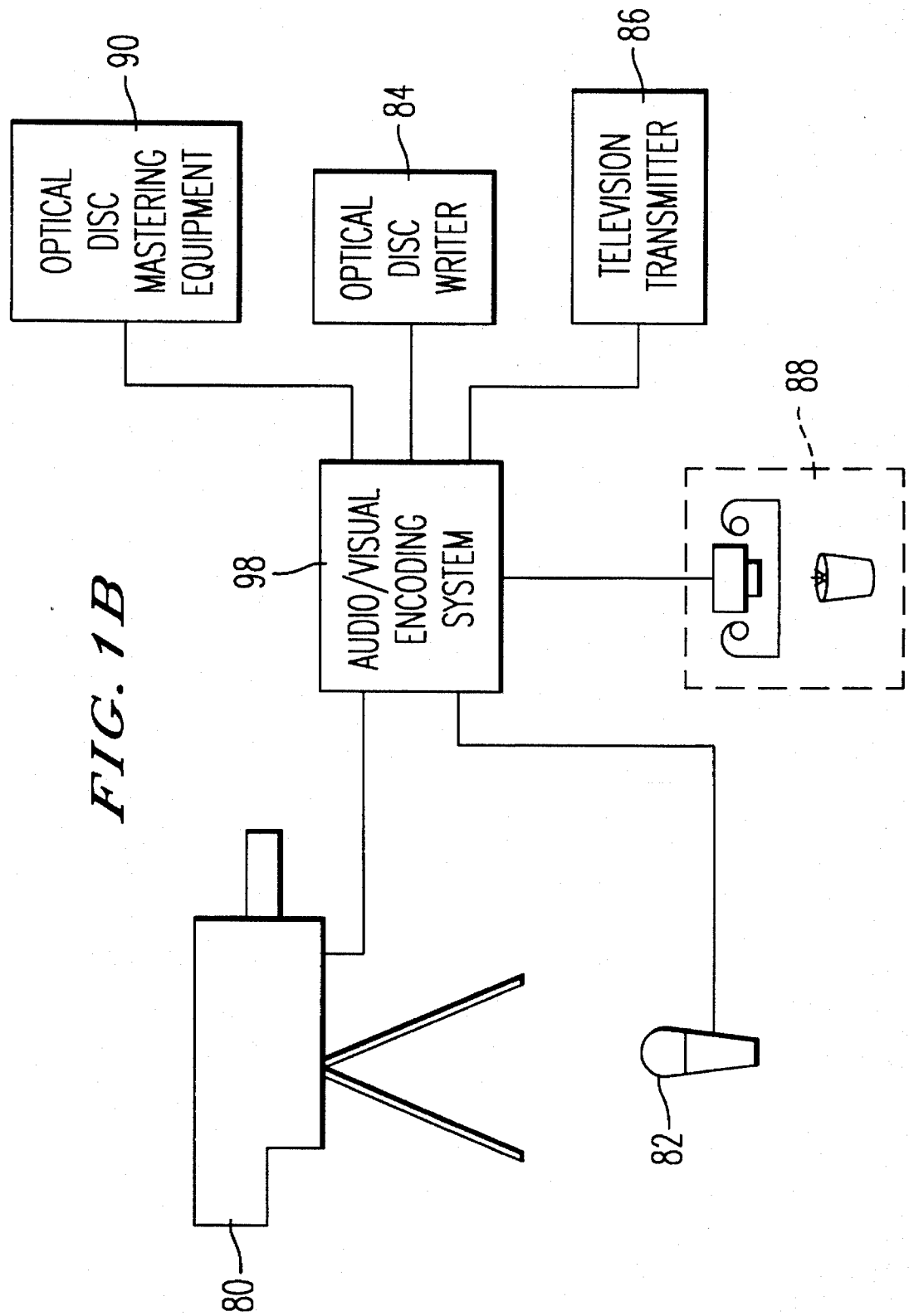
FIG. 1B illustrates devices for obtaining the audio and video to be encoded, and devices for writing and transmitting the encoded audiovisual data generated by the encoding system.

The present invention is a digital video encoding system which includes a plurality of components and functional aspects. In order to more easily identify the various components of the system, this writing is organized into the following sections:

I. INTRODUCTION

II. SYSTEM COMPONENTS

III. GENERAL SYSTEM OPERATION

IV. SYSTEM ALTERNATIVES

V. REDUCING THE NUMBER OF AUDIO ENCODERS WHILE MAINTAINING OPTIMUM ENCODING EFFICIENCY

VI. LOG FILES FOR STORING INFORMATION OF THE ENCODED VIDEO, AND LOG INTERPRETER UTILITIES TO ACCESS THE LOG FILES AND THE ENCODED VIDEO

VII. CHANGING THE QUALITY OF THE ENCODED VIDEO
  A. Changing the Quality over Periods of Time
  B. Changing the Quality Within Regions of Frames VIII. RE-ENCODING THE VIDEO AFTER CHANGING THE QUALITY
  A. Bit Allocation Control When the Quality Has Been Changed Within Single Frames B. Re-Encoding While Avoiding Decoding Artifacts At Edit Points
1. Restoring the Encoder to the State Used When Originally Encoding
2. Re-Encoding in a Closed Group of Pictures Mode
IX. RATE-QUANTIZER MODELING USED FOR ENCODING
X. COMBINING AUDIO, VIDEO, AND SUB-PICTURE DIGITAL SIGNALS USING DATA STRUCTURES

I. INTRODUCTION

The disclosed system relates to a digital audiovisual encoding system, also known as a digital compression system. The ideas disclosed herein are usable with any type of encoding scheme and are particularly applicable to MPEG-2 (Moving Picture Experts Group) formally known as ISO/IEC 13818-2, ISO/IEC 13818-1 which specifies MPEG-2 system information, and the MPEG-2 predecessor, MPEG-1 (ISO/IEC 11172-video). MPEG-1 and MPEG-2 will collectively be referred to herein as "MPEG". The MPEG standard specifies only the syntax of the compressed or encoded video stream but not how to perform compression. It is to be noted that as an MPEG encoded data stream is a compressed data stream, the encoding process may be referred to as a compression process and vice versa. The system also relates to the encoding of audio which may be performed using Dolby AC-3, or the MPEG-2 standard as defined in ISO/IEC 13818-3. Each of the above standards is incorporated herein by reference.

MPEG video compression is a temporal causal predictive compression. As the MPEG encoder receives a new video picture, it compares the new video picture to a predicted picture that the encoder has generated based on previously encoded pictures. The term "causal" predictive coding is used because the prediction is made based on previously transmitted information, and the term "temporal" causal predictive coding is used because the prediction is performed in terms of temporal picture units. The prediction procedure involves estimating the motion of areas within a video picture. Therefore, the temporal prediction is sometimes called motion-compensated prediction.

The result of the comparison between old and new pictures represents new information contained in the later video picture. The new information, also called "residual information," is then subjected to a series of information compaction processes. First, a linear mathematical transformation known as the discrete cosine transformation (DCT) is performed. The DCT operation transforms the pixel residual information into a series of coefficients. In MPEG compression, the DCT is performed over blocks of 8×8 pixels. Similarly, the DCT coefficients are also in 8×8 arrays of numbers. These coefficients are then individually quantized (or rounded) to a set degrees of precision, based upon a quantization step size or q-level. The quantization process typically produces many coefficients having the value of zero. It is this quantizing process which is mostly responsible for introducing coding artifacts, otherwise referred to as quantization noise.

The quantized coefficients are then coded using a combination of run-length coding on the zero-valued coefficients and variable-length coding of the resultant pairs of two numbers, each representing the run-length value and non-zero coefficient value, respectively. The codes for these run-length non-zero value pairs, together with other overhead information, form the compressed digital data stream corresponding to the video picture. Due to physical limitations such as output data rate or storage capacity, it is necessary to vary the degree of quantization so that an appropriate amount of compression is accomplished. This is referred to as buffer feedback.

An MPEG-compliant decoder reads the encoded digital data stream and performs operations opposite to the encoding process.

Typically, the total number of bits in the digital data stream is substantially less than the total number of bits needed to represent the video pictures, and hence compression is achieved. It is important, however, to recognize that such compression as exemplified by MPEG video coding is by no means free of distortion or artifacts. As mentioned, the principal source of compression artifacts is the quantization process.

The disclosed system is aimed at dynamically adjusting the degree of quantization during the compression or encoding process. In particular, adjustment is made in accordance with instructions provided by a human operator. The adjustments may apply to parts of a larger video sequence, or possibly to the entire video sequence.

II. SYSTEM COMPONENTS

Referring now to the drawings, wherein like reference numerals designate identical or corresponding parts throughout the several views and more particularly to FIG. 1A thereof, there is illustrated a block diagram of the encoder system architecture. It is to be noted that the video encoding process is a complex process which requires a number of different devices which operate synchronously in order to achieve the encoding and editing without interruption or errors. However, the audio and video encoding can be separately performed as long as the appropriate time codes are used. While four workstations have been illustrated in FIG. 1A, ordinarily, the user or operator of the encoding system will interact with only one keyboard and workstation. The workstations contain conventional general purpose computer components such as a processor, RAM, ROM, a network interface, a hard disk, a keyboard, monitor, and other conventional components.

A workstation 30 functions as the system control station which, in the preferred embodiment, is a Sun SPARC20 Unix workstation. Workstation 30 is equipped with a graphical console display monitor 31 as well as conventional workstation input devices such as a keyboard 32 and a pointing device 33 which is a mouse or any other pointing device. The user visually interacts with the workstation 30 primarily through a graphical user interface (GUI) which is displayed on the console display 31.

The workstation 30 is connected to and controls the other workstations 40, 10 and 20 which are described below. Workstation 30 also communications with the audio interface unit 72, and the digital video capture and storage device 60 which are also discussed below. The workstation 30 is connected to the workstation 40 through a serial interface as defined by the Electronic Industries Association (EIA) standard RS-232. Similarly, the connection between workstation 30 and the audio interface unit 72 is also by means of the serial RS-232 standard. The connection between the workstation 30 and the digital video capture and storage device 60 is through an industry-standard S-bus interface.

A frame jogger 41 is connected to the workstation 40 to allow the operator to position the video of either of the VTRs 51 or 52 to where editing is to be performed. The system is capable of using time codes input by an operator to control the position of the video. However the jog controller enhances the user-friendliness of the system by allowing the use of a jog knob to position the video. Workstation 30 controls whether the displayed video on the video display monitor 61 is from the digital video capture and storage device 60 and/or from the record VTR 52.

Video encoding device 50 is a digital video encoder which performs compression according to the MPEG-1, MPEG-2, or other video compression standard. A commercially available MPEG-1 encoder is the Sony RTE-3000. An MPEG-2 encoder can be constructed according to the teachings set forth in Japanese Patent Application 6-326435, filed Dec. 27, 1994, which is incorporated herein by reference. Workstation 10 directly controls the video encoding device 50 through the industry standard S-bus interface and the workstation 10 receives commands from workstation 30 through standard networking equipment such as an Ethernet network. During the encoding process, workstation 10 supports real-time execution of the video encoding control program of the video encoding device 50. In the preferred embodiment, the workstation 10 is a Sun SPARC20 Unix workstation.

The workstation 10 responds to commands from the central workstation 30 to begin the compression process. During the compression process, workstation 10 dynamically controls the degree of quantization applied to particular areas of the video signal. The particular areas for which the quantization is varied extend over the spatial and/or temporal domains and the exact manner in which the quantization is controlled is explained below.

The input video to the video encoding device 50 is from a tape within the playback VTR 51. The playback VTR 51 is a profession digital video standard, ITU-R 601 (formerly known as CCIR 601 video standard) video tape player. This standard applies to both NTSC as well as PAL systems. It is noted that the tape within the playback VTR 51 contains electromagnetic information representing various images and scenes which have been captured through a video or film camera, or generated by a computer. The playback VTR 51 operates under the control of the workstation 40. The encoded output from the video encoding device 50 is transferred to a workstation 20 for storage on one or more hard disks 21.

In order to view video data which has been encoded and output by the video encoding device 50, a digital video decoder such as an MPEG-2 decoder is necessary. However, at the time of this writing, the implemented system does not incorporate a separate MPEG-2 decoder as such a decoder was not readily available during the early development stages of the system. Therefore, the video encoding device 50 not only outputs an MPEG-2 video stream to workstation 20, but also a decoded video image equivalent of the MPEG-2 encoded data is output from the video encoding device 50 to the record VTR 52. The record VTR 52 is connected to the video encoding device 50 by the industry-standard digital video signal connector known as the D1 interface and controlled by the workstation 40. Both the playback VTR 51 and the record VTR 52 are suitably implemented using Ampex DCT professional video tape recorders.

The audio is encoded and compressed, for example, into the Dolby AC-3 format, or alternatively an MPEG-2 compliant format such as described in the ISO/IEC 13818-3 standard. The audio sources for the encoding system are four digital audio tape (DAT) players 71a, 71b, 71c, and 71d. Studio quality DAT players are commercially available from Sony. The DAT player 71a–71d are connected and controlled via the industry-standard protocol RS-422 by the workstation 40. The audio signals output by the DAT players 71a–71d are input into audio encoders 70a, 70b, 70c, and 70d respectively. These audio encoders are implemented using the commercially available DOLBY AC-3 model DP 525 encoders and are controlled by the audio interface unit 72. Typically, the audio encoding will begin and end at specified time codes. The audio interface unit 72 receives instructions such as encoding start and ending time codes from the workstation 30 over an RS-232 connection therebetween. Additionally, the audio interface unit 72 multiplexes the various digitally compressed audio data into a single digital stream transmitted to workstation 20. Workstation 20 demultiplexes the input digital audio stream into multiple files corresponding to the compressed digital data output by the audio encoding devices 70. The video encoding device 50 provides a synchronization signal based on its video synchronization signal to the audio interface unit 72. The sync signal allows the audio bitstream to be synchronized to the video bitstream output by the video encoding device 50.

Workstation 30, has the capability of instructing the audio interface unit 72 to provide a duplicate of the audio data from any one of the various audio encoding devices 70a–70d to the audio decoder 73. The audio decoder 73 decodes the compressed audio so that a user may listen to the audio via a speaker 75. The choice of which audio encoding device to monitor is made by the human operator through interaction with the graphical user interface on the console display 31 via either the keyboard 32 or pointing device 33. The construction of the audio interface unit 72 is hardware which is capable of performing the above-described functions. This hardware is one or more programmed microprocessors and/or conventional circuit elements arranged to achieve the disclosed functions.

Workstation 40 is the studio equipment control station and issues appropriate commands to control both the playback video tape recorder 51 and the digital audio tape players 71a–71d along with the recording video tape recorder 52. The workstation 40 also instructs the digital video capture and storage device 60 to begin capturing video at the appropriate time. The connections between workstation 40 and the various video and audio tape decks is by means of the industry standard RS-422 protocol. This protocol allows each tape deck to inform the workstation 40 of its current tape location in standard time code format. The workstation 40 uses such information to properly synchronize the various tape decks so that the video and audio information is played out and recorded correctly. In the present embodiment, workstation 40 is a standard IBM compatible personal computer running DOS and Ensemble Pro, a commercially available software program from the Editing Technologies Corp., Moorpark, Calif. It is noted that a minor modification was made to the Ensemble Pro program so that workstation 30 can communicate with Ensemble Pro running on the workstation 40 through an RS-232 communication port. This modification is either commercially available through Editing Technologies Corp., or may be performed by one of ordinary skill in the art without undue experimentation.

A digital video capture and storage device 60 serves two functions within the encoding system; first, this device uses its capture and storage capability to provide a convenient "before-and-after" comparison of manual editing that has been applied to the video signal, and second, provides a graphical overlay feature to the video display. This graphic overlay feature is used, for example, during the spatial manual editing phase, to allow the human operator to define the regions of interest in which the quantization and consequently the number of bits allocated is varied.

In the present invention, the digital video capture and storage device is implemented as a commercially available DRAM-based video product, model VS6000, from Viewgraphics, Mountain View, Calif. The digital video input to this device is by means of the industry standard D1 having ITU-R-601 (formerly CCIR 601) image resolution. The output of the digital video capture and storage device 60 is connected to the video display monitor 61 through three separate analog signals representing the red, green and blue components of the video signal. The graphics overlay information is processed by the digital video and capture storage device 60 prior to creation of the final analog signal output by the digital video capture and storage device 60 and therefore will be visible to the human operator along with the other video data on the video display monitor 61.

The workstation 30 running under the Unix environment maps graphical windows thereof onto the video display monitor 61 using the digital video capture and storage device 60. This allows the human operator to perform graphical operations (e.g., drawing rectangles) on the graphical overlay plane of the display shown in monitor 61. The device 60 provides an overlay function. The overlay is performed in video memory prior to the conversion of the information in the memory to an analog video signal which drives the monitor. In the VS6000 used by the system, there is an 8-bit memory plane on top of the video memory. On this 8-bit plane, the computer can draw any color graphics and text. One of the "colors" on this 8 bit plane is the transparent color. Any pixel on this overlay plane that has the transparent color will take on the value of the video memory underneath it. In general, most of the overlay plane will be filled with the transparent color, with graphics (e.g. lines, text, etc) using non-transparent colors. Thus, a display memory is formed which consists of both the video memory and the overlay graphics memory. It is the display memory that is ultimately converted to an analog signal for display on the monitor 61. The human operator typically uses the pointing device 33 associated with the keyboard 32 to perform such graphical operations and manipulations of graphical objects thus created.

A workstation 20 receives digital data streams from the video encoding device 50 as well as the audio interface unit 72. The workstation 20 is connected to the workstation 30 via an Ethernet connection, and the workstation 20 is also connected to the video encoding device 50 and the audio interface unit 72 through the industry-standard S-bus interface. The received digital data streams are stored in one or more hard disks 21 as separate data files. Separate Direct-Memory-Access (DMA) cards are used in transferring the captured digital stream data to the hard disks 21. For long video sequences that result in large quantities of digital data, the hard disks 21 may be implemented using commercially available hard disks such as the SPARCstorage Array X655A/G5 from Sun Microsystems. Workstation 20, in this embodiment, is a commercially available SPARCserver 1000 from Sun Microsystems.

Workstation 20 also formats the data files corresponding to the video and audio compressed data into a single formatted file suitable for transport or transmission to decoding devices. The final medium is preferably disc-based, in which case the formatting will be in accordance to the pertinent disc format. Typically, the formatted file is transported by some intermediate digital storage means, such as a digital tape, to a facility where the transfer to the final transmission medium or media takes place. The digital storage devices 22, shown in the figures, serves such a purpose. In the present embodiment, digital storage devices 22 include a commercially available 8 mm Exabyte tape drive. The interface of the digital storage device 22 is the industry-standard Small Computer System Interface (SCSI).

It is known that multiple SCSI devices can be attached to the same SCSI bus. Therefore, the digital storage devices 22 can include other SCSI devices such as the commercially available digital linear tape (DLT) drive, a magneto-optic (MO) disc drive, or a floppy disk drive. These configurations are easily accommodated, and would serve to provide a flexible input mechanism for any auxiliary data that may be needed prior to or during the formatting stage. For example, in movie production, subtitle information is often available in a medium that requires one of the SCSI devices mentioned above. In such cases, the auxiliary data is read by software programs executing in workstation 20 and manipulated so that the auxiliary data is included into the formatted files. The auxiliary data may include subtitle data which is in the U.S. Close-Caption format. The auxiliary data can include any desired data such as program codes or postscript data.

FIG. 1B illustrates an audio/visual encoding system 98, which corresponds to and functions in the same manner as the system of FIG. 1A. In FIG. 1B, video input to the encoding system is supplied from a camera 80 and audio is supplied from a microphone 82. Movie film containing visual and possibly audio information is transferred to the encoding system 98 through the transfer device 88 which contains a light to illuminate the film and a light detector to capture images from the film. The information from the input devices 80, 82, and 88 is stored in an electro-magnetic format before encoded by the encoding system 98, such as by an audio or video tape recorder. The audio and video tapes are encoded by the system of FIG. 1A The final digital bitstream produced by the encoding system is sent to optical disc mastering equipment 90 which presses optical discs, an optical disc writer 84 which writes optical discs, or may be transmitted to a television receiver or set-top box decoder via the television transmitter 86. The pressing and creation of optical discs is performed in a known and commercially available manner using a master disc, for example. The encoded information is also usable with a video on demand system. The encoded bitstream is ultimately decoded by decoding processes which correspond to the encoding processes and the audiovisual information is displayed to a user on a television or monitor. The decoding devices include digital video disk players which decode the encoded disks for display on a television or monitor.

It is evident from FIG. 1B that the encoding system inputs electrical signals representing audio and images, transforms the electrical signals to a new format, and ultimately, the signals are decoded to recreate the original information which was encoded.

III. SYSTEM OPERATION

FIG. 2 is a flowchart illustrating the general operation of the system illustrated in FIG. 1A. As seen in FIG. 2, the system goes through several "states" during its cycle of operation. The dark solid lines show the normal operational path, the solid lines illustrate an interrupt exit path, and the dashed lines illustrates a by-pass path.

The first operation by the system occurs in the set-up state 100. This step allows input parameters to be specified before the compression state 102 is entered. In the compression state 102, a video image stored on a tape in the playback VTR 51 is encoded into a digitally compressed format by the video encoding device 50.

After the compression state 102, the user is permitted to manually edit the compression process based on the picture quality of the previously compressed data in the edit state 104. This allows the user to increase or decrease the picture quality within regions of a frame of video or over a time period. It is to be noted that the term "edit" does not mean that the scenes themselves are added or removed from the picture stream. In the present application, the term "edit" means to change the quantization and subsequently the quality of the video. After the image is edited in the edit state 104, it is then necessary to perform the compression operation again in the compression state 102 in order to encode the data according to the new user-specified parameters.

After the user is satisfied with the edited form of the video, all information including the audio, video, and other information such as subtitles are combined together into a desired format in the format state 106. The completion state 108 erases any temporary files and the process terminates in the exit state 110. More detailed information with respect to the individual states illustrated in FIG. 2 will now be explained with respect to FIGS. 3–6.

FIG. 3 illustrates the steps performed in the set-up state 100. Step 120 begins the set-up state and step 122 initialized the system. This step will begin the execution of system control software contained within workstation 30 and start up other programs such as a graphical user interface (GUI) program which is responsible for the user interface displayed on the console display 31 and having parameters input through the keyboard 32 and pointing device 33. Also during step 122, the system controller software in workstation 30 queries other devices to determine the system condition including the available devices of the system.

Step 124 displays information to the user through the GUI. A welcome message, information pertaining to the system, parameters used for the encoding process, and the existence of any previously encoded files are displayed. The displayed system information includes the devices connected to the system, including audio encoders, VTRs, audio tape decks, and their configuration. In the event that the system contains previously encoded files, information is displayed to the user describing the audio and video encoding parameters used to generate the files.

Step 126 then inputs information from the user such as a command to begin encoding using standard or user specified system parameters, any changes to the system parameters, or a confirmation that the selected parameters are acceptable. The user also enters the beginning and ending time codes for the encoding operation.

Step 128 then processes the input data by transferring the input data from the graphical user interface to the system controller software in order to prepare for the encoding and compression operation. The set-up state ends in step 130.

FIG. 4 illustrates the process performed in the compression state 102. According to the normal operation flow, the user has already specified a video and any accompanying audio sequence to be compressed in the set-up state. The user must then instruct the system to perform an automatic or auto-compression procedure. The video compression during the auto-compression procedure does not permit the user to control the dynamic quantization process over a time period or within a frame or video. It is intended as an initial compression run in which the coding decisions are made based on objective measures as computed by the video encoding device 50. If the auto-compression has already been performed, the user may manually adjust the quantization in an edit-compress mode either spatially (over a frame or video) or temporally (over a video sequence).

In the compression state, after starting in step 140, step 142 prepares for the compression operation. In this operation, parameters for the compression process such as the time codes of the video and any accompanying audio to be compressed along with the compression parameters are downloaded to the video encoding device 50 from the workstation 30 through the workstation 10.

Step 144 then determines the type of compression which is desired. The first time information is compressed, the compression process is performed automatically and without user intervention. Step 146 prepares for the auto-compression process. During this preparation, the workstation 30 determines which of the digital audio tape players 71a–71d and the associated audio encoding devices 70a–70d are to be used. Also, the workstation 30 commands the workstation 20 to prepare for bitstream capture from the output of the video encoding device 50 and the audio encoders 70a–70d through the audio interface unit 72. Further, the playback VTR 51, the record VTR 52 and the DAT players 71a–71d are rolled to the appropriate starting position of the tapes. Workstation 40 then signals the playback video tape recorder 51, the record tape recorder 52, and the DAT players 71a–71d to begin rolling in step 148. Step 150 then encodes the video data according to the desired format such as an MPEG-1 or MPEG-2 format using the video encoding device 50. Also, the audio data is encoded according to the desired format such the Dolby AC-3 format. It is necessary to create log files to assist later in the manual editing process. The log files indicate parameters of the encoded video data which are necessary in order to perform later editing of the video data. The encoding process is stopped in step 160 when the appropriate time code is reached. This time code may be the end of the information to be encoded or may be at a user specified point which is not at the end of the video sequence.

If step 144 determines that the auto-compression process has already been performed and a user desires to manually change the picture quality of one or more frames of video using the parameters specified during the edit state as described with respect to FIG. 5 below, step 144 will determine that the edit-compression operation is to be performed. Step 152 prepares for the edit compression operation which includes cueing of the playback VTR 51 to the desired starting point which is the point at which the manual editing begins. Also, the audio equipment is disabled as there is no need to change the audio information once it is encoded in the auto-compression operation. Step 154 then rolls the playback VTR 51 and the record VTR 52.

Step 156 subsequently begins encoding the video data according to the parameters which have been specified by the user in the edit state described in FIG. 5. The edit compression is terminated in step 160 when the ending time code is reached. Step 162 displays a message to the user that the compression and encoding is complete and the process ends in step 164.

Figure 5:
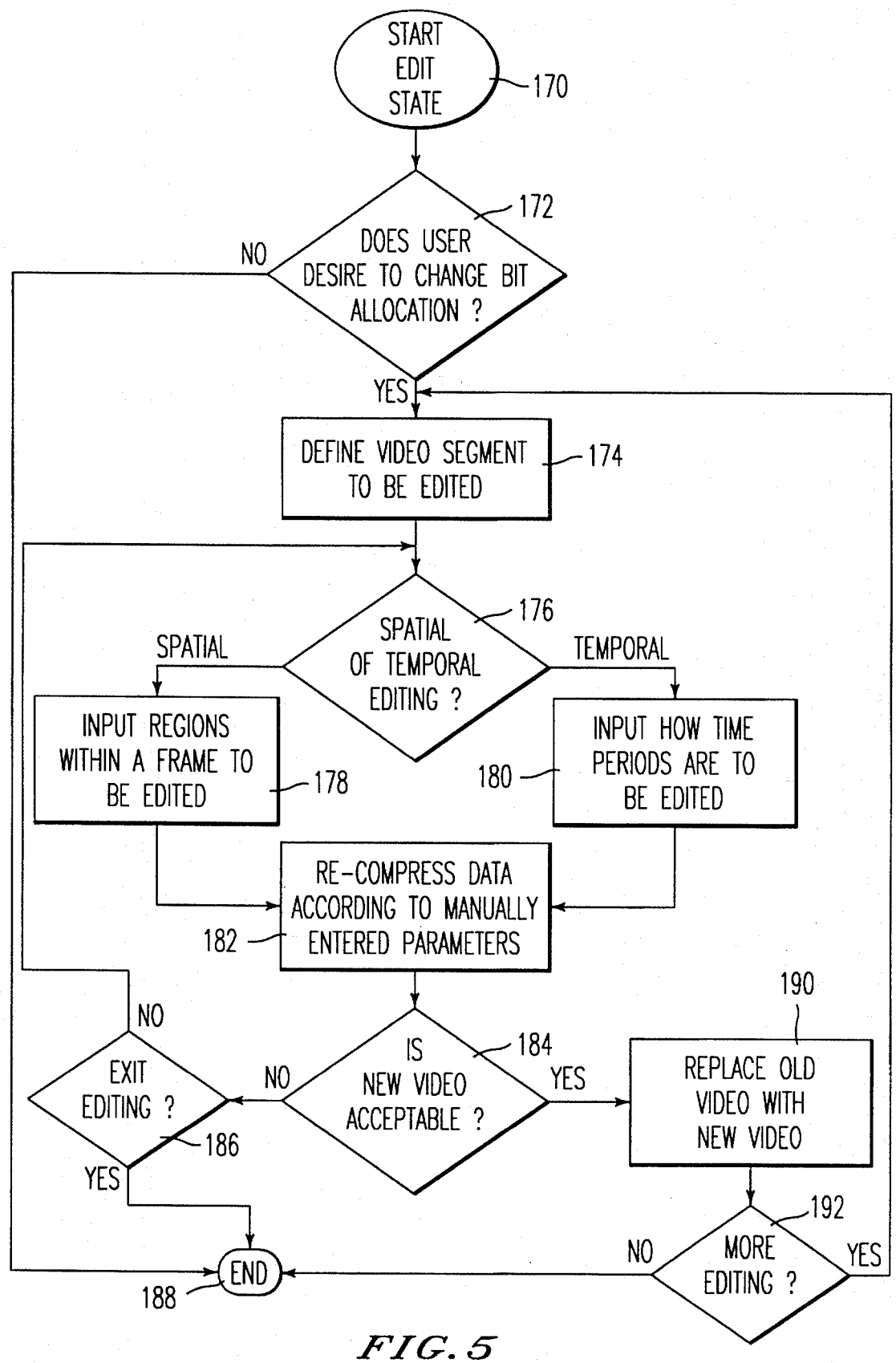
FIG. 5 illustrates the process performed in the edit state.
Figure 6:
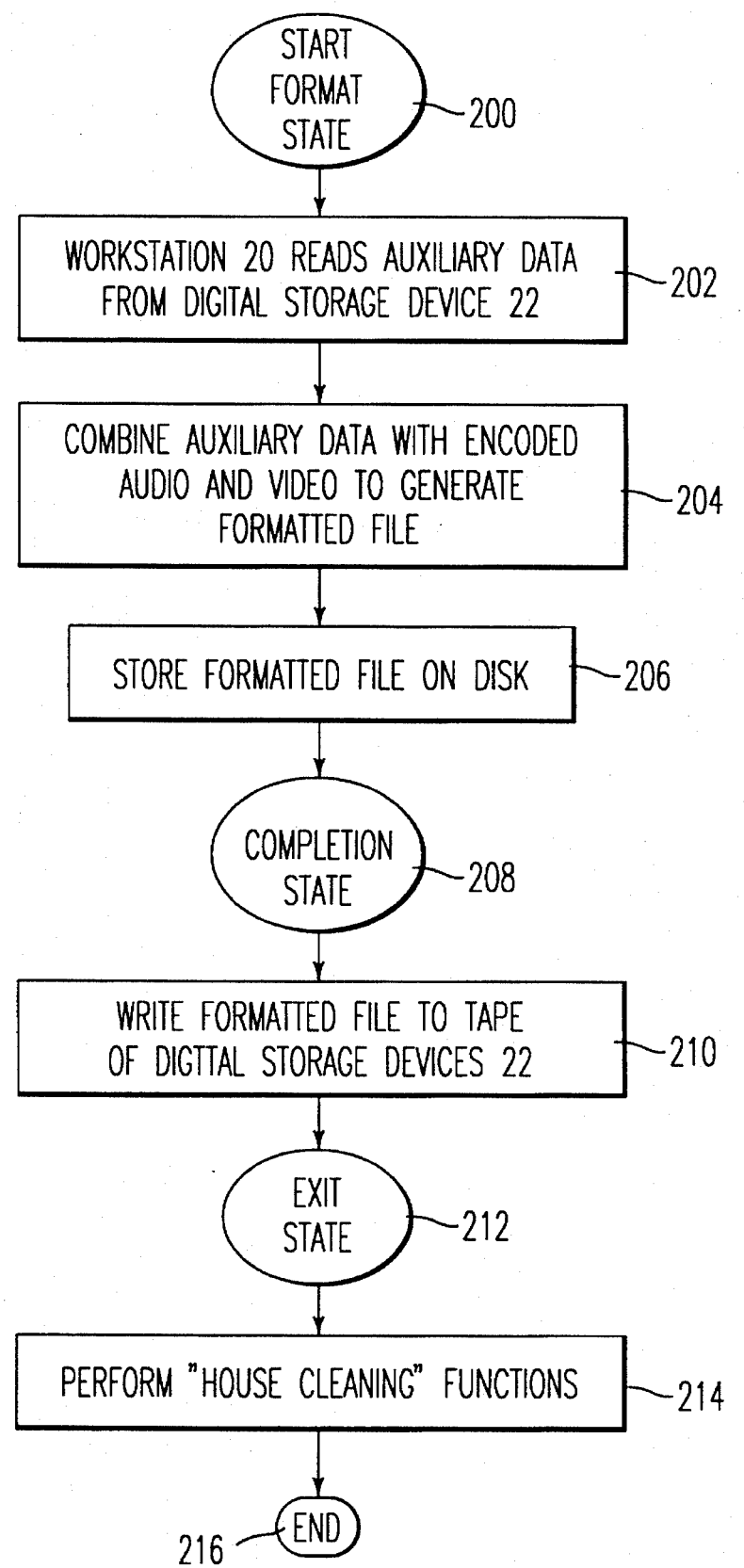
FIG. 6 illustrates a process performed for the start, completion, and exit states.

FIG. 5 illustrates the process performed in the edit state 104. As previously explained, the editing referred to is not the conventional editing of video where scenes are removed, shortened, or moved within a video sequence; the edit state in the present writing refers to changing the quality of a portion of or time sequence of the video by manually setting the quantization of the video.

After starting the edit state in step 170, step 172 asks a user if he wishes to manually edit the video by changing the bit allocation of the encoded video. If the user does not desire to change the bit allocation, the process ends at step 188. If the user desires to change the bit allocation, the user defines the video segment to be edited in step 174. This is performed by selecting a time period of the video over which the picture quality is to be changed. Step 176 then determines if the user desires spatial or temporal editing. Spatial editing is where the quantization or allocation of bits is changed within a frame of video whereas temporal editing is where the quantization or allocation of bits is changed over a time period. If the user selects spatial editing, flow proceeds to step 178 which inputs regions within a frame to be edited. Also inputted is the relative degree of change to be applied. For the present invention, an integer scale of −5 through +5 including zero is used to indicate the relative amount of change. A user will mark a region of video with the keyboard 32 and/or pointing device 33 and assign one of the integers between and including −5 through +5. It is also possible for the user to indicate that the previously set quantization level for a region is not to be changed. For example, if the user desires an increased bit allocation for a certain region, it is necessary that the bit allocation for other regions must be decreased. If the user sets a region to be non-changeable, also referred to as "protected", the needed bits for the improved quality area will not be taken from the protected area.

If step 176 determines that the user desires temporal editing, flow proceeds to step 180 which inputs how the time periods are to be edited. Similar to the spatial editing, for the temporal editing, the user assigns integer values between −5 and +5 indicating the relative degree of change to be applied to a particular sequence of video. The change will be effective for the entire time period which has been selected.

After either the spatial or temporal editing is performed in steps 178 and 180, step 182 re-encodes and recompresses the video scene to an MPEG-2 format, for example, according to the parameters which were manually entered. The previously encoded data is displayed next to the newly edited data on the video display monitor 61 in order for the user to closely compare how the quality has been changed.

When the operator indicates the segment to be edited, the video from the VTR 52 is transferred to the storage device 60, taking up at most half of the total available memory in the storage device 60. That segment corresponds to the "before" segment. During the edit-compression process, the bitstream is captured by workstation 20, and stored as a separate disk file from the master video bitstream file. The master video bitstream file is the compressed bitstream for the entire movie. The edit-compressed video is recorded in VTR 52. During the encoding process, the operator will be viewing the picture at the same time it is being recorded on VTR 52. Should the operator wish to view the picture after the encoding, the VTR can be used as a playback machine. Should the operator wish to do a "before-and-after" comparison, then the corresponding segment from the VTR 52 is transferred to the storage device 60, consuming up to the remaining half of the total memory of the device 60.

After this encoding, the operator makes a decision as to whether the changed video is to be kept. Should the operator decide to disregard the "after" segment, the master bitstream is left intact, and the edit-compressed bitstream is deleted. To allow the VTR 52 to reflect the master bitstream, an additional auto-compression on the edited segment is performed solely for the purpose of recording the "before" segment. The alternative of using the device 60 to transfer the "before" segment back to the VTR 52 is also possible. Should the operator decide to keep the "after" segment, then the master bitstream file must be updated to include the edit-compressed bitstream file, as discussed below.

If the user determines that the video is acceptable in step 184, the previously encoded data is replaced with the newly encoded data. This step is explained in further detail in a separate section below. After the newly encoded data replaces the previously encoded data, step 192 determines if the user desires more editing. If more editing is desired, flow proceeds back to step 174. If the user has finished editing the video, flow proceeds to step 188 which terminates the edit state.

If the user determines that the video is not acceptable in step 184, the user may exit the editing operation in step 186 so that the editing changes are not recorded or the user may re-edit the video. The video is re-edited by the users selecting new parameters in the editing. It is also possible, if the user desires, to define a new video segment to be edited.

When the user is satisfied with the compression (either auto-compression alone, or auto-compression in conjunction with edit-compression), the individual data files including the compressed video, compressed audio, and any other files are ready for formatting into the final format and the format state 106 is entered. The auxiliary data may include information such as subtitles to be included into the final formatted data file. In the flowchart illustrated in FIG. 6, after starting the format state in step 200, the workstation 20 reads the auxiliary data, should the user decide to include the auxiliary data, from the digital storage devices 22 which include, for example, a floppy disk within a floppy disk drive. Step 204 then combines the auxiliary data with the encoded audio and video to generate the final formatted file. The final digital bitstream generated by the system may be constructed as a 'Program Stream' as defined in ISO/IEC 13818-1. Alternatively, the final bitstream may be any type of format such as the direct satellite DSS format, a VBR (variable bit rate) format suitable for use on an optical disc, or any other type of format. As the encoded video and audio may be stored separately, the system allows the same encoded video and audio to be encoded into different final formats. This is accomplished either using one formatter having the capability of generating different formats or by separate formatters. Step 206 stores the formatted file onto the disk 21.

The completion state is entered in step 208 which writes the formatted file to a tape within the digital storage devices 22 in step 210. Subsequently, the exit state is entered in step 212 which performs various "house cleaning" functions which delete temporary files which are no longer needed. In the event of an abnormal exit request such as before the compression process is finished, an abort procedure will be carried out within the workstation 30 which stops the audio and video tape players and also cleans up potentially corrupted data files. The process then ends in step 216.

IV. SYSTEM ALTERNATIVES

The preferred system components and their operation have been described above and of course, alternative hardware may be substituted for the hardware disclosed in FIGS. 1A and 1B. The video encoding device 50 is preferably an MPEG-2 video encoder, if available. However, a commercially available ISO/IEC 1172-Video standard encoder otherwise known as an MPEG-1 video encoder may be used. Necessary modifications to the MPEG-1 encoder will need to be made to allow the MPEG-1 buffer management module to be controlled from an external source such as the workstation 10. Additionally, the input video support must also be augmented to include ITU-R 601 (formally CCIR 601) resolution video. Such modifications can be implemented by those skilled in the art of digital video encoding without undue experimentation.

While four audio tape players and four audio encoders have been illustrated in FIG. 1A, other configurations can be easily adopted for the audio system. For example, a commercially available 8 mm digital audio player may be used instead of a multiplicity of DAT players. Using a single TASCAM digital audio player, only a single RS-422 control signal is needed from the workstation 40 while up to eight separate audio channels can be simultaneously supported. The audio encoders must of course be able to accept eight audio inputs simultaneously and the audio interface unit 72 must also be modified to accommodate the increase in audio data streams from four to eight.

As an alternative to simultaneous audio and video encoding, the audio and video encoding can be done at separate times and/or locations and combined into the final format at a later time. This requires the use of time codes, which are known, such as the SMPTE (Society of Motion Picture and Television Engineers) time code format. The time codes are generated by a video tape player, a workstation, or a separate stand-alone time code generator.

The record VTR 52 may be eliminated if a video decoder is available and connected to the workstation 20. In that case, the reconstructed video would be generated from the disk files in disks 21 instead of being recorded from the video encoding device 50 during the compression phase. Eliminating the record VTR 52 will have a significant savings in cost of the system, both in terms of equipment as well as tape cost.

Furthermore, the ability to perform graphical operations onto the graphic overlay plane of the display video can be supported on the console display using the commercially available X-terminal option. For example, the console display 31 may be replaced with an X-terminal that is capable of displaying video with an overlay graphic window. A commercially available multimedia display terminal such as the HDSV View Station from Human Designed Systems of King of Prussia, Pa., provides the necessary features. The video from the video decoder can then be connected to the X-terminal for display and for manual editing region definition operations. The professional quality video from the video decoder should, however, be displayed on a professional monitor such as monitor 61 shown in FIG. 1A to allow the human operators to assess the quality of the reconstructed video signal.

V. REDUCING THE NUMBER OF AUDIO ENCODERS WHILE MAINTAINING OPTIMUM ENCODING EFFICIENCY

As explained above, FIG. 1A illustrates an encoding system having a multipass video encoding device 50 and four one-pass audio encoders 70a, 70b, 70c, and 70d. The playback VTR 51 supplies the video signal to be encoded to the video encoding device 50 and the digital audio tape (DAT) players 71a–71d supply the audio signals to be encoded to the one-pass audio encoders 70a–70d, respectively.

Figure 7:
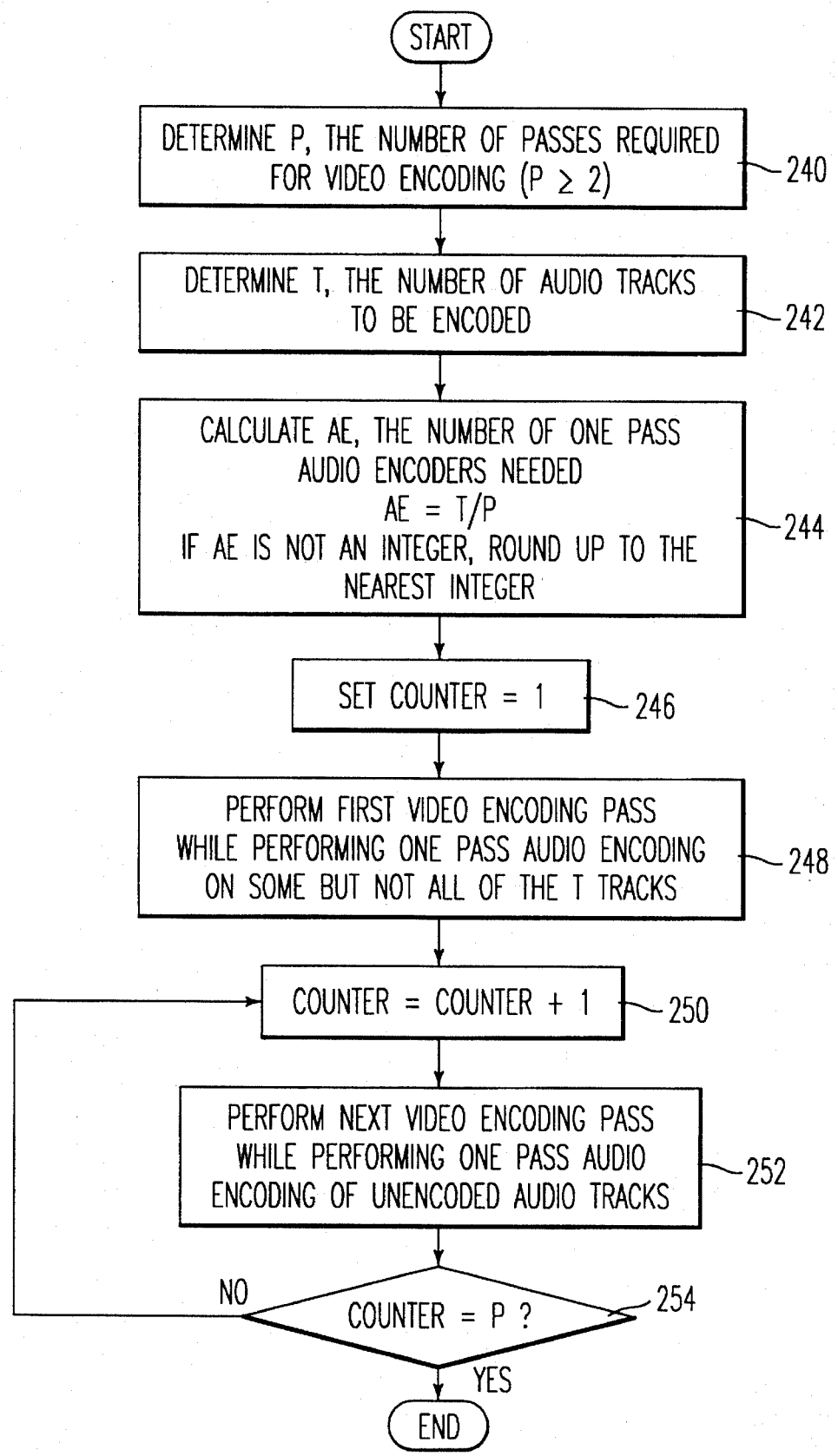
FIG. 7 is a flowchart showing how to determine the number of audio encoders needed to encode a predetermined number of audio tracks while using a multipass video encoder, and the process of simultaneously performing audio and multipass video encoding.

The preferred embodiment of the invention encodes eight audio tracks in the final formatted audiovisual data stream. Each audio track includes one or more audio channels. As an example, an audio track may include left and right channels, although the audio tracks can include audio in other arrangements. The manner of determining the number of audio encoders in order to perform the most efficient audiovisual encoding and the manner of performing this audiovisual encoding is explained in FIG. 7. In FIG. 7, after starting, step 240 determines P, the number of passes required for video encoding. In order to encode the video into an MPEG format, typically two or more passes are necessary to encode the video. For the present invention, the preferred number of passes is two but three or more passes are also possible. Step 242 then determines T, the number of audio tracks to be encoded. In the present invention, the number of audio tracks is preferably eight although different numbers of audio tracks are also possible. Next, step 244 calculates AE, the number of one-pass audio encoders which are needed to perform the most efficient audiovisual encoding. The number of audio encoders necessary is equal to the number of audio tracks to be encoded divided by the number of passes required for the video encoding. In the preferred embodiment, eight audio tracks divided by two passes for the encoder is equal to four audio encoders necessary. If the calculated number of audio encoders is not an integer, it is necessary to round up the calculated number of audio encoders to be an integer. For example, if only seven audio tracks are to be encoded for a two-pass video encoder, 7/2=3.5, and 3.5 rounded up to the next highest integer is 4. During the encoding process performed by this system, one video pass uses only three of the audio encoders while the other video encoding pass uses all four audio encoders. It is to be noted that steps 240–244 may only need to be performed upon the initial designing of the system, and it is not necessary to calculate the number of one-pass audio encoders needed every time an audiovisual work is to be encoded. Further, steps 240, 242 and 244 are either computer/machine implemented by a computer such as workstation 30, or may be determined by a user or designer of the audiovisual encoding system.

After the number of audio encoders has been determined and the audiovisual encoding system is set up, the audiovisual encoding process may begin. Step 246 sets COUNTER equal to one. COUNTER is a variable used to count each pass of the video encoding system. Step 248 then performs the first video encoding pass while performing one-pass audio encoding on some, but not all, of the audio tracks. For example, if there are eight audio tracks and a two-pass video encoder, four audio encoders may be used during the first pass. Step 250 then increments the COUNTER by one. Step 252 performs the next video encoding pass while performing the one-pass audio encoding of unencoded audio tracks using the same audio encoders which were used in step 248. For example, during the second video encoding pass, the four audio encoders used in step 248 can encode audio tracks five through eight. Step 254 then determines if COUNTER is equal to P, the number of required video encoding passes. In the preferred embodiment, there are only two video encoding passes and therefore, the process would end. Otherwise, flow returns back to perform the loop of steps 250, 252, and 254.

Of course, other embodiments are possible besides using a two-pass video encoder for an audiovisual work which has eight audio tracks. For example, a three-pass video encoder may be used with six audio tracks. In this situation, the most efficient number of audio encoders is three (6/2=3). If a two-pass video encoder were used and a total of six audio tracks were to be encoded, the most efficient number of audio encoders would be three. As an alternative, a three-pass video encoder may by used in a system in which there are five audio tracks to encode. This alternative system requires two one-pass audio encoders with any one of the video encoding passes operating while only one of the audio encoders is used and the other two video encoding passes occurring while both of the audio encoders are being used. Of course, other combinations of video encoders and numbers of audio tracks are possible as will become apparent to one of ordinary skill, in light of the teachings contained herein.

An important aspect of the present invention in being as efficient as possible is to always perform audio encoding when a pass of the video encoding is occurring and to always perform a pass of the video encoding when the audio encoding is occurring. In this arrangement, at least some of the audio encoders will always be used during each pass of the video encoding operation. To be as efficient as possible, when the number of audio tracks is not evenly divisible by the number of audio encoders (i.e., there is a remainder when the number of audio tracks to be encoded is divided by the number of video passes), during the entire encoding process, there will be a number of audio encoders idle which is equal to the number of video passes minus the remainder. For example, for a three pass video encoder and four audio tracks, two audio encoders are needed and there is a remainder of 1 (e.g., 4/3=1 with a remainder of 1). Therefore, to be as efficient as possible and complete the audio encoding at the same time the three pass video encoding is completed, there can be no more than two (e.g., 3 video passes minus a remainder of 1 is equal to 2) times that the audio encoders are idle. The two times that the encoders are idle may occur in the same pass (there are two different audio encoders idle in the same video encoding pass) which would means that the other two video encoding passes in the above example each utilize all of the audio encoders, or there may be two video encoding passes in which there is one idle audio encoder. In these two passes, the same or different audio encoders may be idle.

VI. LOG FILES FOR STORING INFORMATION OF THE ENCODED VIDEO, AND LOG INTERPRETER UTILITIES TO ACCESS THE LOG FILES AND THE ENCODED VIDEO

The disclosed encoding system initially encodes video into a compressed digital format such as MPEG-2, MPEG-1, or other digital video encoding format. This encoding is described above in section II pertaining to the system components and section III pertaining to the general system operation. The encoded video data is then stored in a digital format on a hard disk, for example.

During the digital video encoding process, statistics and other information of the video are generated and stored in log files. One of ordinary skill in the art who is familiar with MPEG video encoding is familiar with the type of statistics and information which describe the video and how to generate these statistics and information. In a conventional encoding system, information and data of this type is generated but ordinarily discarded after the video encoding. However, for the present invention, this information which has been generated such as the total bits used to code a picture, the mean squared error encoding a picture, the mean quantizer scale for each picture, etc., is dumped from system RAM to log files after the encoding process. Examples of log files used by the present invention are illustrated in FIGS. 8A–10B. These log files are particularly useful in a VBR system and are generated during an initial pass (passes) of the video encoder. The log files are then used during the final encoding pass and during later editing and re-encoding of the video.

There are three different types of log files which may be used by the present invention; a sequence layer log file, a picture layer log file, and a macroblock layer log file. Each of these log files describes statistics and information of its respective layer. There are two different types of macroblock layer log file formats; the full format illustrated in FIG. 10A and a short format illustrated in FIG. 10B. The full format is used when detailed information of the macroblock layer is desired and a short format is used when it is not necessary to keep track of all of the details of the macroblocks. Due to the large number of macroblocks in a two hour movie, the macroblock log files will consume a large amount of storage space. Therefore, unless a large storage space is available, it may not be possible to store the full or short format macroblock files. However, if it is necessary to obtain the macroblock information, it can be reconstructed by decoding the encoding video or by other means.

It is to be noted that many of the details of the log file formats illustrated in FIGS. 8A–10B are unimportant and these file formats have been provided simply as illustrations of the data which may be generated during the encoding process. However, some of the information in the log files is important as it is used during the process of changing the quality of the video. As will be explained below, in order to determine an edit point of the encoded video, it is necessary to sum the number of bits consumed by earlier pictures. The information which is summed up is illustrated in FIGS. 9B and 9C and pertains to the number of bits for each picture (generated_bit_picture), the number of bits for the sequence header (bits_sequence_header), the number of bits for the group of pictures (GOP) header (bits_GOP_header), and the number of bits used as stuffing or bits used to fill space (stuffing_size).

Figure 11:
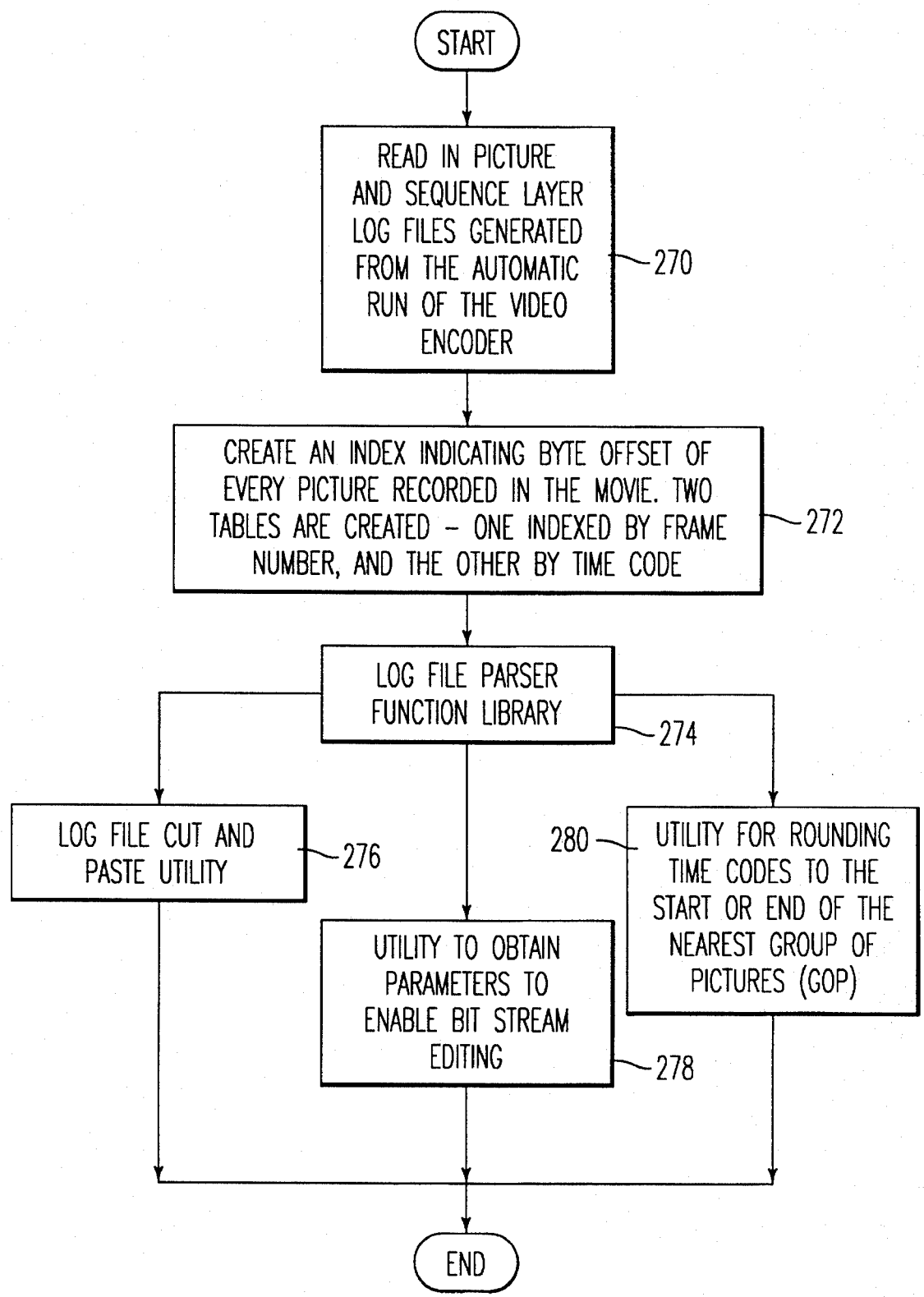
FIG. 11 illustrates a process for utilizing the information within the log files.

FIG. 11 illustrates a flowchart of different functions which are performed using the log files. After the initial encoding of a video segment, step 270 reads in the picture and sequence layer log files generated from the automatic run of the video encoder which are illustrated in FIGS. 8A–9C. Step 272 then creates an index table indicating the byte offsets of the log file records for every picture recorded in the encoded video. Two tables are created; one indexed by frame number and the other by time code. The time code index table contains the byte offset into the log file of each picture and is sorted in the increasing order of time codes. Similarly, the picture frame index table contains the byte offsets into the log file which are sorted in the increasing order of input picture numbers (as seen by the encoder).

The generated index tables help to quickly pick out the log information of any desired picture or macroblock. Although fixed size records are used to store the sequence, picture or macroblock data within the log file, the encoder re-orders the incoming pictures prior to coding them. In addition, when dealing with a movie (24 frames per second) source that has been 3:2 pulled down to 30 frames per second, certain time codes are skipped. The index tables provide a means to quickly locate the appropriate data despite the reordering of pictures and the skipping of time codes.

It is to be noted that the present encoding system does not maintain a directory or index of the number of encoded bits used in coding each picture as the encoded video will frequently change as various frames and time periods of the video have their quality manually altered. However, the log files describing the information of the encoded video are fixed size records and therefore, it is easy to maintain a directory or index of the information within the log files, even when the quality of the pictures or time periods is altered.

After the creation of the index tables, step 274 allows a user to quickly obtain various information from the log files using various log file utilities illustrated in blocks 276, 278, and 280. When records in the log files are needed, the created index is used to determine the desired record in the log file and the complete record is pulled out of the log file. This record is then parsed for retrieving the individual parameters which are desired. The process of parsing individual records with the help of index tables is the basis for all of the other log interpreter utilities. Parsing processes are known and one of ordinary skill in the art knows how to retrieve desired information from an organized file.

Step 276 is the log file cut and paste utility. After manually changing the quantization (and picture quality) within a frame or over time periods, the original set of log files needs to be updated to correspond to the changes which occurred during editing. The log file cut and paste utility locates offsets in the log files corresponding to the edited segment time codes and replaces the information in the log files with new information corresponding to the re-encoded video. The process of re-encoding is explained below in section VIII.

Step 278 illustrates a utility to obtain parameters to enable editing of the digitally encoded bitstream. After the video is initially encoded and a user desires to alter the quality of frames or a time period of the video, it is necessary to determine the appropriate parts in the encoded video which are to be removed and replaced with the newly encoded video having the desired quality.

The byte offsets for the edit points in the bitstream of the encoded video are determined by calculating a cumulative tally of the bytes used to encode each picture up to the pictures corresponding to the edit point. In order to determine the total number of bytes or bits from the beginning of the file at which a specific picture is located, the number of bits used to encode each of the previous pictures is summed. The information which is obtained from the picture log file which is summed are the number of bits $B_i$ used to encode the $i^{th}$ picture, the number of bits $S_i$ comprising the sequence header, the number of bits $G_i$ used to encode the Group Of Pictures (GOP) header, and the number of bits Ti used as stuffing. The bit offset for the Nth picture is calculated as $$\sum_{i=1}^{N=1} (B_i + S_i + G_i + T_i) \qquad (1)$$

The byte offset is simply calculated by dividing the bit offset by eight. As an alternative to the use of the log files to determine the address offset in the encoded video bitstream, a bitstream decoder could be used to create a directory of picture offsets. However, this approach is cumbersome as the decoder has to run through the entire bitstream after each edit in order to update the directory.

Finally, step 280 illustrates a utility for rounding time codes to the start or end of the nearest Group Of Pictures (GOP). All cutting of the encoded bitstream or edits are performed at the boundaries of a Group Of Pictures (GOP). However, the GOP boundaries are unknown to the operator performing edits on the video. Once the operator specifies the edit segments start and end points, the system computes the GOP boundaries. The GOP boundary is established by looking at the picture layer parameter called GOP number stored within each picture record. By tracing through successive records of the picture layer log file, when the GOP number (GOP_number) in FIG. 9B changes, there is determined to be a GOP boundary.

As the log files and log file utilities are closely related to video encoder, the log files are stored in a hard disk in the workstation 10 illustrated in FIG. 1A and the log file utilities are executed by the workstation 10. Alternatively, workstation 30 or any other processing system may contain the log files and execute the log file utilities.

VII. CHANGING THE QUALITY OF THE ENCODED VIDEO

A. Changing the Quality Over Periods of Time

The encoded video produced by the encoding system is intended to be written to a final digital storage medium such as an optical disc. The encoded video on the disc is encoded at a Variable Bit Rate (VBR) which affords the possibility of large changes in bit rates among the different sections of video, as compared to Constant Bit Rate (CBR) operation. As the VBR coding allows a significantly different number of bits to be assigned to different pictures, the picture quality can be varied over time. Further, VBR affords the possibility of reassigning data rates to some user-defined sections of video in a scale not possible with CBR operation. Extremely large buffers would be required at the decoder to accomplish the same with CBR.

The encoding system allows what shall be referred to as manual editing but the manual editing is not the shortening or lengthening of scenes or substituting different scenes in a movie but is the changing of the picture quality. The picture quality may be changed over time and is referred to as temporal editing or temporal manual editing as will be discussed in this section. Another section will discuss the changing of picture quality within frames of data by shifting bits from one section of a frame to another section of a frame and will be referred to as spatial editing or spatial manual editing.

Three major constraints need to be satisfied in temporal editing or the re-allocation of bits among the various sections of an edit segment. These are:

1. The total capacity for the movie/video that is edited does not exceed the allocated capacity;
2. There is no buffer underflow within the edit segment; and
3. There is no buffer underflow outside of the edit segment caused by the temporal editing.

Constraint 1 is handled by re-encoding the edit segment such that resulting edited segment consumes the same number of bits as the originally encoded segment. It is to be noted that an edit segment is the entire time period under consideration. Different periods within the edit segment are assigned qualities by a user and these periods of the edit segment are referred to simply as sections or time periods.

In order to determine if an underflow condition will exist, it is necessary to check the target bits using a model of the decoder. In VBR operation of the encoder, a modified version of the Video Buffer Verifier (VBV) model is used. This model is referred to as the simple modified model for VBR and may be used for a Digital Storage Medium (DSM). The VBV for VBR mode is known and defined in the MPEG-2 standard and may be specifically found at ISO/IEC 13818-2, Annex C, section C.3.2.

In the VBV model for the VBR, the buffer of the decoder may remain full but is restricted from underflowing. In addition, the buffer fills up at a constant rate, $R_{max}$, until the buffer is full and then no bits are transmitted to the buffer until the buffer begins to empty. At every frame interval, the bits required to decode one frame are removed from the buffer. With this in mind, it can be seen that in a VBR mode, buffer underflow is caused by allocating too many bits to a series of pictures. As the bits of the pictures are removed from the buffer, the buffer becomes empty and underflows if large numbers of bits of high quality pictures are removed at a rate faster than the buffer can be filled. To prevent underflow, the number of bits used to encode a picture is reduced. Reducing the number of bits for a picture reduces the rate at which bits are removed from the buffer while keeping the fill rate the same. Buffer overflow cannot occur for VBR because if the VBV occupancy is full, then the bitstream transmission to the VBV buffer is immediately stopped. This means that there is no buffer overflow but simply a buffer full situation. The simple modified VBV model for VBR, as explained in ISO/IEC 13818-2, Annex C, Section C.3.2 is as follows:

1. bit__rate field at sequence__header represents the max__bit__rate.
2. The VBV is initially empty. After filling the VBV buffer full (i.e., VBV buffer size) at the rate of max__bit__rate, the decoding process begins. The picture data is immediately removed and decoded like CBR's VBV model defined in the MPEG-2 International Standard.
3. The bitstream is placed into the VBV buffer at the rate of max__bit__rate until the VBV buffer is full. If the VBV buffer occupancy is full, then the bitstream transmission to the VBV is immediately stopped. After the data for the next picture is removed, the bitstream transmission immediately starts.
4. The VBV buffer shall not underflow.
5. Every vbv__delay field is set to FFFF.

Changing the quality of the video over periods of time requires adding or removing bits from frames of video. An explanation into the number of bits that may be added or taken away from a section of video will now be provided. The number of bits which may be added or taken away from a section of video depends on the effective bit rate of the section of video under consideration. The effective bit rate, R, is calculated as:

$$R = (\text{Total Allocated Bits}/\text{Number of Frames}) * \text{Frame\_Rate} \quad (2)$$

Because the total number of allocated bits is directly proportional to the bit rate, referring to the number of allocated bits conveys the same meaning as the bit rate, except with different units. Assuming that a guaranteed minimum rate is applied to any section of video, say $R_{min}$, then the maximum number of bits that may be taken away from section 'i' is:

$$T_i = (R_i - R_{min}) * N_i / \text{Frame\_Rate} \quad (3)$$

where Ni is the number of frames in section 'i', and $R_i$ is the effective rate of the same section. The guaranteed minimum is required in order to assure some minimum quality level for the section. Similarly, the maximum number of bits that may be added to a given section 'j' is calculated as:

$$T_j = (R_{max} - R_j) * N_j / \text{Frame\_Rate} \quad (4)$$

where $R_{max}$ is the maximum rate, or the rate at which the buffer fills up when not full and $N_j$ is the number of frames of section j.

A description of the changing of the picture quality over time periods (temporal editing) will now be given with respect to FIG. 12 and the Figures referenced therein. After starting, step 281 performs an automatic video encoding without any user intervention, as described above in sections II and III. It is to be noted that for the automatic encoding, there is a maximum and minimum rate of the generated data stream. The maximum bit rate is determined by the capabilities of the video decoder and $R_{max}$ is, for example, 8 Mbits/sec. The minimum bit rate may be specified by the user, depending on the minimum picture quality desired. A typical minimum bit rate $R_{min}$ is 3 Mbits/sec. It is desirable to set $R_{min}$ to be different from and somewhat below the average encoding rate in order to allow portions of the video to have a lower bit rate and portions of the video to have a higher bit rate. If $R_{min}$ is set slightly below the average encoding rate of the video, the resulting encoded video will have a fairly constant quality. Typically, if $R_{max}$=8 Mbits/sec and $R_{min}$ is approximately 3 Mbits/sec, the average value of the video should be around 3½ to 5 Mbits/sec.

After the automatic video encoding is performed in step 281, it is necessary to determine a rate-quantizer function. The process of the invention determines how many bits are necessary to obtain a desired quality but when re-encoded, a quantizer value must be set in order to result in the desired bit rate. The rate-quantizer function may be calculated as in a conventional manner such as described in the articles "Bit Allocation for Dependent Quantization with Applications to Multiresolution and MPEG Video Disclosures" by Ramchandran et al from IEEE Transactions on Image Processing, Vol. 3, No. 5, September, 1994, pp. 533–545, "Bit Allocation for Dependent Quantization with Applications to MPEG Video Coders" by Ramchandran et al, IEEE ICASSP, 1993, pp. V-381-V-384, and "Joint Multi-channel Bit-Rate Control for Multiplexed MPEG Video using Rate-Distortion Curves," by Reininger presented , at a Princeton video conference, 1994, each of which is incorporated herein by reference.

Next, step 284 inputs the user quality settings for selected time periods. The user inputs priorities for different sections which are ultimately used to control the quantization of the pictures. The quantization controls the picture quality, also referred to as resolution, for lossy MPEG encodings. FIG. 13 illustrates a user interface which is used in order to gather the information to change the quality of the video over periods of time. Initially, a user will enter the time period for the entire edit segment over which the quality is to be changed. The input of this information is not illustrated in the user interface of FIG. 13 but is inputted before the user interface of FIG. 13 is displayed. For the example illustrated in FIG. 13, the time period for the edit segment which is to be changed may be, for example, time 0 minutes to time 5 minutes. After the user has described the total time period of the edit segment, then smaller time periods within the edit segment are assigned different priorities in the range of −5 through +5 including a priority P, indicating that the quality of this time period is protected and should not be altered. Priority "none" is synonymous with a priority of P. Of course, the encoding system is not limited to the above input scheme and other ranges or symbols may be used to input the user's desired priorities.

In addition to assigning priorities, the user will also enter the minimum bit rate. This bit rate may be different than the minimum bit rate used to encode the video during the automatic video encoding of step 281. Another feature of the user interface is that it allows the user to set a "background priority" which means that time periods within the selected time period which are not assigned a priority by the user have this background priority. For example, in FIG. 13, if the background priority were assigned "1" the unspecified time period 00:03:20:01 through 00:03:59:99 would automatically be assigned a priority of "1" without the user having to manually assign the priority for this particular section.

On the bottom of the interface illustrated in FIG. 13, the "insert" block is used to create a new time period within the edit segment, the "recall" block is used to alter a previously created time period, "update" is used to save the changes made to a time period, and "delete" is used to delete a time period.

It is important to remember that the ultimate digital storage medium for the encoded video such as an optical disc has a limited storage capacity which ideally will be filled to capacity if the automatically encoded data were written to the disc. Therefore, whenever the picture quality is increased and the bit rate for a particular time period is increased, there must be a section of the video which has its quality reduced in order to supply the necessary extra storage capacity to the time period which has its quality increased. Accordingly, it is not possible in the preferred embodiment of the invention to assign only one period a high picture quality without assigning another time period with a different picture quality because the bits necessary to increase the quality must be taken from another section of the video. The segment of video which has been edited therefore should have at least one section which has a priority which is different from the background section and not marked as a "protected" section in order for the temporal manual editing to properly operate. Additionally, the user selected priorities do not result in the same quality and bit rate every time they are selected but the quality of a particular section also depends on the assigned priorities for other sections and the lengths of the other sections, as will become apparent upon understanding the process to determine the modified number of bits for the pictures within the edit segment.

A feature utilized by the present encoding system is that during the automatic encoding process or at a later time, a viewer may review the encoded video. As the encoded video is being displayed to the viewer, the viewer may perform a function such as pressing the return key or "clicking" a graphical user interface on a "button" displayed on the screen in order to store points or regions of interest of the video without the need to stop the video or write down the time code of interest. These points of interest can be later called-up by the user and studied closely without the need to review the entire movie. This provides a convenient and efficient manner of determining points within the encoded video which a user may desire to change. This function is accomplished by storing a time code corresponding to the position within the encoded video of when the point or region of interest occurred.

Figure 14:
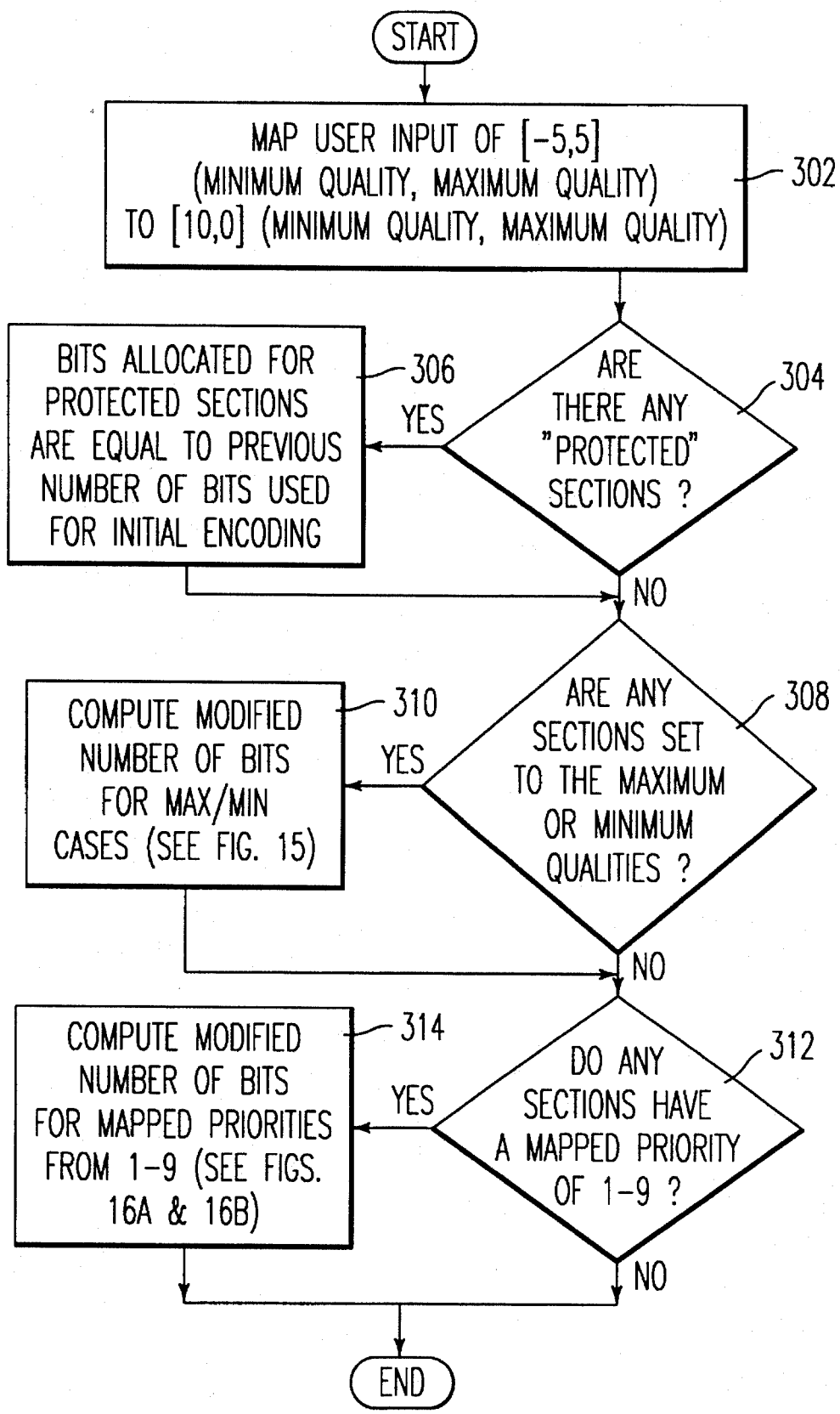
FIG. 14 illustrates the general procedure for calculating the number of bits associated with the desired picture quality.

After the user inputs the desired quality settings in step 284, step 286 computes the modified bits for each frame based on the user's input. This process is described in detail with respect to FIGS. 14–16B. The general procedure for changing the bit rates of the time periods within the edit segment of video is illustrated in the flowchart of FIG. 14. In order to compute the bit rate based on the user's input, step 302 maps the user's input which was in the range between −5 and +5 to the range between 10 and 0. The initial input of −5 corresponds to the mapped setting of 10 and is the minimum quality and the input of +5 corresponds to the mapped setting of 0 and is the maximum quality. Similarly, an input quality selection of 0 corresponds to a mapped setting of 5, etc. The purpose of the mapping performed in step 302 is that the number of bits allocated is proportional to e (2.71828. . . ) raised to a power of the quantity −1 multiplied by the mapped setting. In this case, $e^{-10}$ is less than $e^0$ so that the number of bits for the smaller priorities settings is less than for the larger priorities. The process of determining target bits corresponding to priorities of −4 through +4 is explained in detail in FIGS. 16A and 16B.

Step 304 determines if there are any "protected" sections. A protected section is a section in which the quality of the picture should not be changed from the previous automatic encoding. If there are protected sections, flow proceeds to step 306 in which the number of bits which is allocated for the re-encoding of the protected sections is set to be equal to the previous number of bits resulting from the initial automatic encoding. In this manner, the picture quality of the protected sections will not change.

Step 308 determines if there are any sections which are set to the maximum or minimum qualities. The maximum quality corresponds to a user input of +5 and the minimum quality corresponds to the user input of −5. For the maximum and minimum picture qualities, it is desired to obtain encoded video which has the highest and lowest quality video, respectively, while still satisfying the video buffer constraints and not exceeding the storage capacity of the medium containing the encoded video. If there are sections which are set to the maximum or minimum qualities, flow proceeds to step 310 which computes the modified number of bits for the maximum or minimum cases. This process is shown in detail in FIG. 15.

Figure 15:
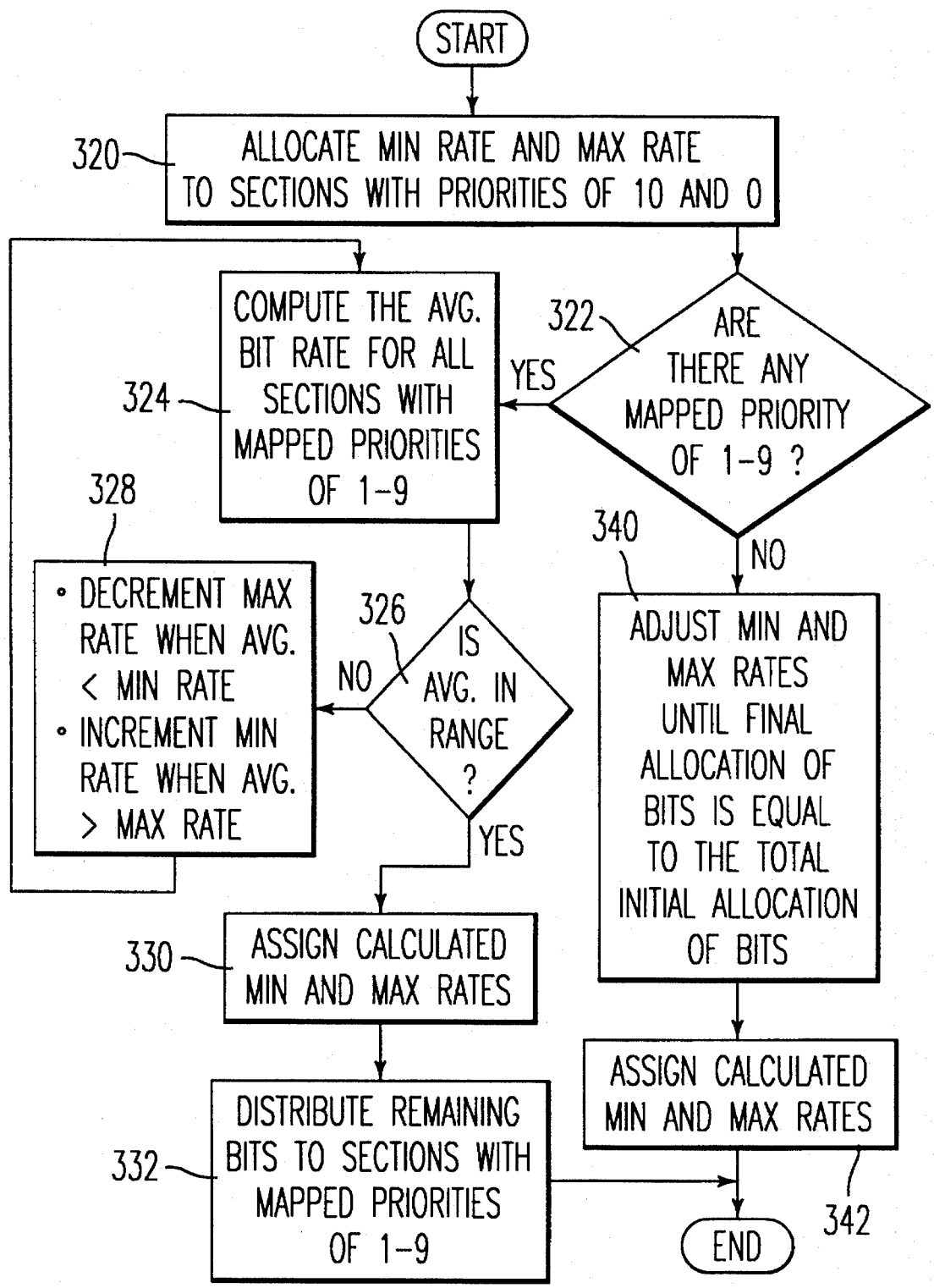
FIG. 15 illustrates the process used for processing sections having maximum or minimum user selected priorities.

In FIG. 15, the process of determining the number of bits allocated for the maximum and minimum cases begins in step 320 by allocating the minimum and maximum rate to sections of the video assigned to mapped priorities of 10 and 0, respectively. Step 302 of FIG. 14 performed this mapping and the remainder of the description of the temporal editing, unless specifically stated otherwise, will refer to the mapped priorities. The maximum data rate, as previously described, is limited by the ability of the decoder and may be 8 Mbits/sec and the minimum data rate is input as illustrated by the user interface in FIG. 13 and may go below or higher than the minimum bit rate used during the autoencoding mode which typically may be 3 Mbits/sec.

Step 322 then determines if there are any sections having a mapped priority of 1 through 9. This means that in addition to there being a maximum or minimum quality assigned, there are other intermediate qualities assigned by the user. If there are other mapped priorities, flow proceeds to step 324 which computes the average bit rate for all sections with mapped priorities between 1 and 9. If this average is not in a permissible range (between the maximum and minimum bit rates), flow proceeds to step 328. In step 328, the maximum rate, the rate providing the highest picture quality, is reduced when the average is less than the minimum rate. By reducing the maximum rate, more bits will be available for the non-maximum and non-minimum situations (mapped priorities of 1–9), thereby placing the average within or closer to the desired range. Alternatively, in step 328, if the average is greater than the maximum rate, the minimum data rate is increased, thus reducing the number of bits for the non-maximum and non-minimum situations (e.g. priorities of 1–9). After step 328, flow returns to 324 where the loop of steps 324, 326 and 328 is repeated until the average is in range. Additionally, the maximum and minimum bit rates are adjusted to ensure that the "Protected" sections receive the same bits as before the adjustment of quality.

Once the average is determined to be in range in step 326, flow proceeds to step 330 which assigns the calculated minimum and maximum rates to the sections having the mapped priorities of 10 and 0, respectively. The remaining bits are then distributed in step 332 to sections which are not protected nor maximum or minimum situations. The sections of video having the mapped ranges of 1–9 and the manner of changing the data rates are described later with respect to FIGS. 16A and 16B.

If step 322 determines that there are not any sections having mapped priorities of 1–9, meaning there are only maximum, minimum or protected sections, step 340 adjusts the minimum and maximum rates, as necessary, until the final allocation of bits is equal to the initial allocation of bits from the automatic encoding. There are two alternative manners of performing step 340. First, the maximum bit rate $R_{max}$ is fixed, for example, at 8 Mbits/sec. The total bits for the overall edit segment is known and therefore, $R_{min}$, the minimum data rate is simply adjusted in order to achieve the same total number of bits as were obtained during the automatic encoding. If it is not possible to adjust $R_{min}$ to achieve the previous number of total bits, then the maximum data rate, $R_{max}$ is adjusted in order to achieve the total number of bits as were obtained during the automatic encoding.

Figure 16A:
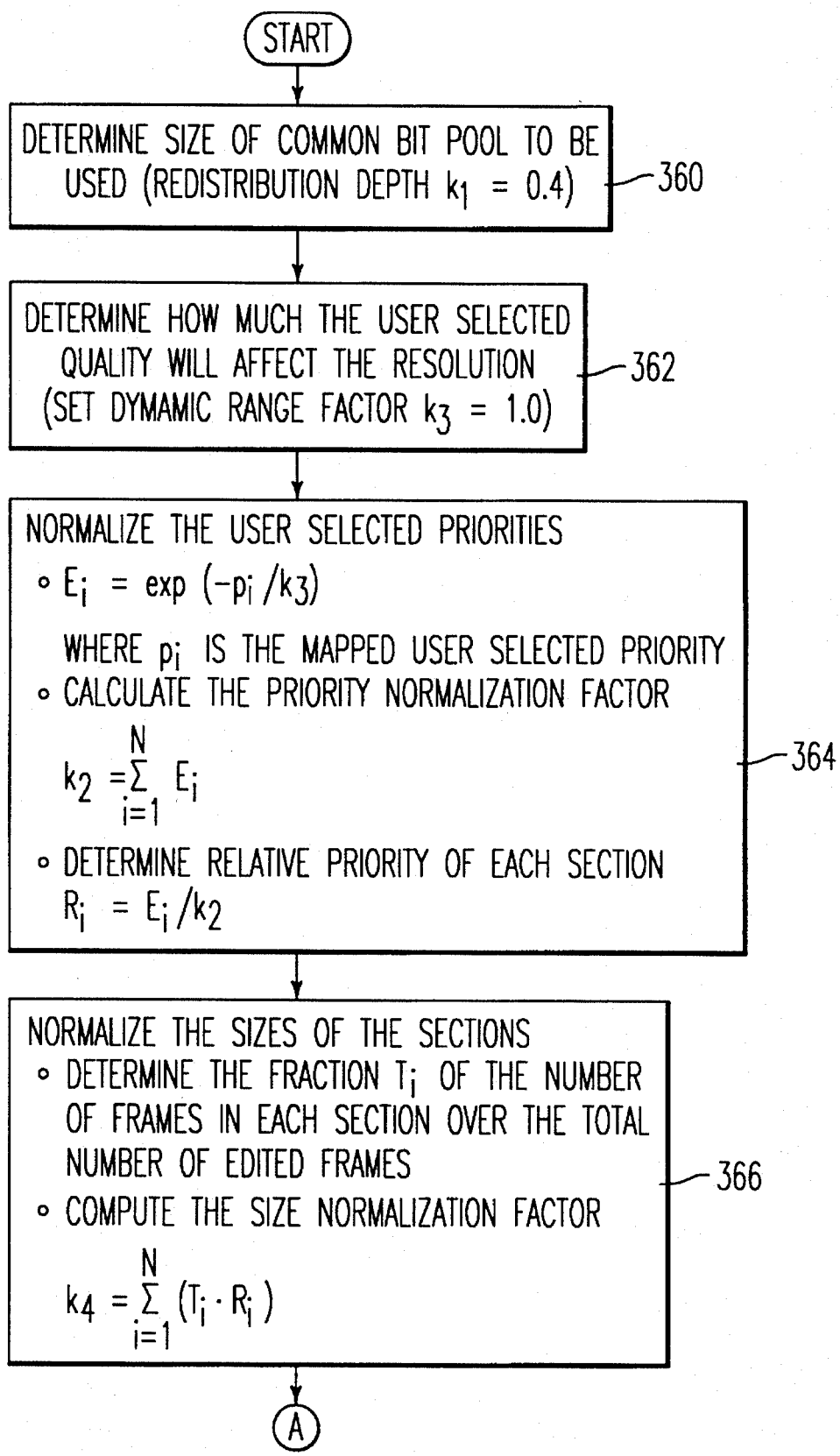
FIGS. 16A and 16B illustrate a flowchart for calculating the number of bits corresponding to desired picture qualities which are not maximum or minimum priorities.
Figure 16B:
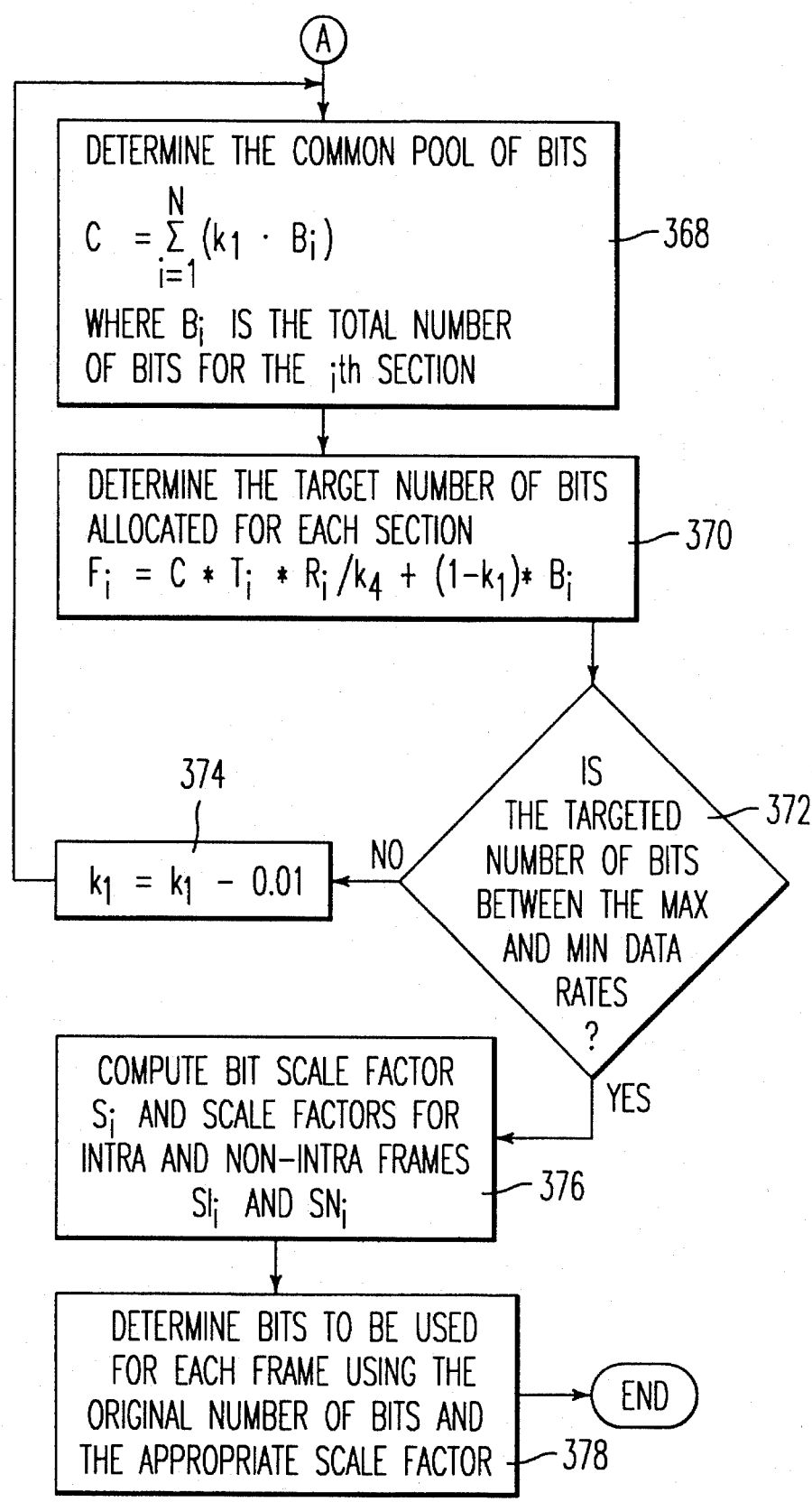

As an alternative, step 340 assigns the maximum quality section with a priority of 1 and the minimum quality section with a priority 9 and perform the bit allocation algorithm illustrated in FIGS. 16A and 16B to determine the new bit rates for the time periods of the edit segment. Step 342 then assigns the data rates calculated according to FIGS. 16A and 16B, which are explained below, to the sections having the lowest and highest assigned qualities and the process of FIG. 15 ends.

After step 308 and step 310, if necessary, are performed, step 312 determines if any sections have a mapped priority of 1-9. If this is the case, flow proceeds to step 314 which computes the modified number of bits for the mapped priorities of 1-9 as described in detail in FIGS. 16A and 16B.

The first step in FIG. 16A is to determine the size of a common bit pool to be used. Initially, all sections with a mapped priority of 1-9 which are not protected have a certain number of bits removed. A factor $k_1$, called the redistribution depth, is used for this purpose and for example, is set to 0.4 which means that 40% of the previously allocated bits (i.e. from the automatic encoding run) are to be removed from every section which is not protected nor marked with the maximum or minimum quality.

Next, step 362 determines how much the user selected quality will affect the quality. A variable $k_3$, called the dynamic range factor, is set and determines the quality change which will result from the priorities. Depending on how $k_3$ is set, a priority of 2, for example, may impose different quality changes such as a relative small increase in quality or a relatively large increase in quality. Typically, the dynamic range factor $k_3$ is set to 1.0.

To use the user selected priority on the redistribution of bits, an exponential relationship of the form $\exp(-\text{priority}/k_3)$ is used. The dynamic range factor, $k_3$, in the exponent determines the shape of the exponential curve. The curve gets steeper for larger values of the dynamic range factor, effectively increasing the disparity in bits reallocated among the sections with varying priorities. This negative exponential means that as the absolute value of the mapped priority increases (lower priority sections), the bits allocated to that section decrease, i.e., mapped priority of one has the highest priority and increasing numbers up to nine have a lower priority.

Step 364 normalizes the user selected priorities. This means that the user selected priorities are used to determine the relative priority of each section. First, $E_i$ is calculated.

$$E_i = \exp(-p_i/k_3) \quad (5)$$

where $p_i$ is the mapped user selected priority and i is the section time period number within the edit segment, excluding the time periods which are protected or have a maximum or minimum quality. Next, the priority normalization factor $k_2$ is calculated such that $$k_2 = \sum_{i=1}^{N} E_i \quad (6)$$

where N is the number of section. The priority normalization factor is needed to ensure that the sum of all bits reassigned according to the priorities always equals the available common pool of bits.

The relative priority of each section is then calculated as $$R_i = E_i/k_2 \quad (7)$$

As $R_i$ is the relative priority fraction for the $i^{th}$ section, the summation of all $R_i$ will be unity.

Step 366 then normalizes the sizes of the sections. This is necessary as the time periods with the assigned priorities have different sizes and the bits should be distributed in proportion to the size of the different sections. First, the fraction $T_i$ of the number of frames in each time period over the total number of edited frames (frames with a nonprotected non-max or non-min priority) is determined according to $$T_i = N_i/N \quad (8)$$

where $N_i$ is the number of frames in the $i^{th}$ time period, and N is the total number of frames in the edit segment; that is all frames which are being altered and assigned a priority which is not protected and not a maximum nor minimum priority. Then, the size normalization factor $k_4$ is calculated according to the equation $$k_4 = \sum_{i=1}^{N} (T_i * R_i) \quad (9)$$

where N is the number of sections. From step 366 in FIG. 16A, flow proceeds to step 368 in FIG. 16B.

In FIG. 16B, step 368 determines the common pool of bits according to the equation $$C = \sum_{i=1}^{N} (k_1 * B_i) \quad (10)$$

where $B_i$ is the total number of bits which were used during the automatic encoding procedure of the $i^{th}$ section plus any bits distributed in step 332 of FIG. 15. The summation is over 'N' sections.

Step 370 then determines the target number of bits allocated for each section according to the equation $$F_i = C * T_i * R_i/k_4 + (1-k_1) * B_i \quad (11)$$

The target number of bits for each section $F_i$ is equal to a percentage of the common pool of bits plus the original number of bits ($B_i$) reduced by the bits given to the common pool of bits. The percentage of bits from the common pool of bits is based on the fraction of the total number of frames of each section ($T_i$), the relative priority of the section ($R_i$) and the size normalization factor ($k_4$) which is dependent on the priority of a section multiplied by its corresponding fraction of frames summed for each of the sections.

It is possible that the target number of bits allocated for each section as computed in step 370 is not between the maximum and minimum data rates. If this is the case, step 372 reduces the redistribution depth $k_1$ by 0.01 and flow returns to recalculate the common pool of bits in step 368 and to recalculate the target number of bits in step 370. The loop of steps 368, 370, 372 and 374 is performed until the targeted number of bits calculated in step 370 is between the maximum and minimum data rates.

Step 376 then computes the bit scale factor Si and the scale factors for intra and non-intra frames $SI_i$ and $SN_i$, respectively. Intra and non-intra frames require different number of bits to obtain the desired quality. First, the bit scale factor Si is calculated according to the equation $$S_i = F_i/B_i \quad (12)$$

Next, the scale factors for the intra and the non-intra pictures are calculated. The intra scale factor $SI_i$ is calculated according to the equation $$SI_i = S_i - (I_f * S_i') \quad (13)$$

Large intra frames can potentially cause buffer underflow and the intra factor $I_f$ provides a safety factor by limiting the variation in the bit assignment of the intra pictures to 20% when $I_f=0.8$ (i.e., $SI_i$ is limited to the range $0.8 < SI_i < 1.2$). Note that $S_i' = S_i - 1.0$. The non-intra bit scale factor $SN_i$ is computed as $$SN_i = S_i - (-I_f * S_i' * BI_i / BN_i) \quad (14)$$

where $BI_i$ and $BN_i$ are the total intra and non-intra bits summed over the $i^{th}$ section by picture type.

Finally, the number of bits to be used for each frame is determined using the original number of bits multiplied by the appropriate scale factor (either the intra or non-intra scale factor). The process of FIG. 16B (and also FIG. 14) then ends.

Figure 12:
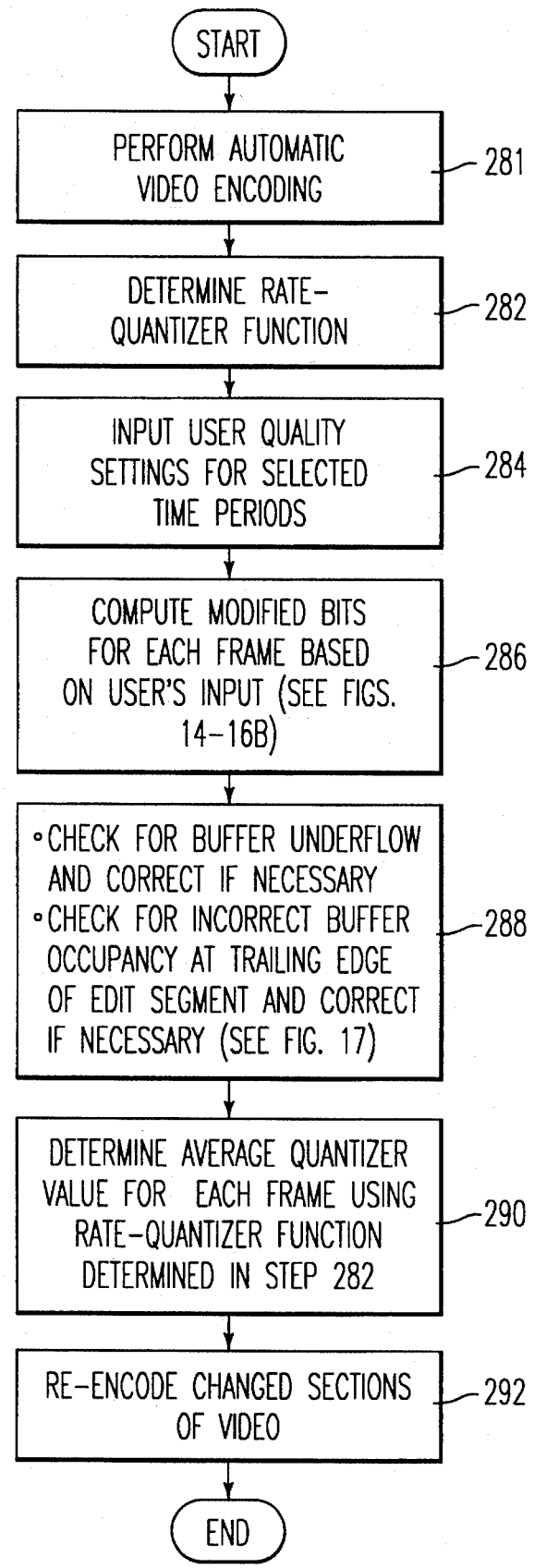
FIG. 12 illustrates the general process performed during the manual adjustment of picture quality for different time periods.

At this time, the modified number of bits for each frame has been calculated and step 286 of FIG. 12 is complete. However, it is possible that the changed number of bits for the frames may cause buffer underflow or the occupancy of the number of bits at the trailing edge of the edit segment has changed so that subsequent frames outside of the edit segment will underflow. These situations are examined and corrected, if necessary, in step 288 of FIG. 12 which is detailed in FIG. 17.

Figure 17:
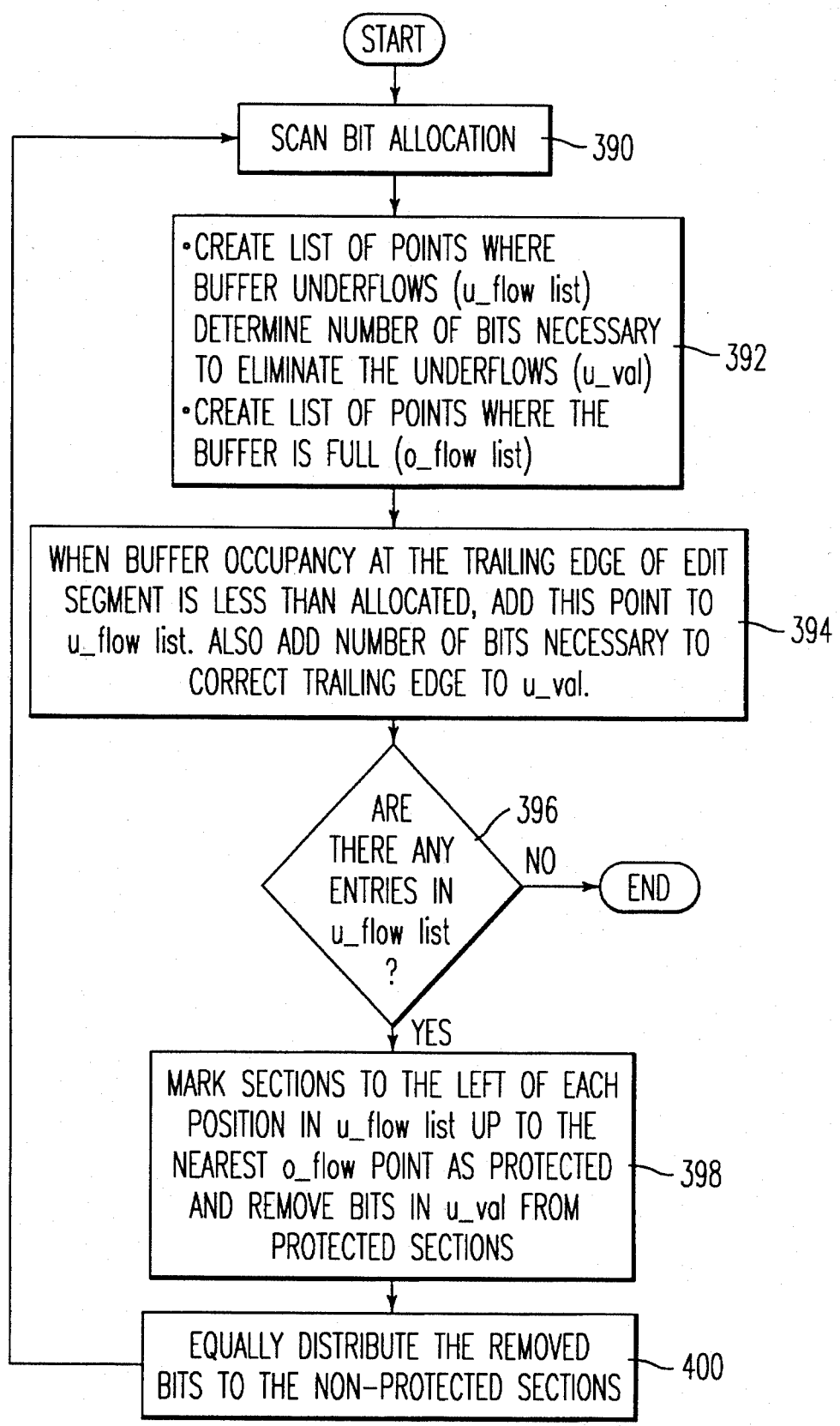
FIG. 17 illustrates a flowchart of the process used to check if underflow results from the changing of the picture quality.

FIG. 17 illustrates the process to check and correct for buffer underflow and to check and correct for possible problems due to bit reallocations at the trailing edge of the edit segment. In FIG. 17, step 390 first scans the bit allocation for each of the frames of the edit segment. Step 392 then checks for underflow for the new bit distribution using the VBV model described above. A list of points is created where underflow problems exist (u_flow list) and the number of bits necessary to eliminate each underflow is determined and stored in u_val. It is important to keep in mind that underflow occurs due to a picture being represented by too many bits. When a high quality picture represented by a large number of bits is read out of the buffer by the decoder, a large number of bits is removed from the buffer when the picture is decoded and these bits cannot be replenished fast enough. Therefore, to eliminate underflow, bits are removed from pictures. Additionally, step 392 creates a list of points where the buffer is full and stores these points in o_flow list. Note that as explained above, there is no problem with a full buffer as when the buffer becomes full, data is no longer transmitted to the buffer.

Step 394 examines the buffer occupancy at the trailing edge of the edit segment. In the VBR mode of operation, it is possible for the buffer occupancy at the trailing edge of the edited video segment to be different from that of the run that was modified, even if the edited segment is replaced by exactly the same number of bits. This arises from the idiosyncrasy of the VBV model for VBR. Hence it is important to examine buffer occupancy constraints. It is fairly straightforward to show that no problem exists if the buffer occupancy at the trailing edge of an edit segment is exactly the same or higher as it was before the redistribution of bits. If the buffer occupancy is exactly the same as before, then that of subsequent frames also remains exactly the same as the previous run, which was already checked for VBV violations. If the occupancy is higher than before, there is the possibility of the buffer becoming full during subsequent frames, and that is a perfectly allowable condition as when the buffer is full, data will no longer be fed to the buffer and underflow does not occur. However, a third case arises when the buffer occupancy is lower at the trailing edge, compared to the previous run. This has the potential for creating buffer underflow in subsequent frames and needs to be examined closely.

There are two manners in which the last frame of the edit segment can be treated for preventing buffer underflow in frames outside of the buffer segment. The first approach is the easier of the two. If the number of bits of the last frame of the edit segment results in a buffer occupancy which is greater than or equal to the original encoding (stored in the log files), no underflow problem exists and therefore, no action needs to be taken. If the number of bits in the buffer for the last frame of the edit segment is less than the number of bits in the buffer for the originally encoded segment, this reduced number of bits may or may not cause underflow for frames outside of the edit segment, depending on the content of the frames after the edit segment. Instead of determining the number of bits needed to prevent underflow from occurring, the occupancy of the buffer for the last frame of the edit segment is simply adjusted to be the same as for the original encoding. For safety purposes, the buffer occupancy or fullness for the end of the edit segment may be raised to 10% above the occupancy of the original encoding to assure that there is no chance of underflow. If the buffer occupancy of the last frame of the edit segment needs to be raised to be at the level of the original encoding, the number of bits of the ending frames need to be reduced as performed in step 398. The last frame is treated as underflow point, is placed in u_flow list and the number of bits which need to be taken from the last frame to raise the buffer level up to the level of the original encoding are added to u_val.

A second approach for handling possible underflow caused by the re-encoding of the edit segment is an iterative process which estimates the minimum possible level of the buffer for the last frame of the edit segment which will not cause a buffer underflow condition outside of the edit frame. This is done by a process which estimates the greatest possible difference between the buffer occupancy of the original encoding and the buffer occupancy of the re-encoding for the last frame of the edit segment.

Turning to the flowchart illustrate in FIG. 18, the buffer occupancy of the original encoding is assigned $B_0$ and has been stored in the log files of the original encoding. The buffer occupancy at frame 'i' beyond the boundary of the edit segment is $B_i$, where $i=1 \ldots n$, where 'n' corresponds to the last frame in the movie to be encoded. How much lower than the original encoding the buffer occupancy for re-encoding may go without creating underflow conditions for any of the successive frames must be determined as opposed to the first approach which simply sets the buffer level of the re-encoding to at least the point it was for the original encoding. Let the new lower buffer occupancy at the boundary that satisfies this condition be $B_0'$. This is the minimum allowable buffer occupancy at the edit segment boundary. The possibility of having a buffer occupancy lower than that of the prior run arises as a result of the fact that the difference may be absorbed in later frame intervals after the edit segment and therefore, underflow will not occur.

Beginning in step 420 of FIG. 18, assume that the buffer occupancy, $B_0'$, of the re-encoded video of the last frame of the edit segment is zero without creating underflow in the future. This is the most liberal estimate for $B_0'$ as it is possible that the buffer occupancy must be higher to prevent buffer underflow but the buffer occupancy cannot be lower than zero. However, the process of FIG. 18 will check to see if the occupancy of zero for the last frame of the re-encoded edit segment creates an underflow and if it does, will increase the buffer occupancy at the end of the edit segment until a value of $B_0'$ is found which will not create underflow.

The process of FIG. 18 evaluates the estimated buffer occupancy difference, X', between the original encoding and the re-encoding.

$$X' = B_0 - B_0' \tag{15}$$

The difference X' is called an estimate because the difference cannot be finally determined until it is assured that X' has been checked and adjusted as necessary until all chances of underflow have been eliminated. The procedure of FIG. 18 steps through one frame at a time, starting with the frame immediately following the boundary frame, i.e. i=1. For the first frame, with $B_0'$ equal to zero, the estimated difference is simply the value of the buffer occupancy for the first frame of the original encoding, as calculated in step 422.

$$X' = B_0 \tag{16}$$

Next, step 424 determines the number of bits absorbed by the frames to the right of the boundary frame. The number of bits absorbed is a phrase used to refer to bits which could have been placed into the buffer by frames after the edit segment of the original encoding but in fact were not placed into the buffer during the original encoding because the buffer was full and therefore could not accept any more bits. The quantity $\Delta t_i$ represents the time period of the $i^{th}$ frame of the original encoding after the edit segment during which the buffer was full, and due to the reduced value of $B_0'$, can now accept additional bits. The time period $\Delta t_i$ must be less than the time period of a frame as the buffer cannot be full for an entire frame and is greater than or equal to zero. The time period $\Delta t_i$ is zero if the buffer was never full during the original encoding. Therefore, $$1/P > \Delta t_i \geq 0 \tag{17}$$

where 'P' is the picture rate measured in frames per second and is typically 30 frames per second. The total number of bits absorbed to the right of the edit segment as a result of the buffer being full is calculated to be $$a_i = \sum_{k=1}^{i} \Delta t_k R_{max} \tag{18}$$

where $R_{max}$ is the fill rate of the buffer.

Step 426 determines if the procedure for determining the buffer occupancy level of the last frame of the edit segment can end. If the sum of the bits absorbed by the $i^{th}$ frame exceeds X', i.e. if $a_i > X'$, then the procedure is stopped because the buffer is able to be filled by later frames so buffer underflow will not occur and step 428 is performed. Alternatively, if the last frame n is reached (i=n), the estimated value of X' will not cause an underflow problem up to the end of the video.

If the answer to step 426 is "No", step 430 calculates the number of bits, $b_i$, remaining to be absorbed $$b_i = X' - a_i \tag{19}$$

Step 432 then determines if $b_i > B_i$, where $B_i$ is the buffer occupancy for the $i^{th}$ frame after the edit segment. If $b_i > B_i$, the estimated value of the difference, X', is too big and will cause underflow because more bits remain to be absorbed than the current buffer occupancy '$B_i$' allows. Therefore, among the bits that remain to be absorbed, only '$B_i$' bits may be absorbed without causing underflow. Next, the estimate X' of the difference needs to be revised is step 434. In step 434, the revised estimate of X' is calculated as the bits remaining to be absorbed plus the bits absorbed $$X' = B_i + a_i \tag{20}$$

If step 432 determines that $b_i \leq B_i$, there is no underflow problem because the buffer occupancy at the $i^{th}$ frame is larger than the bits that remain to be absorbed, there is no need to change the estimate of X', and flow proceeds to step 436. In step 436, the next frame is examined (i is incremented by 1) and the loop of steps 424, 426, 430, 432, 434, and 436 is repeated until the determination in step 426 has an affirmative answer.

If step 426 has an affirmative answer, the estimate X' is acceptable and therefore in step 428, the minimum allowed buffer occupancy $B_0'$ at the boundary of the edit segment is $$B_0' = B_0 - X' \tag{21}$$

If the actual buffer occupancy of the re-encoded last frame of the edit segment is lower than $B_0'$, an underflow situation will occur due to the re-allocation of bits. In this case, the last frame is marked as an underflow point in u_flow list, and the number of bits necessary to be taken from the last frame of the edit segment to prevent the underflow condition (the difference between the number of bits for the changed video and the number of bits $B_0'$ which result in the minimum allowable buffer occupancy) are placed in u_val in a similar manner as described for step 392.

It is to be noted that for the encoding system of the present invention, it is desirable to know the buffer occupancy for all points in the video and this information is stored in the log files. However, if the buffer occupancy at the last frame of the edit segment is reduced, the buffer occupancy for frames after the edit segment could be changed, making the buffer occupancy information in the log files inaccurate and therefore, corrective action would need to be taken which re-calculates the buffer occupancy for frames after the edit segment.

Referring back to the process in FIG. 17, step 396 then determines if there are any entries in u_flow list. If there are none, there is no underflow problems and the process of FIG. 17 ends. If there are entries in u_flow list, flow proceeds to step 398 which marks sections to the left of each position in u_flow list up to the nearest o_flow point as being protected and bits equal to the corresponding number of bits in u_val are removed from these sections. As buffer underflow is caused by too many bits in one or more frames, reducing the number of bits in the frames will solve the underflow problem. In order not to have a sharp reduction in picture quality due to the bits being removed to prevent underflow, the bits are taken not from just the frame at the underflow point but equally from all frames back to the last point that the buffer was full. This provides a manner for obtaining the highest quality video while still preventing underflow.

These bits which are removed in step 398 are then equally distributed to the sections which are not marked protected in step 400 and the process of FIG. 17 begins again. The distributing of bits in step 400 does not guarantee that underflow will no longer be a problem and for this reason, it is necessary to again check for the underflow conditions using the entire process of FIG. 17 in an iterative manner.

After the process of FIG. 17 is complete, step 288 of FIG. 12 is complete and step 290 in FIG. 12 is executed. Step 290 determines the average quantizer value for each frame using the rate-quantizer function determined in step 282. The number of desired bits has previously been computed in step 286 and checked to see if underflow problems exist in step 288 but in order to re-encode the data so that the encoded data has the desired number of bits, the quantizer value must be determined. This is simply determined using the rate-quantizer function and determining the quantizer value by looking up the rate.

To determine the quantization level on a picture-by-picture basis, a rate-quantizer function (RQF) was determined in step 282. To estimate this function, two data points for each picture are required. The RQF is:

$$R = X * Q^{(-g)} + H \quad (22)$$

where R is the number of bits used to code one picture, Q is the quantizer scale, X, g, and H are the picture by picture basis coding characteristic parameters. H represents the bits which are independent of the quantizer scale so H is the bits consumed by the header, the motion vectors, the DC coefficients, etc. X and g are estimated from a pair of data points corresponding to the AC coefficient bits used to code the picture for a given quantizer scale.

The first run of the encoder may be used to generate the two data points for each coded picture in the video sequence. This may be done by a pair of alternating quantizer scale values used for each macroblock in the picture. These are processed to compute the rate-quantizer model parameters 'X' and 'g'. These two parameters, along with the value of H may be stored in a file, one per frame of coded video.

In order to determine the quantizer scale which will produce the target bits assigned to a particular coded frame of video, the above equation is used with 'R' representing the target bits, and the values of (X, g, H) are read from the stored data file which may be the log file described above. The value of 'Q' that best fits this equation is the desired quantizer scale.

Then, step 292 re-encodes the changed sections of video using the quantizer values determined in step 290. It is to be noted that re-encoding segments of previously encoded video may create encoding artifact problems unless special procedures are followed during the re-encoding. Details of the re-encoding process to avoid encoding and decoding artifacts are described in a separate section below. After the video is re-encoded, it is substituted into the bitstream for the previously encoded video, and the process ends.

As described with respect to FIG. 5, the user may view the video after it is re-encoded to determine if it is acceptable. If it is not acceptable, the user does not have to accept the newly encoded video and may continue using the previously encoded video. If the user does find the newly encoded video desirable, the newly encoded video will replace the previously encoded video. The user may then edit a new segment of the video, either spatially or temporally, as illustrated in FIG. 5.

Figure 19A:
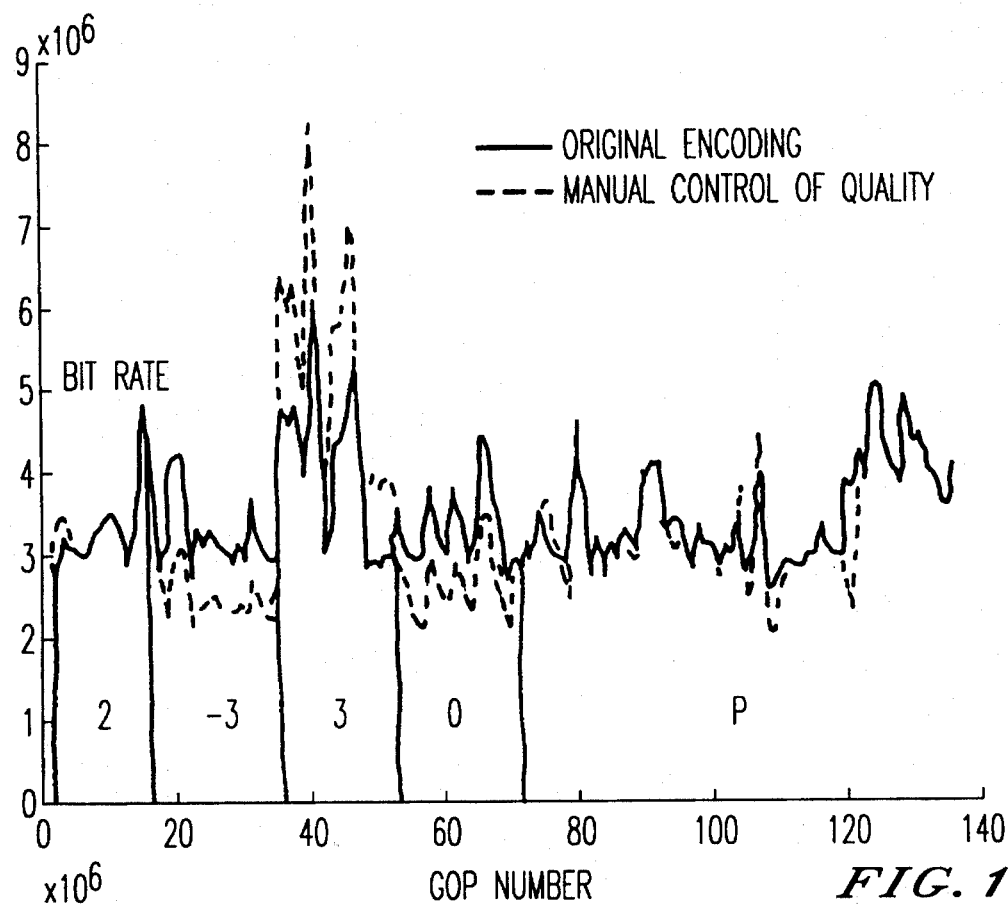
FIGS. 19A and 19B illustrate two different examples of how the bit rates of the encoded video are changed by the user selected quality.
Figure 19B:
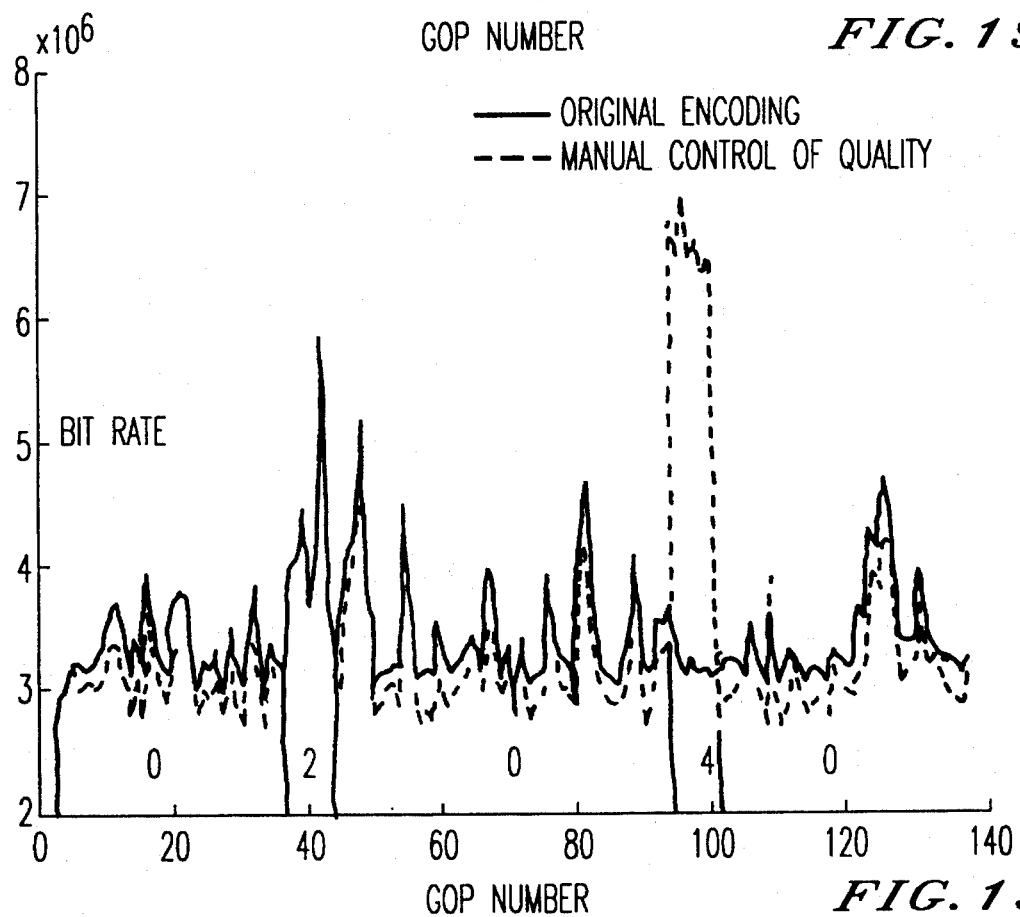

FIGS. 19A and 19B illustrate two different examples of bit rates from an original video encoding and after the user has entered a manual quality priorities. In FIGS. 19A and 19B, the bit rate (at a scale of $10^6$ which illustrate megabits) is plotted against a Group Of Pictures Number. In the illustrated examples, one GOP contains 15 pictures and each GOP is displayed per one half second. Also, the solid lines illustrate the original encoding and the dashed lines illustrate the encoding after the user has manually adjusted the quality of the picture.

FIG. 19A illustrates an encoding having five different priority regions with priorities of 2, −3, 3, 0, and protected. The time period with the priority of 3 uses more bits after the re-encoding as compared to the original encoding. As the priorities are merely relative to each other, the section marked with a priority of 2 does not have a significantly increased bit rate whereas the sections of −3 and 0 have a reduced bit rate. The protected section should have a bit rate which is similar after the re-encoding as existed before the re-encoding.

FIG. 19B is a second example having regions with user selected priorities of 0, 2, 0, 4, and 0 respectively. Again, as the priorities are relative to each other a priority of 0 does not mean that the bit rate is unchanged but is simply a priority relative to the other sections having priorities of 2 and 4. In order to give the section with the priority 4 a high bit rate, the three sections with the user selected priority of 0 are reduced and the section with a priority of 2 has approximately the same bit rate before and after the encoding.

The processing for the temporal manual editing occurs in workstation 30 of FIG. 1A in the preferred embodiment of the invention. However, as the temporal manual editing does not occur during the video encoding process, the workstation 10 may perform the temporal manual editing calculations without degrading the speed of the video encoding process.

It is to be noted that the present invention is described in detail as changing the picture quality of various time segments within an edit segment. Of course, it is clearly possible to extend this concept to allow the changing of the quality of sections of pictures which are not in the same time segment. For example, it is possible to apply the teachings of the present invention to increase the quality of the last 5 minutes of a movie at the expense of the first 5 minutes. If it is desired to change the quality of time periods outside of a single edit segment, as described below, it would be necessary for the user to view and check out the segments of interest sequentially, reassign the bits, and ensure that the constraints relating to the total bits of the movie, as well as the buffer occupancy at the trailing edge of each section is within the prescribed limits. However, this may be accomplished by one of ordinary skill in the art without undue experimentation based on the teachings contained herein.

The temporal manual editing has been described as keeping the number of bits for the original encoding of the edit segment to be the same as the number of bits of the re-encoding of the edit segment. However, if it is desired, the re-encoded edit segment may consume less bits or if sufficient storage capacity exists, the number of bits for the re-encoded edit segment may exceed the number of bits of the original encoding. Also, it is possible to perform the original encoding of the video so that it will not consume all available storage space on the final digital storage medium. Therefore, the total number of bits after re-encoding may consume any amount more or fewer than the original, for example between 0% and 20% more or less which includes 5% and 1% more or less bits.

The explanation of the temporal manual editing has been made with respect to changing the video after it has been encoded. However, the teachings contained herein may be applied to systems in which there was not an initial encoding process. Additionally, the teachings of the temporal manual editing pertaining to the use of a common bit pool may be applied to the concept of spatial manual editing for video frames, described below. Also, the manner in which the spatial manual editing operates on individual frames, as described below, may be applied to a series of frames in order to achieve temporal editing of quality.

B. Changing the Quality Within Regions of Frames

Figure 20:
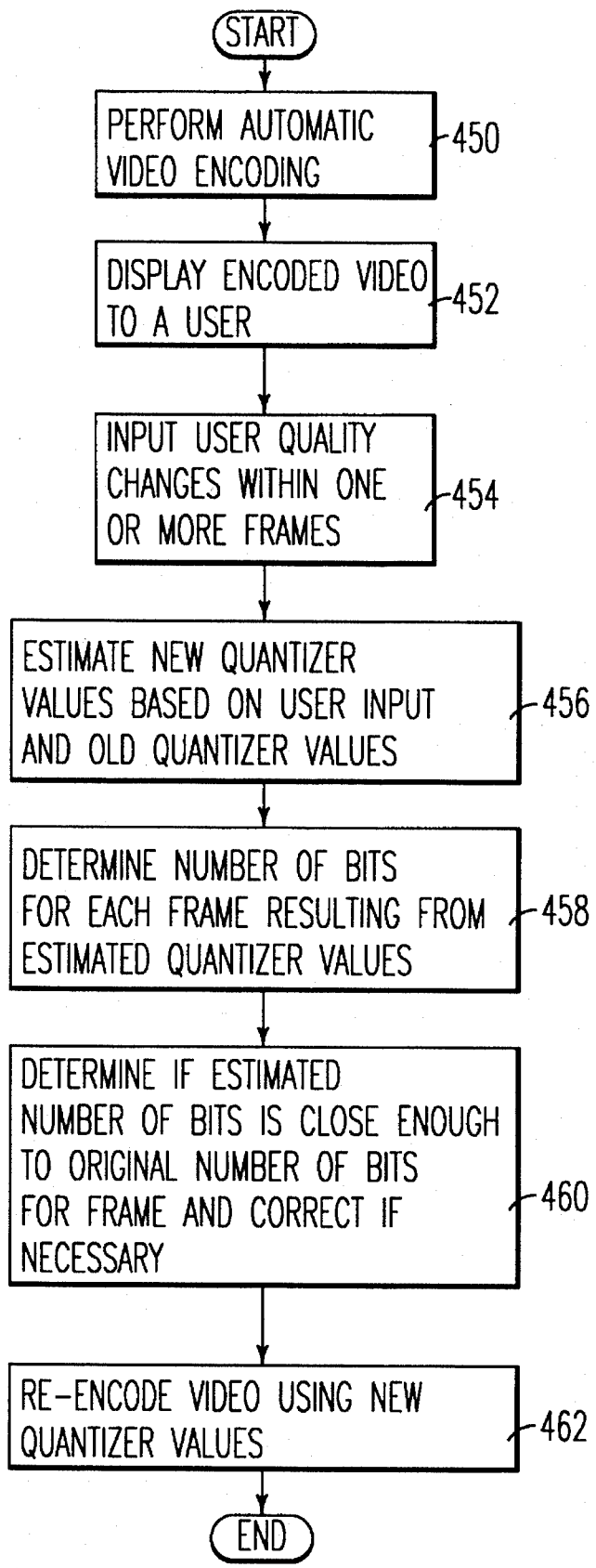
FIG. 20 illustrates the general process performed during the manual adjustment of picture quality for different regions within a frame.

FIG. 20 illustrates the general procedure for altering the quality of regions within one or more frames. After starting, step 450 performs automatic video encoding which encodes the input video into a compressed digital format such as an MPEG format or other format, as described above in the sections pertaining to the system components and general system operation. Step 452 displays the encoded video to a user and step 454 allows the user to enter commands indicating quality changes for regions within one or more frames.

Figure 21:
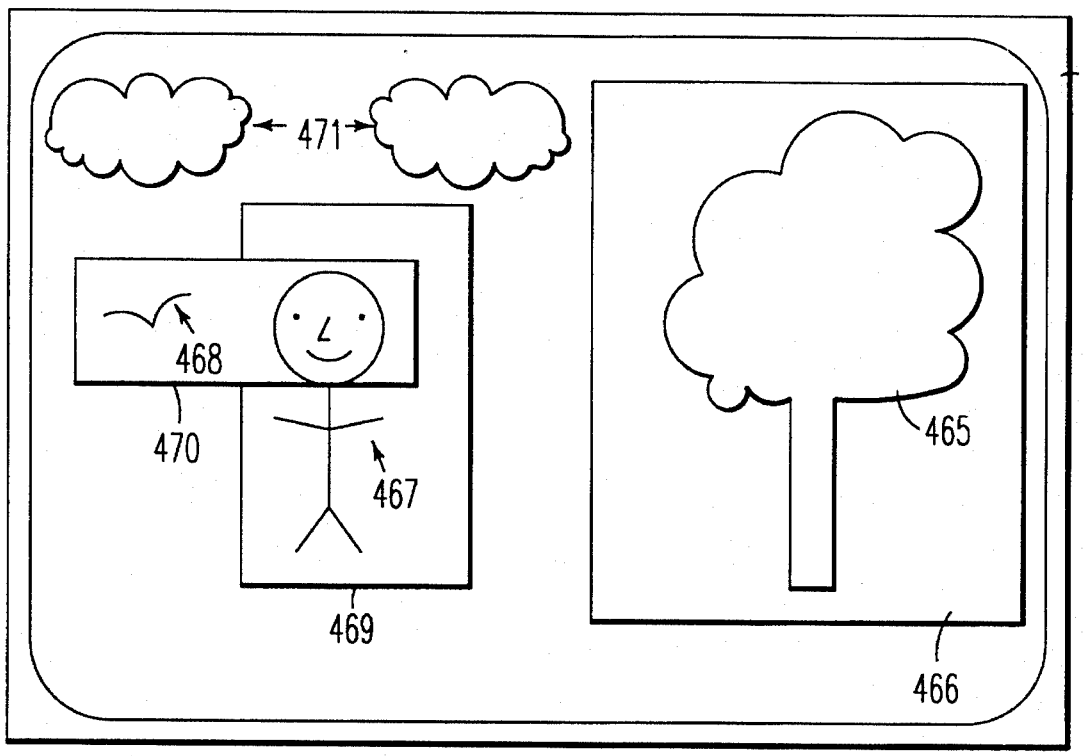
FIG. 21 illustrates an example of different regions having user selected priorities in a frame of video.

FIG. 21 illustrates a frame of video which is displayed on a monitor such as the video display monitor 61 illustrated in FIG. 1. The frame of video in FIG. 21 is illustrated as having a tree 465, a person 467, a bird 468 and two clouds 471.

In FIG. 21, regions within the frame have been defined including region 466 surrounding the tree 465, region 469 surrounding the person, and region 470, overlapping region 469 and including the bird 468 and the head of the person 467. These regions were drawn using the graphical pointing device 33 illustrated in FIG. 1A. Quality priorities set by the user in FIG. 21 may include −5 for region 466 containing the tree, +2 for region 469 containing the person, and +4 for region 470 containing the bird and the person's head. The other regions of the frame of video in FIG. 21 do not contain any user defined priorities and are therefore assigned a "Don't Care" priority. As will be explained later, the "Don't Care" regions are the regions first modified after changing the quantizer levels for the user defined regions in order to adjust the total number of bits for the encoding of the frame containing the user defined priorities to equal the number of bits resulting from the original encoding of the frame. If the user did not want the quality of regions of the frame to change, these regions would be marked by the user as having a priority of zero.

In the preferred embodiment of the invention, when defining priority regions within a frame of video, the user initially creates rectangular regions on a displayed frame of video using a graphical pointing device. The later defined regions are placed on top of and may overlap earlier defined regions. Even though the present invention is discussed with respect to defining rectangular regions, of course the teachings of the invention can be applied to any shaped region including regions having curves such as circles or ellipses, polygonal regions such as an octagon, or hexagon, or any other user defined shape including curves and/or straight lines. After the user defines each region, the user defines the priority for the region. Alternatively, the user can define the shape of all regions and thereafter, assign the priorities for these regions.

When the user initially defines priorities within a region, the regions correspond to pixel locations. However, the process of assigning priorities described below operates on a macroblock basis, a macroblock being a unit used in digital video encoding. Accordingly, if a macroblock is within or on the outer peripheral of a user defined region, that macroblock is assigned the priority of the region. One of ordinary skill in the art can simply determine the macroblocks corresponding to the user defined region using simple mathematics. For the outer peripheral of a user defined region, as an alternative to simply including a macroblock in a user defined region if the outer periphery of the region intersects the macroblock, a more sophisticated process of determining whether the macroblock should be included within the region may be performed by including the macroblock within the user defined region if more than 50% of the macroblock lies within the user defined area and excluding the macroblock from the user defined region is less than 50% of the macroblock is within the user defined region.

After the regions and their priorities are defined, the user may change the overlapping of the regions, if desired. For example, the user can "click" on region 469 of FIG. 21 while holding a predetermined function key and change region 469 to be on top of the region 470 which would make the entire person have the priority of region 469 and only the bird 468 would have the priority assigned to the region 470. The overlapping regions are given a stacking priority when entered by the user. This stacking priority is adjusted as necessary when user defined regions are added, deleted, or modified.

After the regions are defined, the user also may reshape the regions as desired or move the regions using the graphical pointing device 33. Also, the regions which have been defined by the user may be deleted using the graphical pointing device 33. It is to be noted that even though the regions are being deleted, only the user defined priorities are being deleted but the original video data within the region being deleted is of course not deleted.

As explained in the above section on changing the quality over periods of time, during or after the automatic encoding, the user may review the encoded video and whenever a frame or time period of interest occurs, the user can simply press a key on a keyboard or enter input from another device indicating that the particular frame or time period is of interest. Later, the user can go back to that frame or time period and spend more time studying the time period and altering features within that time period, as desired.

The process of a user defining regions within a frame of video has been explained above for a simple case in which there is only one frame of data being modified by a user. However, it will be quite tedious to work on frames of data in a video sequence one frame at a time and therefore, the invention allows a user to define a region at a first time period and a corresponding region in a later time period. Subsequently, an interpolation process is performed so that all frames of video intermediate to the first frame and last frame automatically have regions created which correspond to the regions defined by the user for the first and last frames, and are assigned the same priorities as the first region and/or last region or a priority based on the priorities of the first and last frames. Additionally, the stacking priorities of overlapping regions are maintained during the interpolation process. After the intermediate frames have their regions automatically created, the user may then alter the automatically created regions by changing the priorities, the shapes of the regions, add new regions, or delete the regions, as desired.

Below is an example of how the interpolation process operates. Let the user select priority regions for two frames at time instances $t\_1$ and $t\_n$. After the user assigns a region in the frame $t\_1$ and a corresponding region in $t\_n$, the coordinates of these two regions are interpolated over intermediate frames to obtain region specifications for all the frames between $t\_1$ and $t\_n$. Not only can the interpolation be performed for the actual region being defined but the interpolation can be performed for the quality priority as well. For the interpolation process, a simple linear function is used. Suppose a user has defined a region A of frame $t\_1$ having a point $a\_1$ and there is a corresponding point $a\_n$ in the corresponding region A in the frame $t\_n$, the corresponding points in the intermediate frames $a\_2, a\_3, \ldots, a\_(n-1)$ have a horizontal ordinate defined as $$a\_i(h)=a\_1(h)+(a\_n(h)-a\_1(h))\times(i-1)/(n-1) \qquad (23)$$

and a vertical ordinate, $$a\_i(v)=a\_1(v)+(a\_n(v)-a\_1(v))\times(i-1)/(n-1) \qquad (24)$$

where h and v correspond to horizontal and vertical ordinates of the point in question. In this process, only the vertices of a polygon that define the region are used and the vertices are interpolated. The regions are then defined by the vertices. Other interpolation techniques besides linear interpolation may be performed.

The above interpolation process can be performed as many times as required until all regions for all frames in the segment to be edited are properly defined. Furthermore, this process can be recursive with a fine-tuning process occurring such that a user may move or alter the size of a region determined through interpolation for an intermediate frame and the interpolation process may be executed again for the first frame and intermediate frame which has been altered, and then for the intermediate frame and the last frame. The interpolation process is primarily used for defining regions that move across frames. However, the invention also includes defining regions once which are stationary and used in a series of frames.

Figure 22:
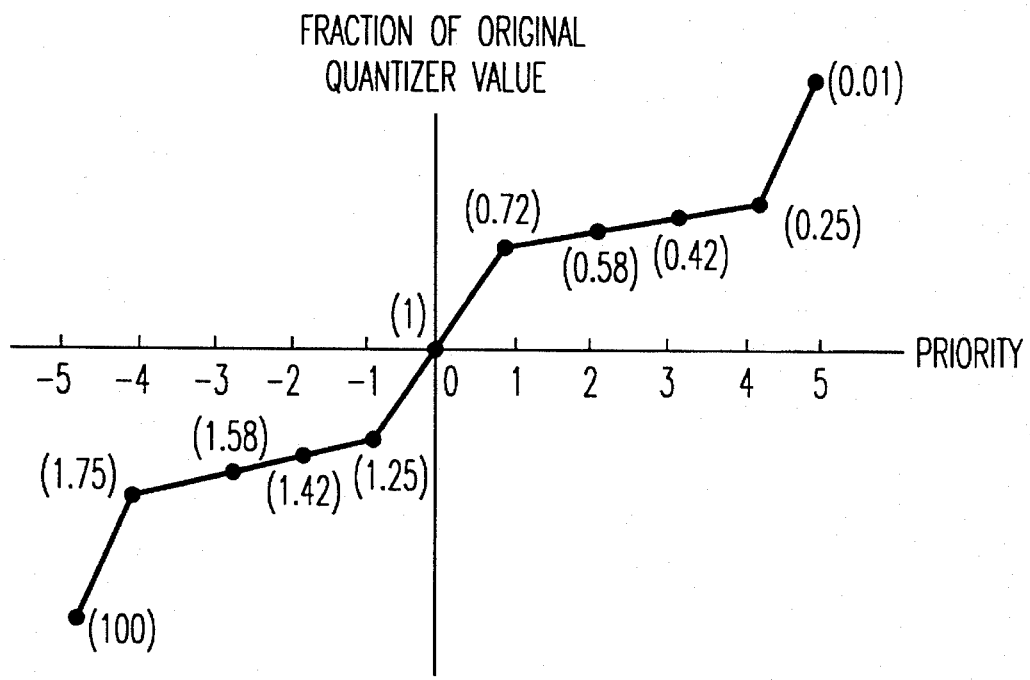
FIG. 22 illustrates a graph of the user selected priorities versus the fraction of the original quantizer values used for the selected priority.

After the regions are defined and the user defined priorities are entered, the new quantizer values for each macroblock are estimated or determined in step 456 of FIG. 20 based on the priority input by the user and the old quantizer value of the macroblock. This is determined according to the relationship illustrated in FIG. 22 which illustrates the fraction of the original quantizer value used with each of the user selected priorities. For example, if the user inputs a priority of zero, the resulting fraction of the original quantizer value which is used is 1, meaning that there is no change to the original quantizer value. If the user selects a priority of −3, the fraction of the original quantizer value is 1.58, meaning that the original quantizer value for the macroblock having the priority of 3 is multiplied by 1.58 in order to determine the resulting quantizer value. As the priority −3 means reduced quality, the quantizer level must be increased to achieve a reduced quality meaning less bits are to be used for the macroblock. In an opposite manner, if a positive priority such as 3 is input by the user, the quantizer value of a macroblock from the original automatic encoding is multiplied by 0.42 which reduces the quantizer level. A reduced quantizer level means that more bits are required to represent the image within the macroblock and accordingly, the picture quality is increased. The points on the line illustrated in FIG. 22 are (−5, 100), (−4, 1.75), (−2, 1.58), (−2, 1.42), 1.25), (0, 1), (1, 0.72), (2, 0.58), (3, 0.42), (4, 0.25), and (5, 0.01). The mapping illustrated in FIG. 22 is based on a piece-wise linear relationship between the q-levels and the priority. The points determined in FIG. 22 have been determined through experimentation and different fractions may be used with the user selected priorities, as desired.

The priorities of −5 and 5 are intended to obtain the lowest and highest possible qualities, respectively. The lowest quality results from a maximum permissible quantizer level of 112 when the non-linear quantizer scale is used and 62 when the linear quantizer scale is used for MPEG-2 encoding. Also, the lowest quantizer level used to achieve the highest quality is 1. Therefore, the relationship illustrated in FIG. 22 may result in values which are off the actual allowed q scale but these calculated q values are simply then placed at their saturation level. As an example, assume that initially, a macroblock has a quantizer scale of 20 and the user selects a priority for the macroblock to be −5. The quantizer value 20 multiplied by 100 yields a new quantizer level of 2,000 which is off of the quantizer scale and therefore, the maximum or saturation quantizer value is used.

In addition to using saturation levels as described above, the present invention takes a precaution for the I, P, and B frames of MPEG encoding. The present invention limits the highest quantizer level for the I-type frame to be 96 for the non-linear quantizer cases and 58 when the linear quantizer scale is used. Similarly, the highest quantizer level for the B-type and P-type frames is 112 for the non-linear quantizer scale and 62 for the linear quantizer scale cases. The linear and non-linear quantizer scales are defined in the MPEG standard. The lowest quantizer level used for each of the I, P, and B frame types is 1. Of course, the user defined inputs and the fraction of the original quantizer values illustrated in FIG. 22 can be modified in order to satisfy the user's requirements.

After step 456 computes the new quantizer values for each macroblock, step 458 determines the number of bits for each frame resulting from the quantizer values determined in step 456. This step is important because in the preferred embodiment of the invention, the same number of bits for each frame must be obtained after the quality of some regions is increased while the quality of other regions are reduced. In order to determine the number of bits resulting from the new quantizer values, it is necessary to have a function which properly estimates the quantizer level versus the resulting number of bits for each macroblock. To determine the relationship between the resulting number of bits versus the quantizer level, a study of the empirical results of the video encoder, such as an MPEG-2 encoder, was performed and the determined relationship is based on actual empirical results. Simulation results for various quantizer levels and frame type using a number of video sequences were conducted. Based on these results, the following relationship between the quantizer level (q) for a macroblock and the number of bits (b) used in encoding that macroblock, depending on the frame type was determined to be $$log(b)=m\ log(q)+n \qquad (25)$$

where m=−0.75 for I-type frames and m=−1.0 for B and P-type frames. Additionally, n=15, 14.5 and 13.8 for I, P, and B frames, respectively. These values are, as noted before, averaged over a number of video sequences. The above equation serves as a good approximation measure to predict the behavior of the encoder, and the relationship between the number of bits and the quantizer level is linear in the log domain. Of course, other relationships, if accurate, between the quantizer level and number of resulting bits may be used to determine the number of bits resulting from a given quantization level, including the other rate-quantizer functions described herein.

The above process describes how to determine the number of bits resulting from a given quantization level. However, if more than one encoding is used, it is possible to further refine the data rate versus quantizer function using the information from the new encoding. During the initial automatic encoding process, there is a first video encoding pass used to gather statistics of the video to be encoded. Then during the second pass which is the actual encoding, another actual point of the data rate versus quantizer function will be obtained such as in a b versus q plot corresponding to the above equation describing the number of bits b generated from a given q-level. After the data is re-encoded according to the user specified selections, as described below, the resulting re-encoded video is either accepted or rejected by the user depending on if it satisfies the desired quality improvements. Each re-encoding generates actual data for the q-level versus bits relationship which was estimated Given the new q-level assignment, q', a determined data rate will be more accurate for this point based on the additional data obtained by the re-encoding. If the new quantizer level, q', falls between any two points which have been previously obtained, it is possible to do a linear interpolation in the log domain to obtain an estimate for the number of bits to be outputted by the encoder with the new q-level. If the new quantizer level, q', does not fall in between the two determined q-levels, the model can be used to extrapolate from the closest q-level to the new quantizer level, q', to estimate the number of bits to be generated at the encoding time. Note that the more times the data is re-encoded, the higher the probability of obtaining a better estimate will be for the output bits from the encoder.

After the number of bits for each frame resulting from the estimated quantizer values is determined in step 458 of FIG. 20, step 460 determines if the estimated number of bits is close enough to the original number of bits for the frame and corrects the number of bits, if necessary. This is performed according to the process illustrated in FIGS. 23–25C.

Figure 23:
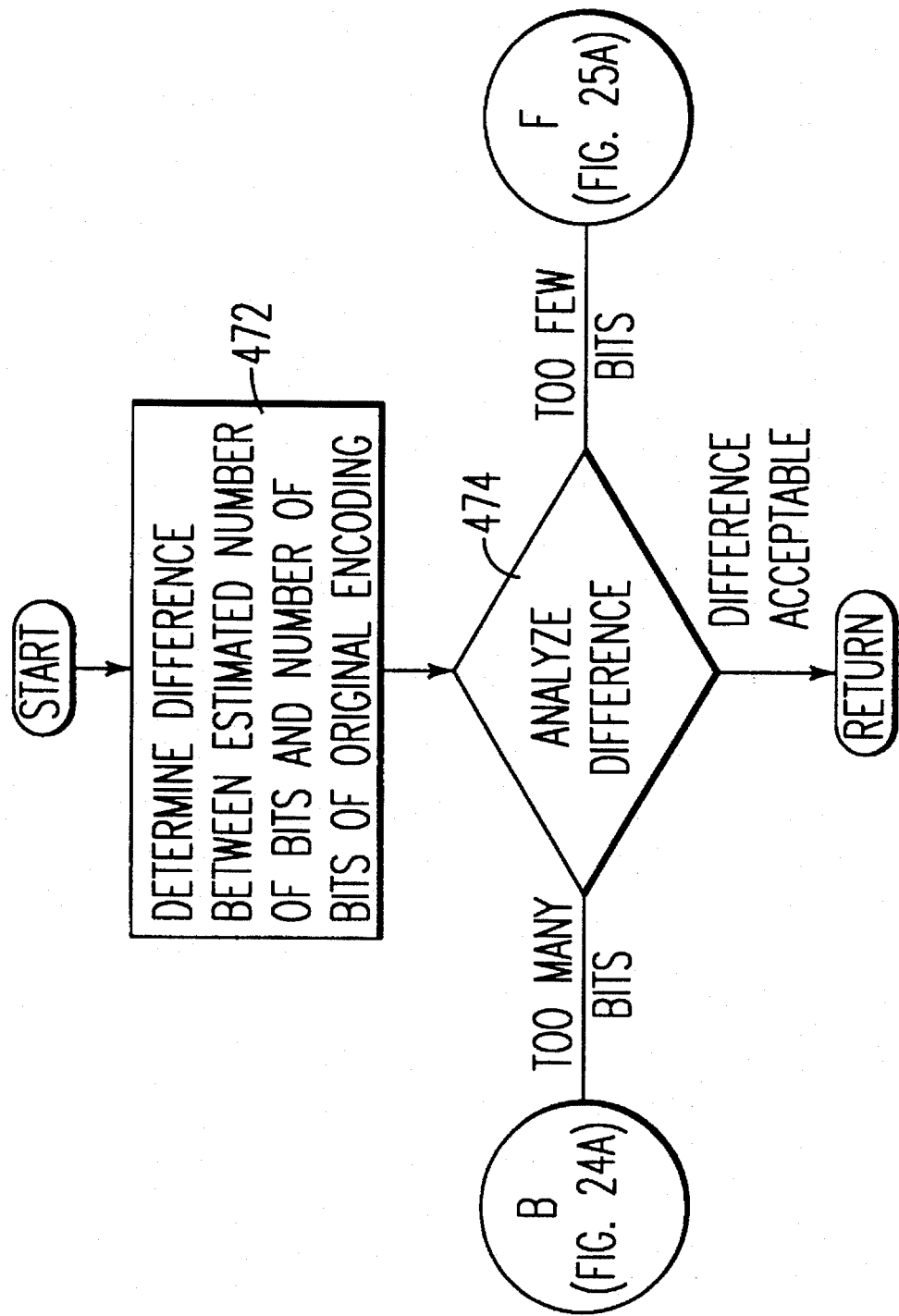
FIG. 23 illustrates a process for determining if the difference between the number of bits resulting from the user selected priorities and the number of bits resulting from the original encoding of a frame is acceptable or whether a correction procedure must be performed.

When step 460 is performed, step 472 of FIG. 23 first determines the difference between the estimated number of bits and the number of bits of the original encoding. This is calculated according to the equation $$D=B'-B \qquad (26)$$

where B' is the estimated number of bits of the modified frame, B is the number of bits of the frame resulting from the original encoding, and D is the difference. It is of course possible to use a value for B which is other than the number of bits resulting from the original encoding. For example, if a user wants to increase the total number of bits for a frame, he may set B to a number which is a predetermined amount higher than a number of bits resulting from the original encoding. Similarly, the user may set B to be lower than the original number of bits of the frame. Therefore, the re-encoded frame may consume more or less bits than the original encoding, depending on storage constraints, minimum quality constraints, and the possibility of video buffer underflow. Also, if regions in a frame have not had their quantizer values altered, it is possible to analyze only the numbers of bits resulting from regions having their quantizer values altered and ignoring the regions which have not been changed. Step 474 then analyzes this difference and if there are determined to be too many bits, flow proceeds to B for the process illustrated in FIGS. 24A–24C in order to increase the quantization level of the macroblocks to reduce the number of bits. If step 474 determines that there are too few bits in the modified frame, the quantization level of the macroblocks of the new frame is to be decreased in order to generate more bits according to process F illustrated in FIGS. 25A–25C. Otherwise, if the difference is within an acceptable threshold, there is no need to modify the quantization levels of the macroblocks and the process returns to perform step 462 in FIG. 20. When keeping the number of bits in the frame the same for the re-encoded video, the bits can be considered to be shifted from one region to another.

In step 474, the difference D is analyzed by comparing the difference to a threshold, T. The threshold, is, set to 0.001×B which means that if the number of bits resulting from the change in quality of the region is within 0.001 of the total number of bits, then the difference is acceptable and the process may stop. Of course, the stopping threshold which indicates that the difference is acceptable may be determined in alternative manners, may be increased or reduced, as desired, or may be based on both the original number of bits for the frame and the resulting number of bits resulting from the user selected priorities.

Figure 24A:
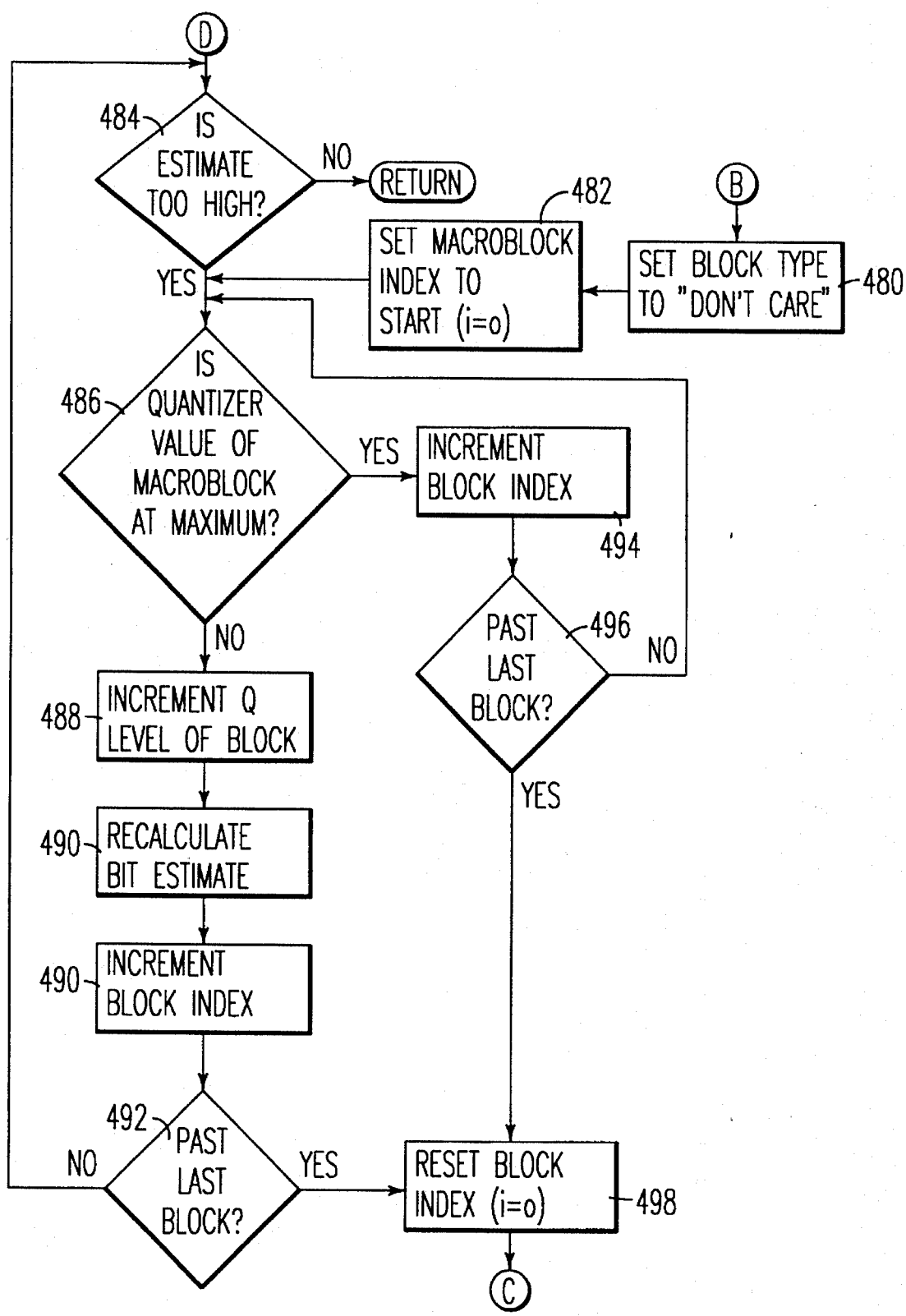
FIGS. 24A–24C illustrate a process for correcting a frame when it is determined to have too many bits and therefore, the quantizer levels of the macroblocks are incremented in order to reduce the number of bits.
Figure 24B:
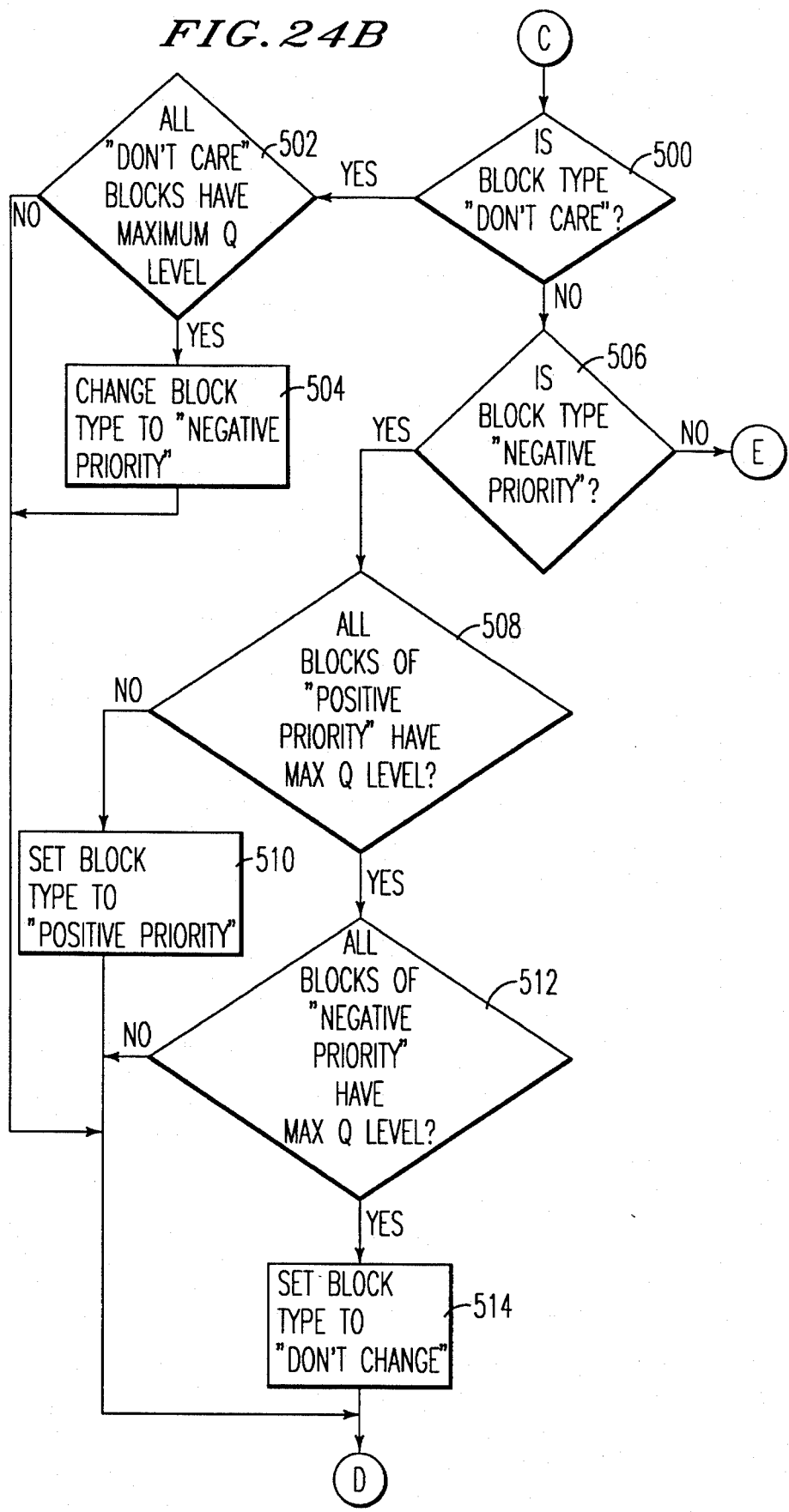
Figure 24C:
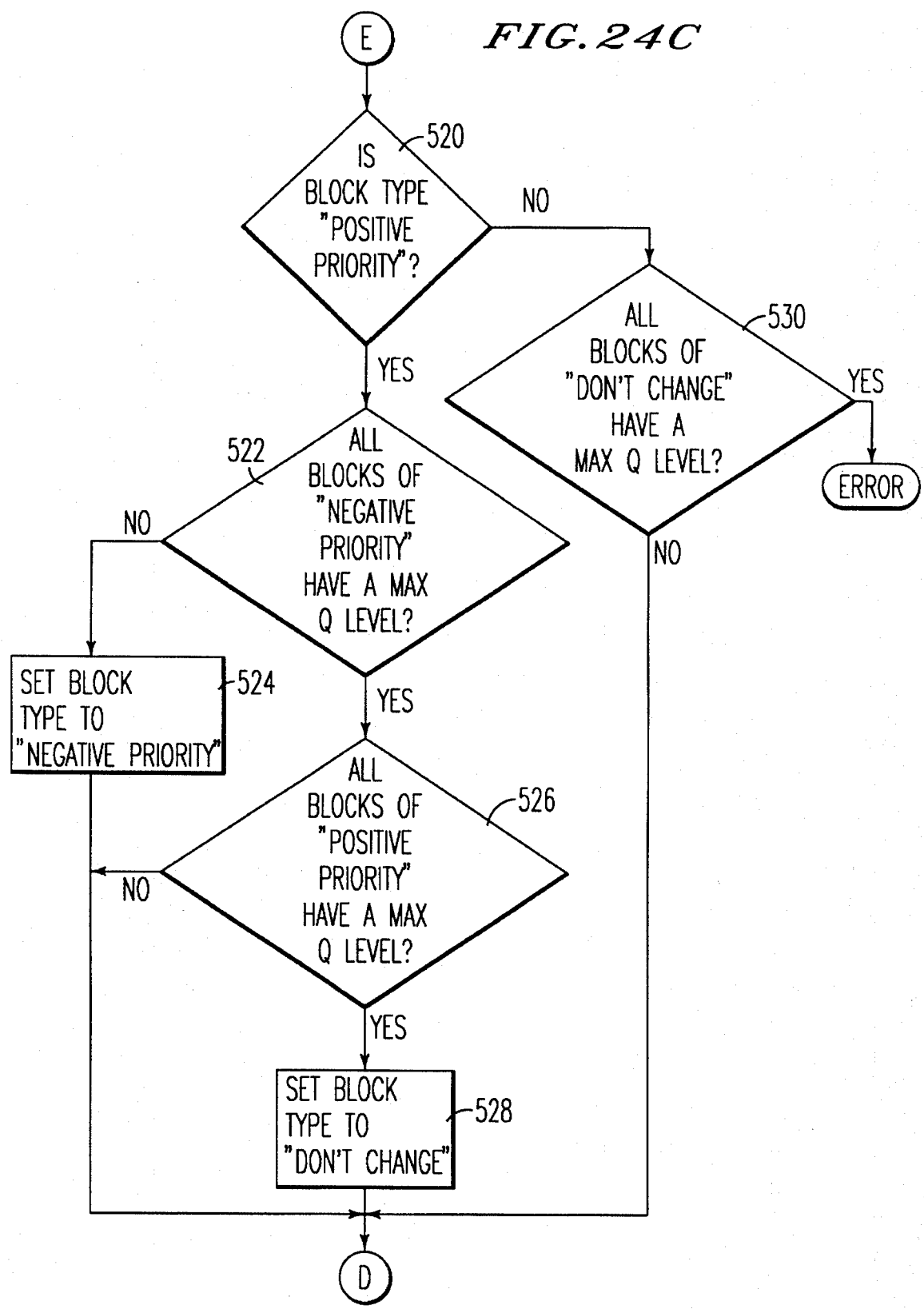
Figure 25A:
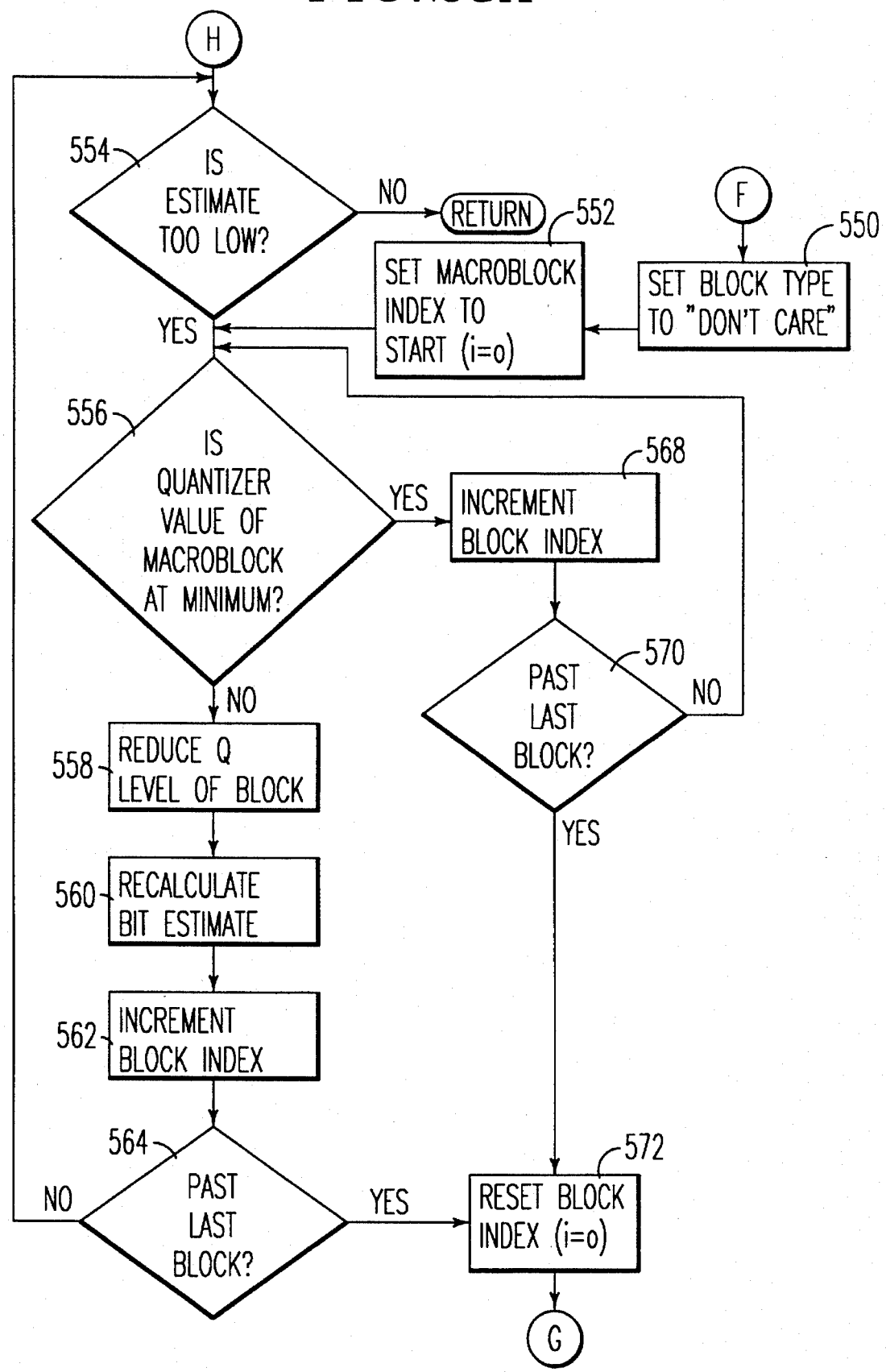
Figure 25B:
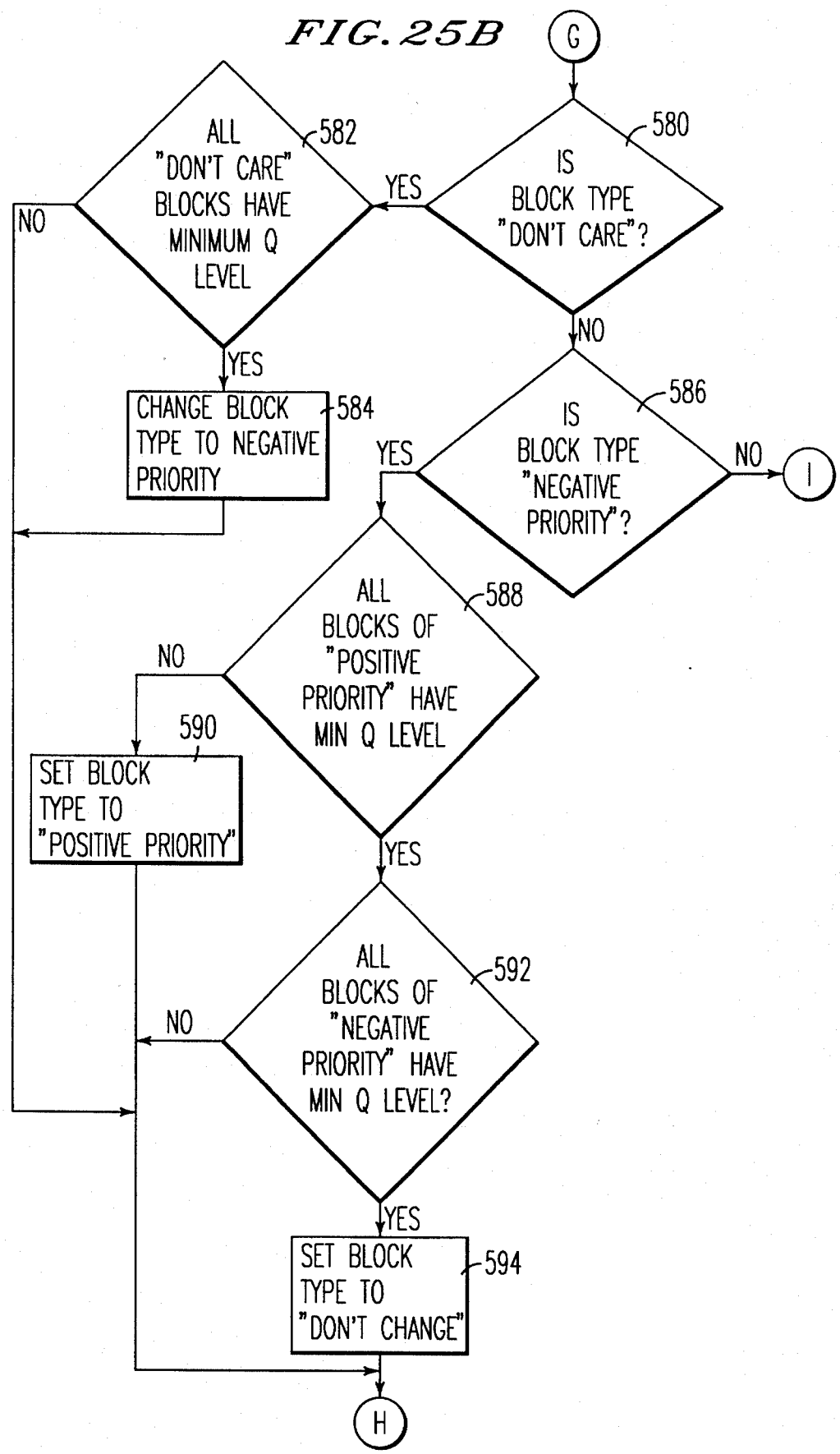

The processes illustrated in FIGS. 24A–24C, and FIGS. 25A–25C are quite similar except that FIGS. 24A–24B are used to reduce the number of bits resulting from the user selected qualities and FIGS. 25A–25C are used to increase the number of bits resulting from the user selected qualities. A general overview of the processes performed in FIGS. 24A–25C is now described before explaining the details of these processes. Initially, the macroblocks in a frame of video are labelled as one of four types; "Don't Care", "Negative Priority", "Positive Priority", and "Don't Change". When a region has not been assigned a priority by a user, or if the system allows the user to assign a "Don't Care" status, that region is considered to be of the "Don't Care" type. If the user assigns a priority between and including −5 and −1, the macroblocks within these regions are considered to be "Negative Priority". If a region is assigned a priority between and including 1 and 5, those regions are considered to have a "Positive Priority". Last, all regions assigned with a priority of 0, or if the system allows the user in some other manner to indicate that a region is not to have its quality changed, the macroblocks in those regions are considered to be of the "Don't Change" type.

Each of the macroblocks within each of the four macroblock types is labelled with an index, i, such that each of the four types has its own set of indexes. The index i of zero is assigned to the first macroblock and the index of N−1 is assigned to the last macroblock where N is the total number of macroblocks within a region type. For example, for all of the "Don't Care" regions, each of the macroblocks within these regions are indexed from 0 to N−1. Note that if there are more than two different "Don't Care" regions, there is not two different indices i=0 for the "Don't Change" regions. For all "Don't Care" regions, there is only one macroblock with an index 0, one macroblock with an index 1, etc.

If there are too many bits in the frame after the user has determined the priority of the regions, quantizer levels for the frame must be increased in order to reduce the number of bits for the frame. The original quantizer value for the macroblock is taken from the macroblock layer log file having a format as illustrated in either of FIGS. 10A or 10B. Alternatively, the encoder may be re-run to determine the quantizer values if they were not stored after the original run of the encoder. Yet another alternative is to decode the encoded bitstream to determine the quantizer values of the original encoding. The way the procedure works for decreasing the number of bits is to increase the quantizer level for each macroblock of the "Don't Care" type by one quantizer level, one macroblock at a time. If this does not solve the problem, each macroblock of the "Don't Care" has its q level again increased by one, one macroblock at a time. A predetermined maximum quantizer level is set and the quantizer levels of no macroblocks can be increased beyond this maximum level. If all macroblocks of the "Don't Care" type reach this maximum level, then the "Negative Priority" and the "Positive Priority" regions are increased by one in a similar manner. First, all negative priority macroblocks are increased by one quantizer level and if this does not solve the bit differential problem, then the macroblocks of the "Positive Priority" macroblocks have their quantizer level increased by one. If this does not solve the problem, then the quantizer levels of the "Negative Priority" macroblocks are again increased by one and if this does not solve the problem, then the macroblocks of the "Positive Priority" type have their quantizer level increased by one. This process continues until all macroblocks in the "Negative Priority" and the "Positive Priority" types have their quantizer levels increased to the maximum level described above. If this does not solve the bit differential problem, then the macroblocks of the "Don't Change" type have their quantizer levels increased by one quantization level at a time until the bit differential problem is solved. In all likelihood, the bit differential problem will have been corrected before the quantization levels of the "Don't Change" type begin to be changed. A similar process occurs when the frame having the user selected priorities has too few bits and the quantization level of the macroblocks needs to be decreased in order to increase the number of bits according to the process of FIGS. 25A–25C.

Turning now to the flowchart illustrated in FIG. 24A which is executed by FIG. 23 when too many bits result, the process begins in FIG. 24A by step 480 setting the block type to the "Don't Care" type. Step 482 then sets the macroblocks index to the starting point which means that the index, i, is set equal to zero. Step 486 is then performed which determines if the quantizer level of the macroblock in question (the macroblock within index=i) having the macroblock type which has been set (the first time through the flowchart, the first macroblock of the "Don't Care" type) has the maximum predefined quantizer level. The maximum quantizer level for this correction process should not be set too high so that there is a great decrease in quality for the macroblocks which are corrected. It is desirable to attempt to decrease the quality in order to decrease the number of bits in a uniform manner so that there is not a great differential in quality of the macroblocks, if possible. Therefore, this maximum is set at a quantization level of 62 when the linear quantization scale is used and 112 when the non-linear quantization scale is used for MPEG-2 encoding, for example. However, other values may be used for the maximum quantizer value. If the quantizer level of the macroblock in question is determined not to be the maximum in step 486, step 488 increments the quantizer level of the macroblock in question by one quantization level. Step 490 then recalculates the bit estimate for the frame using the bit rate-quantizer function described above. Step 490 then increments the index of the macroblocks. If the index of the macroblock indicates that the last macroblock of the macroblock type has not been processed, flow loops back to step 484. Otherwise, flow proceeds from step 492 to step 498 which resets the block index to zero, indicating the first macroblock.

When flow returns to step 484, the bit estimate recalculated in step 490 is used to recalculate the difference D, described above which is compared to a threshold, as described above. If the bit estimate is no longer too high, the number of bits for the frame containing the user selected priorities has been corrected and flow returns to the calling process. Otherwise, flow proceeds to step 486 which again determines if the quantizer value of the macroblock in question (having index i) is at a maximum.

If step 486 determines that the quantizer value of the macroblock in question is at a maximum, the quantizer level of that block is not to be increased and step 494 then increments the block index i by one. If step 496 determines that the index of the macroblock type is not past the last block, flow proceeds back to step 486 to determine if the block with the incremented index has a maximum quantizer value. Otherwise, if step 496 determines that the macroblock is the last macroblock of the macroblock type in question, step 498 is executed which resets the block index to the first macroblock (i=0). Flow then proceeds to process C illustrated in FIG. 24B.

In FIG. 24B, step 500 examines if the block type is of the "Don't Care" type. If it is the "Don't Care" type, step 502 determines if all "Don't Care" macroblocks have the maximum q level. If all of the "Don't Care" macroblocks do have the maximum q level, no further adjustment can be performed on the "Don't Care" type macroblocks and therefore the macroblock type is changed to "Negative Priority" in step 504 and flow proceeds back to process D illustrated in FIG. 24A and step 484 is executed. Otherwise, if step 502 determines that all macroblocks of the "Don't Care" type do not have the maximum q level, flow proceeds back to process D without changing the type of macroblock being modified. This procedure continues until the resulting number of bits for the frame is within the threshold or all macroblocks of the "Don't Care" type are set to the maximum quantization level, which results in the block type being changed to "Negative Priority".

If step 500 determines that the block type is not "Don't Care", step 506 determines if the block type is "Negative Priority". If the block type is "Negative Priority", step 508 determines if all blocks of the "Positive Priority" have a maximum q level. If the result of the determination in step 508 is negative, step 510 is performed to set the block type to "Positive Priority" and flow proceeds to process D illustrated in FIG. 24A.

If step 508 determines that all macroblocks of the "Positive Priority" have the maximum q level, step 512 examines if all blocks of the "Negative Priority" type have a maximum q level. If they do not, the block type is not changed and flow proceeds back to process D in FIG. 24A. If all macroblocks of the "Negative Priority" type are determined to have the maximum q level in step 512, all "Don't Care", "Negative Priority", and "Positive Priority" macroblocks have the maximum quantization level and the block type is then set to "Don't Change" in step 514. Flow then proceeds to process D in FIG. 24A.

Process E and step 520 of FIG. 24C is performed after step 506 of FIG. 24B has a negative determination. Step 520 determines if the block type is "Positive Priority". If it does, step 522 determines if all blocks of the "Negative Priority" type have a maximum Q level. If they do not, the block type is set to "Negative Priority" and flow returns to Process D illustrated in FIG. 24A. If step 522 determines that all blocks of the "Negative Priority" type do have the maximum q level, step 526 examines if all blocks of the "Positive Priority" type have the maximum q level. If they do not, flow returns to process D illustrated in FIG. 24A. Otherwise, all "Negative Priority" and "Positive Priority" along with all "Don't Care" blocks have the maximum quantization level and step 528 sets the block type to "Don't Change" and flow returns to process D illustrated in FIG. 24A.

If step 520 determines that the block type is not "Positive Priority", the block type must therefore be "Don't Change" and step 530 determines if all blocks of the "Don't Change" type have the maximum q level. If they do, there is an error as all block types have been set to the maximum quantization level without resolving the problem of too many bits being in the frame having the user selected priority. Setting all blocks to the maximum predefined q level should result in a number of bits which does not exceed the original encoding of the frame. If the determination in step 530 is negative, flow proceeds back to process D illustrated in FIG. 24A.

If the process of FIG. 23 determines that there are too few bits in the frame having the user selected priority regions, the process in FIGS. 25A–25C is performed. FIGS. 25A–25C are based on the process illustrated in FIGS. 24A–24C except that the quantization levels are decreased instead of increased in order to increase the number of bits for the frame and the quantization levels of the macroblocks cannot exceed a predetermined minimum level, such as a quantizer level of 1, when decreased. As the process of FIGS. 25A–25C is identical to the process of FIGS. 24A–24C, except for the above noted differences, a further description of FIGS. 25A–25C will not be made for the sake of brevity.

The correction process described in FIGS. 23–25C is one manner in which the invention may operate. However, alternative procedures of adjusting the quantization levels of the different types of macroblocks is possible. For example, instead of changing the quantization levels of the "Negative Priority" and the "Positive Priority" macroblocks at the same time as described above, the macroblocks of the "Negative Priority", "Positive Priority", and "Don't Change" types can be uniformly increased. Alternatively, if there are too many bits, the quantizer levels of the "Negative Priority" types may be increased until the maximum quantization level is reached and then the quantization levels for the "Positive Priority" type macroblocks are then increased. In an opposite manner, if the number of bits of the frame having the user selected priorities is too low, the "Positive Priority" type macroblocks may have their quantization levels decreased in order to increase the number of bits before the quantization levels of the "Negative Priority" type macroblocks are decreased. In the latter two cases, the altering of the "Don't Care" type macroblocks may occur before, during, or after the "Negative Priority" or "Positive Priority" type macroblocks are altered.

After the process of FIGS. 23A–25C is performed, flow returns to step 462 in FIG. 20 which re-encodes the video using the new quantizer values. This re-encoding is performed while fine-tuning the quantization values using a rate-control function in order to have the resulting number of bits for the re-encoded frames be as close to the number of bits for the original encoding of the frames as close as possible. The rate-controller process is described in detail in a separate section below. Also, during the re-encoding process, encoding artifacts may result and therefore, special procedures may be performed in order to reduce these encoding artifacts, as described in a separate section below.

The process for the spatial manual editing occurs in workstation 30 of FIG. 1A of the preferred embodiment of the invention. However, as the spatial manual editing does not occur at the same time as the video encoding process, the workstation 10 may perform the temporal manual editing calculations without degrading the speed of the video encoding process. It is to be noted that the present invention is described in detail as changing the picture quality of various regions within a frame. Of course, it is possible to extend the concept in the present application to shifting bits within a region of one frame to a region in a different frame. Additionally, the spatial manual editing may be applied in conjunction with the temporal manual editing described above.

The spatial manual editing has been described as keeping the number of bits of the frame having a user supplied regional priorities the same as the original encoding of the frame. However, if it is desired, the re-encoded edit segment may consume a predetermined number of bits which is more or less than the original number of bits for the frame, if sufficient storage capacity exists. In these cases, it will be desirable to know the number of bits by which the altered frame can be changed and therefore, the processes illustrated in FIGS. 24A–25C will operate until the set difference is achieved. Accordingly, the total number of bits for the re-encoding of any frame may consume any amount more or less than the original encoding, for example between 0% and 20% more or less which includes both 5% and 1% more or less bits.

The explanation of the spatial manual editing has been made with respect to changing the video after it has been encoded. However, the teachings contained herein may be applied to systems in which there was not an initial encoding process.

The manner in which the spatial manual editing works is to assign a quantizer value based on the user selected priority and then adjust the quantization levels of the macroblocks of a frame, as necessary, in order to achieve the same number of bits for the frame as previously obtained. In contrast, the temporal manual editing described in the section above removes a common pool of bits from sections of the video and redistributes those bits from the common pool in accordance with the user selected priorities. All teachings relating to the process in which the spatial manual editing is performed with respect to one frame may be applied to the concept of changing the quality of frames of video over time, as described above in the temporal manual editing section, and vice versa. For example, the spatial editing has been described as modifying quantizer levels to achieve the changes in quality whereas bit numbers are adjusted in the temporal editing section. As the number of bits for a frame or macroblock directly depends on quantization levels, the modification of bit numbers and quantization levels achieves the same results and therefore the temporal and spatial editing may modify the number of bits and/or the quantization levels.

VIII. RE-ENCODING THE VIDEO AFTER CHANGING THE QUALITY

A. Bit Allocation Control When the Quality Has Been Changed Within Single Frames To control the bit-rate in the video encoding device 50 illustrated in FIG. 1A, a controller, such as workstation 10 or any specialized hardware that can perform the same controlling function, loads quantization levels, or q-levels, and an estimated or expected number of bits per slice into a rate-controlled encoder. The encoder then begins encoding, and quantization levels are adjusted after measuring the accuracy of the generated number of bits compared to the previously determined estimated number of bits. The estimated number of bits are determined using a rate-quantizer function, as described above in the sections pertaining to the spatial and temporal manual editing. This process is performed sequentially on a set of n macroblocks at a time, where each set is designated MB(i), and where:

$$1 \leq i \leq (\text{total \# of macroblocks}/n). \qquad (27)$$

When re-encoding the last set of macroblocks, the rate-controller assures that the total number of generated bits in the re-encoding process is less than the originally encoded length since any minor overestimation in the number of bits that will be generated can be absorbed using bit-stuffing.

Figure 26:
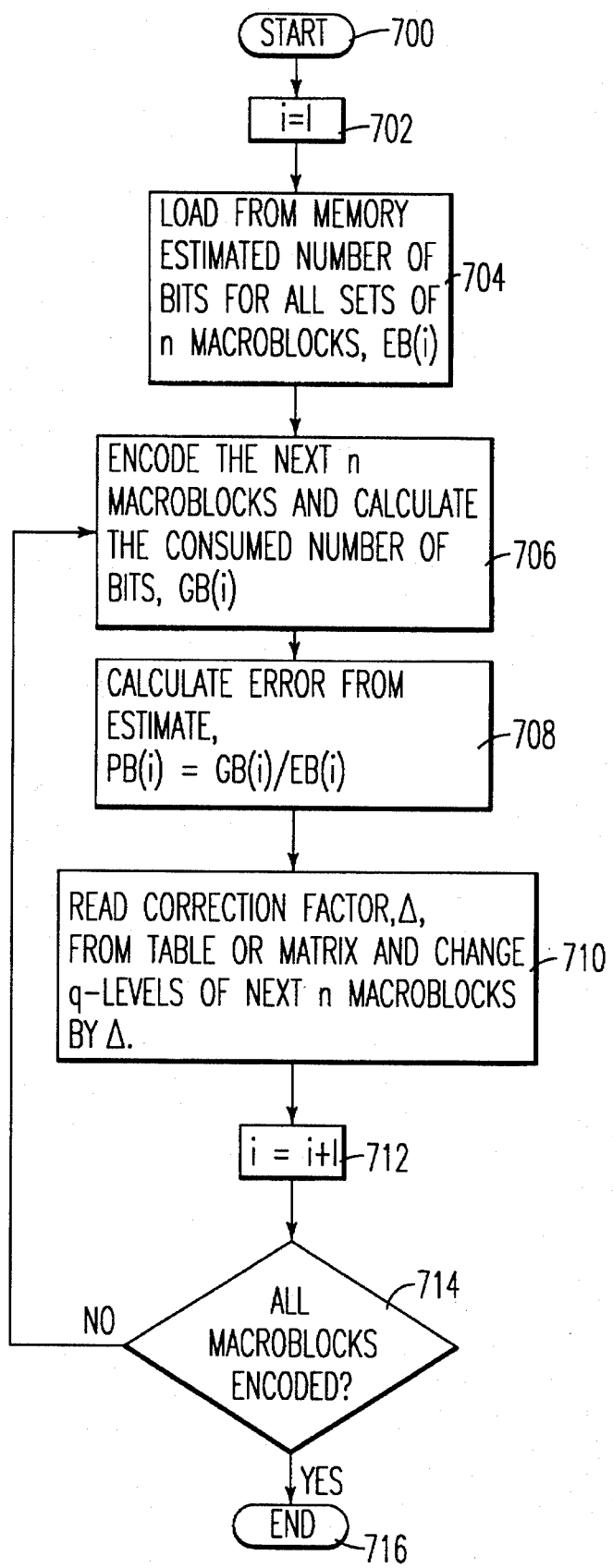
FIG. 26 is a flowchart illustrating the general process of loading from memory the expected number of bits to be used in each of the sets of n macroblocks, and then for each set of n macroblocks re-encoding, counting the resulting number of bits, calculating the accuracy of the estimation based on the expected number and generated number of bits and adjusting the pre-assigned quantization levels of the next n macroblocks to remain close to the target size of the series of frames.

FIG. 26 is a flowchart illustrating a method for re-encoding a set of digital video frames with pre-assigned quantization levels. Adjustments are made to the pre-assigned quantization levels based on how accurately a quantizer model estimated the number of bits that would be generated by re-encoding versus the actual number of generated bits. In FIG. 26, the rate-controlled coding process starts at step 700 and then designates, by setting i=1 in step 702, the first set of n macroblocks as the current set of macroblocks. Step 704 loads the complete set of estimated number of bits, EB(i), that will be used in re-encoding each set of macroblocks, MB(i). MB(i) is then re-encoded in step 706, and the number of actually generated bits is stored as GB(i). The percentage difference between the generated bits, GB(i), and estimated bits, EB(i), is calculated in step 708 as an estimation ratio, PB(i)=GB(i)/EB(i). Additionally, the system can calculate the cumulative estimated number of bits, EB'(i), and the cumulative generated number of bits, GB'(i), for all re-encoded sets of macroblocks, where EB'(1)=EB(1), GB'(1)=GB(1), EB'(i)=EB'(i-1)+EB(i) and GB'(i)=GB'(i-1)+GB(i), for i≧2. Therefore, as an alternative to the illustrated step 708, PB(i) can be calculated using the cumulative estimated number of bits, EB'(i), and the cumulative generated number of bits, GB'(i), by using PB(i)=GB'(i)/EB'(i). This provides a more accurate indication of how the re-encoding process as a whole is meeting the target number of bits, instead of an indication of how accurately a particular set of macroblocks was encoded. In step 710, the estimation ratio is used to determine a correction factor for the q-levels in the next set of macroblocks, MB(i+1).

This correction factor is determined using one of two methods. The first correction factor determination method steps through a single sorted list of ratios in a table of ratio values, called a ratio lookup table, and determines between which two ratios the estimation ratio falls. The index, j, of the larger of the two numbers in the table is used as a correction factor index. The correction factor index is used to look up a correction factor, Δ(i), in a correction factor table by choosing the $j^{th}$ element in the table as the correction factor, and the next set of macroblocks, MB(i+1), are adjusted by Δ(i). The ratio lookup table, RT, contains, for example, the sorted values:

RT={0.85, 0.90, 0.95, 1.0, 1.05, 1.10, 1.15, 1.2, 1.5} and the correction factor table, CT, contains the values:

CT={-3, -2, -1, 0, 1, 2, 3, 4, 9}.

FIG. 30 is a flowchart which illustrates a process for determining a correction factor index from a ratio lookup table using an estimation ratio. Assume, for purposes of illustration only, that PB(i)=0.87. The index, j, is initially set to 1 in step 722. The process of comparing PB(i) to RT(j) is begun, and in step 724, PB(i)=0.87 is compared to RT(1)=0.85, as defined in the above lookup table. Since 0.87 is greater than 0.85, the process continues to step 726. Since in step 726 it is determined that there are remaining indices, control is passed to step 728 and j is incremented by one. Returning to step 724, PB(i)=0.87 is now less than RT(2)=0.90, so control is passed to step 730 which ends the search for the correction factor index.

FIG. 31 is a flowchart which illustrates how to look up a value in a lookup table given an index into the table. In FIG. 31, to determine the correction factor according to the first method, the index j, which is 2 is used to look up the corresponding entry in CT. Reading from the second position in CT, the correction factor is determined to be -2 in step 736. Therefore, the q-levels of MB(i+1) are changed by -2. Likewise, if PB(i)=1.12, then index 7 corresponds to the first entry in RT that is larger than PB(i), so the correction factor in CT at the seventh position is 3. Thus the q-levels of MB(i+1) are changed by 3, e.g., by adding 3 to the q-level of MB(i+1).

The second correction factor determination method uses a similar process to the first method, except the percentage of sets of macroblocks that have been re-encoded is used as a second parameter in determining the correction factor. Additionally, instead of reading a correction factor from a table, the correction factor is read from a matrix. By using the percentage of sets of macroblocks that have been re-encoded, or the percentage of sets of macroblocks unre-encoded, a more gradual correction can be made at the beginning of a series of frames and more significant changes can be made at the end, if necessary. This allows the system to correct more accurately for variations between the quantizer model and the actual number of generated bits. By using an inverse relation between the number of sets of macroblocks which remain to be re-encoded and the significance of correction, and assuming that an overestimation in one set of macroblocks will be offset by an underestimation in another set of macroblocks, unnecessary corrections are avoided.

As an example of a correction factor matrix, CTM, of the second correction factor method, assume CTM is defined as below:

$$CTM = \begin{bmatrix} -1 & -1 & 0 & 0 & 0 & 1 & 1 & 2 & 4 \\ -2 & -1 & 0 & 0 & 0 & 1 & 1 & 2 & 5 \\ & & & & \cdot & & & & \\ & & & & \cdot & & & & \\ & & & & \cdot & & & & \\ -3 & -2 & -1 & 0 & 1 & 2 & 3 & 4 & 8 \\ -3 & -2 & -1 & 0 & 1 & 2 & 3 & 4 & 9 \end{bmatrix}$$

If at the beginning of a series of frames, the estimation ratio indicates an overestimation of the number of bits necessary, there is no need to immediately reallocate all the unused bits to the next slice. If the unused bits were immediately consumed by MB(i+1), then an MB(k), where k≧i+1, which consumed more bits than estimated, would force MB(k+1) to a higher quantization level unnecessarily. The unused bits could have been carried forward in the re-encoding process from MB(i) until needed and then used by MB(k).

FIG. 32 is a flowchart which illustrates how a correction factor is calculated using both an estimation ratio and the number of remaining unre-encoded sets of macroblocks. For a case of overestimation of the number of bits required, i.e., having previously determined that the correction factor, j, equals 2 for PB(i)=0.87, step 744 of FIG. 32 determines that the overestimation occurs in the first percent of the re-encoding process. The element at (2,1) of CTM is -1 and is therefore chosen as the correction factor. This dampens the correction effect early in the re-encoding process, which in the first method would have been -2. However, if ninety-nine percent of the re-encoding process has been performed and the estimation ratio is PB(i)=1.12, element (99, 7) which is 3 would be chosen, thus fully correcting at the end of the re-encoding process.

Referring back to FIGS. 27A–27C, a frame with pre-assigned q-levels is illustrated as a further example where the number of macroblocks in a set is equal to the number of macroblocks in a single slice. EB(i), the estimated number of bits, is calculated as described above and loaded into a memory used in the rate control process for MB(i), macroblock i, of FIG. 27A and then MB(i) is actually re-encoded. The number of generated bits, GB(i), is determined, the estimation ratio is calculated, and the correction factor Δ(i) is looked up. As is shown in FIG. 27B, the macroblocks of MB(i+1) are then corrected by Δ(i) and the process is repeated for MB(i+1). FIG. 27C shows the change in MB(i+2) after the length of MB(i+1) has been estimated and calculated and its estimation ratio determined. This process is continued until all macroblocks and partial macroblocks have been re-encoded and corrected.

A further example is given in reference to FIGS. 27A and 27D. In this example, the number of macroblocks per set is the number of macroblocks in two slices. After calculating EB(i), GB(i) and PB(i), the macroblocks of MB(i+1), which comprise two slices, are corrected by Δ(i), as illustrated in FIG. 27D. This re-encoding and correction process is continued as in the previous example until all macroblocks have been re-encoded.

Figure 28A:
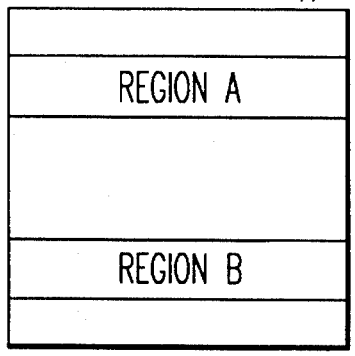
FIG. 28A is a frame containing two different regions whose quantization levels are changed.
Figure 28B:
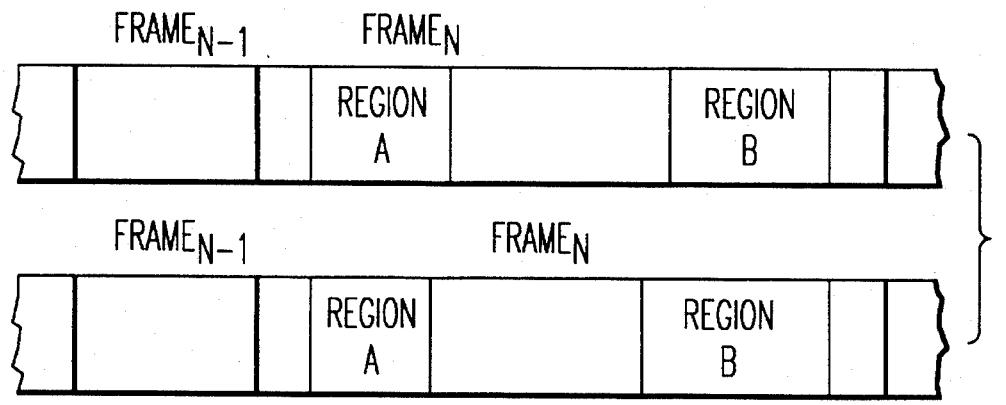
FIG. 28B is a picture of two possible encodings of the frame of FIG. 28A illustrating the change in the number of bits in a video stream used to represent the two different regions whose quantization levels were changed.

The changes caused by the re-encoding process are illustrated in FIGS. 28A and 28B. Two equal size regions, Region A and Region B, of Frame N are initially encoded using a nearly equal number of bits. The user designates that the quality of Region A is to be decreased and the quality of Region B is to be increased. However, it is desired to have the number of bits used for the original encoding be as close to the number of bits of the re-encoding as possible. After re-encoding Frame N, Frame N contains the same number of bytes as were generated from the original encoding, but Region A is coded with fewer bits and Region B uses the additional bits. This decreases the quality of Region A and increases the quality of Region B as requested by the user. The rate control process of the present invention makes the re-encoded number of bits of the frame be as close to the original number of bits as possible by correcting for minor errors in the estimated number of bits determined using a rate-quantizer function.

Figure 29:
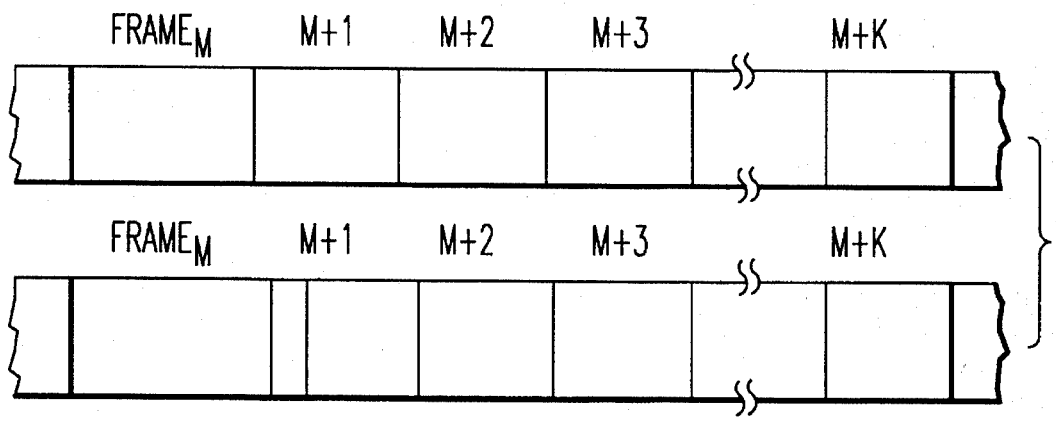
FIG. 29 is a video stream illustrating the change in the number of bits used to represent a series of images where the total length of the re-encoded series equals the series original length.

FIG. 29 illustrates changes to a digital video stream by reallocating bits from a plurality of frames and giving them to a second plurality of frames. Although individual frame sizes change, the total size of the set of frames should remain the same. The rate controller allows the number of bits for the re-encoding of the plurality of frames to be finely tuned to be the same as the number of bits from the original encoding, even if the rate-quantizer function used to determine the estimated number of bits is slightly in error.

B. Re-Encoding While Avoiding Decoding Artifacts At Edit Points

1. Restoring the Encoder to the State Used When Originally Encoding

The above-described temporal and spatial quality editing operations allow the quality of video to be changed by re-encoding the video with new quantizer values. However, simply substituting the re-encoded video into the original video may result in unacceptable decoding artifacts which appear as a visible glitch at the edit point of the video. These visible glitches will occur even if the new segment being substituted has the proper syntax such as MPEG-2 syntax and the buffer constraints across the edit boundary are satisfied. The problem results from the non-availability of the last reference frame (the last P-frame) preceding the edit segment, and a different reference frame (the last P-frame) at the end of the edit segment. This causes a disparity between the encoding and decoding of the first set of B-frames at the start of the edit segment, and in the first set of B-frames immediately following the edit segment.

In order to properly perform the edit of the digitally encoded and compressed video, it is first necessary to determine the proper positions in the encoded bitstream which correspond to the desired edit points. This process has been explained above in section VI which describes utilities to access the encoded video. As explained above, this is performed by summing up the number of bits used for each previously encoded frame in order to determine the bit offset for the picture in question. Alternatively, a directory could be used to maintain information indicating the exact location of a specific frame or time period in the encoded bitstream.

Figure 33A:
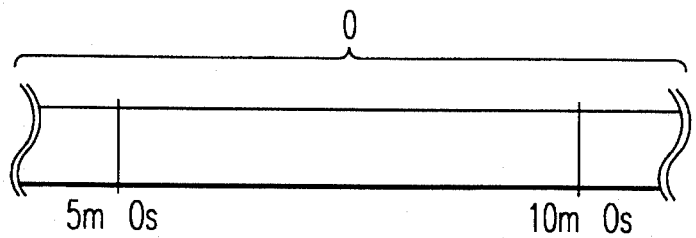
FIG. 33A illustrates a section of original video in an encoded format.
Figure 33B:
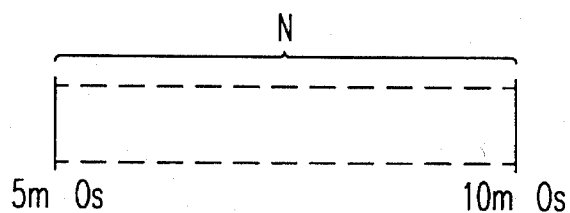
FIG. 33B illustrates a section of new video in an unencoded format which is to be substituted into the original encoded video.
Figure 33C:
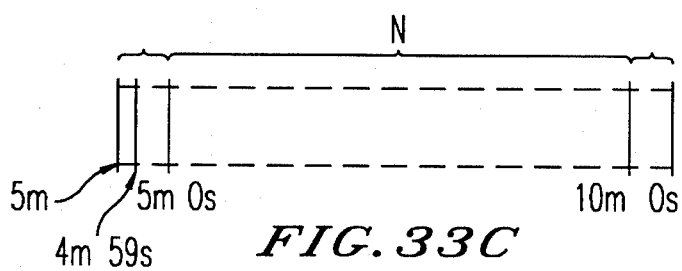
FIG. 33C illustrates the unencoded new section of video with unencoded sections of the original video at the ends thereof.
Figure 33D:
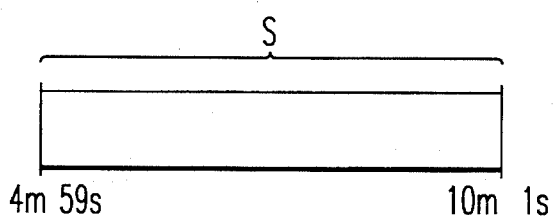
FIG. 33D illustrates the video in FIG. 33C in an encoded format which is to be substituted into the original encoded video.
Figure 33E:
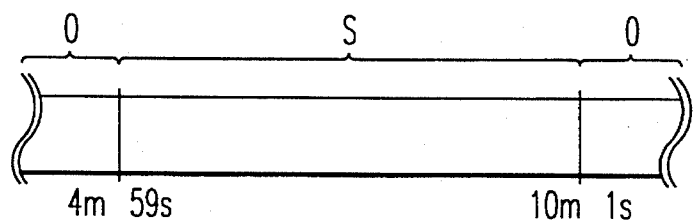
FIG. 33E illustrates the original encoded video having the substituted encoded video included therein.

Turning now to FIGS. 33A–33E, there are illustrated time periods of video which are used as examples for explaining the operation of the invention. In FIG. 33A, an original section of encoded video, O, is illustrated. It is desired to replace the encoded time period of 5 m 0 s to 10 m 0 s (five minutes, zero seconds to ten minutes, zero seconds) with a different section of video. FIG. 33B illustrates a new section of unencoded video, N, which is to be substituted into the encoded video of FIG. 33A. The dashed lines in FIGS. 33B and 33C are used to denote unencoded video and the solid lines in FIGS. 33A, 33D and 33E are used to denote the encoded video.

If only the section of new video illustrated in FIG. 33B was encoded using a normal MPEG-2 mode in which a GOP referenced a previous GOP, and substituted into the video illustrated in FIG. 33A, decoding artifacts would exist at the edit points 5 m 0 s and 10 m 0 s due to the lack of an accurate reference frame necessary for the bidirectional decoding used in MPEG-2 video compression. This problem exists at both the five minute and the ten minute points which are handled differently by the invention, due to the fact that the beginning of a GOP refers back to a previous GOP but the end of the GOP does not refer forward to the next GOP.

The manner in which decoding artifacts are prevented at the beginning of a GOP is to re-create the last P-frame of the preceding GOP which is used as a reference frame for the first two B-frames of the GOP. This is accomplished by placing, for example, one GOP of the original video at the beginning of the video to be inserted and this added video is illustrated from 4 m 58.5 s to 4 m 59 s in FIG. 1. In the examples, one GOP is equal to one half of a second, although other time periods for the GOPs are possible. The encoder is re-run for this section with the same quantizer values used for the original encoding to create the last P-frame of the GOP immediately before 4 m 59 s. All information resulting from the re-encoding of this short section of video, except for the last P-frame may be discarded.

In order to prevent decoding artifacts at the end of the edit segment, a one second period (e.g. from 10 m 0 s to 10 m 1 s in FIG. 33C) of the original video is added to the end of the new video to be substituted and this one second segment is encoded using the same quantizer values as were used during the original encoding. If this one second period were not added to the end of the video, the two B-pictures immediately beyond the 10 m 0 s mark, assuming that 10 m 0 s is the dividing point between two GOPs, would refer back to a reference picture which is different after the edit than before the edit. While the examples have been described as adding one half second or one second periods of video to new the section, the concept can be generalized to adding GOPs.

Even though the decoding artifacts will no longer appear at the 10 minute mark, as the edit point at the end is now the 10 m 1 s point, one must consider if decoding artifacts will result at 10 m 1 s. Visible decoding artifacts will not result because the two B-frames immediately after 10 m 1 s mark will refer back to essentially the same reference frame to which they previously referred. Even though the two B-frames immediately after the 10 m 0 s mark will not refer back to the same reference frame to which they previously referred, the two B-frames were re-encoded and therefore properly refer back to a new reference frame. Accordingly, no visible decoding artifacts will be present at the 10 m 0 s or the 10 m 1 s points.

The two GOPs (one second) added to the end in FIG. 33 should be sufficient time for the last P-frame to be nearly equivalent to the original encoding. If it could be guaranteed that the exact same quantizer values are used when re-encoding the original video after the 10 minute point, one GOP (one half second) should be sufficient to appropriately generate a correctly encoded reference picture. However, two GOPs are preferred to assure proper quality. Even though it is desired to use the same quantizer values as originally used, in practice there may be minor deviations from the original quantizer values and therefore, two GOPs are preferred.

In addition to original periods of the video being used from 4 m 58.5 s to 4 m 59 s and 10 m 0 s to 10 m 1 s, FIG. 33C illustrates additional original video from 4 m 59 s to 5 m 0 s. This video is not essential to preventing decoding artifacts and therefore, the one half second to determine the last P-frame could be used immediately before the 5 m 0 s mark (e.g. from 4 m 59.5 s to 5 m 0 s). However, the 4 m 59 s to 5 m 0 s period is added to the new video to eliminate any chance of perception by the operator that the manual changing of quality has had an effect beyond the edit boundary. This misperception is due to the fact that the coding order for frames at the beginning of an MPEG GOP is IBB but the frames are displayed as BBI. The one second period is encoded using the same quantizer values as were used during the original encoding of that time period. The manner of obtaining the previously used quantizer values is explained below. If the one second period was not added from 4 m 59 s to 5 m 0 s, the substitute encoded video illustrated in FIG. 33D would begin at 5 m 0 s.

The useful data resulting from the encoding of the video in FIG. 33C is illustrated in FIG. 33D as the substitute data, S, which runs from 4 m 59 s through 10 m 1 s. This substitute data, S, is then substituted into the original encoded data illustrated in FIG. 33A which results in the final bitstream as illustrated in FIG. 33E.

The unencoded and encoded information illustrated in FIG. 33A is video in the preferred embodiment, but can be audio, or other types of information which use previous and/or subsequent information to decode the encoded information.

The new section of video in FIG. 33B is obtained from any video source and may be video generated by the temporal or spatial editing process described above. The original video in FIG. 33C from 4 m 59 s to 5 m 0 s and 10 m 0 s through 10 m 1 s is the original video having the same quantizer values used for the original encoding. This video at the ends of the new video N in FIG. 33C is simply obtained using the temporal editing process and setting the quality of the end sections to protected as described in the temporal manual editing section, meaning that the quantization values are to remain the same. Alternatively, the video in FIG. 33B may be completed unrelated to the video in FIG. 33A and may have a different length. Additionally, it is possible to use the invention to cut out a section of video and not add new video. In this case, no video would exist in FIG. 33B and the 'N' segment and its corresponding encoding would be absent from FIGS. 33C–33E. As long as the last P-frame before the edit segment is properly constructed and one half to one second (one or two GOPs) of the original video is added to the end of the new video to be encoded and encoded with the same quantizer scales used in the original encoding, no visible decoding artifacts will occur in any situation.

Figure 34:
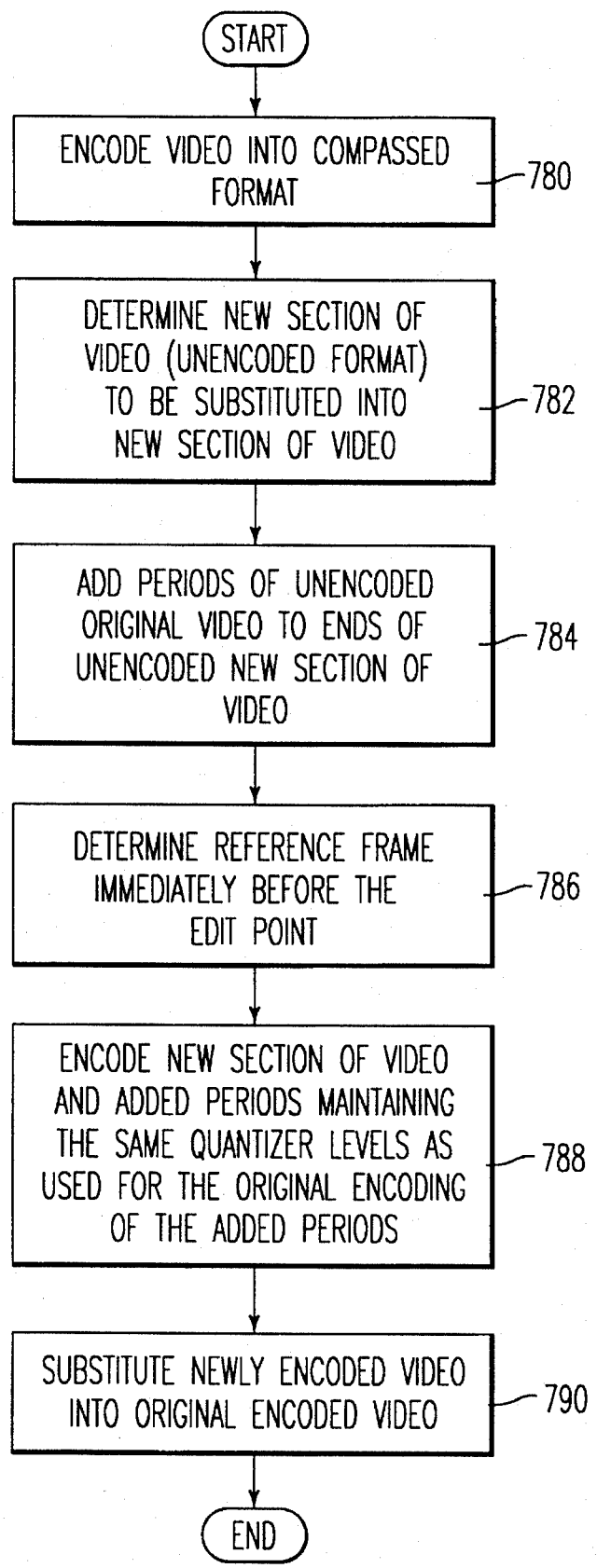
FIG. 34 illustrates a process for substituting a section of video into the encoded video data stream which results in video with reduced decoding artifacts.

FIG. 34 is a flowchart illustrating the process described with respect to FIGS. 33A–33E. After starting, step 780 encodes the video into the compressed format to generate the encoded video illustrated in FIG. 33A. Step 782 determines the new section of video which is in an unencoded format which is to be substituted into the encoded video. This new section of video is illustrated as N in FIGS. 33B and 33C and may represent scenes related to, unrelated to, or have a different time period than the original frame. The start and end point of the video to be substituted are 5 m 0 s and 10 m 0 s, respectively. However, the actual start and end points of the final encoding to be substituted, may be different, as illustrated in FIG. 33D.

Step 784 adds periods of unencoded video to the ends of the encoded new sections of video for the reasons described above in order to prevent decoding artifacts at the edit points 5 m 0 s and 10 m 0 s. These added periods are from 4 m 59 s through 5 m 0 s and 10 m 0 s through 10 m 1 s, although the period from 4 m 59 s to 5 m 0 s is not essential.

Step 786 determines the P-frame immediately before the edit point. As the video being substituted in FIG. 33E is from 4 m 50 s to 10 m 1 s, the last P-frame immediately before 4 m 50 s needs to be determined. This P-frame is determined by running the encoder for the time period from 4 m 58.5 s to 4 m 50 s with the quantizer values used to originally encode the P-frame. The quantizer values are determined by retrieving the original quantizer values from the macroblock log file having the format illustrated in either FIG. 10A or 10B. However, the quantizer values for each macroblock of an entire movie consume a large amount of storage space and it may not be desirable to store the quantizer values. As an alternative, the quantizer values can simply be created using are the rate control status pertaining to the video buffers for the I, P, and B frames, the target bits for the picture shown in the picture layer log file of FIG. 9B as allocated_bit, the activity level of the picture, stored as mean_activity in FIG. 9C and the activity level of the macroblocks which are computed by the encoder during encoding. The rate control status is stored in the picture layer log file as illustrated at the bottom of FIG. 9C as S1_i, S2_i, S1_p, S2_p, S1_b, and S2_b which stores the rate control status information for the I, P, and B video buffers respectively. One of ordinary skill in the video encoding art, based on the teachings contained herein, could determine the quantizer values for the desired P-frame without undue experimentation.

As an alternative manner of determining the quantizer values of the reference frame, and/or the encoded reference frame itself, the encoded version of the reference frame in the encoded reference stream can be decoded in a known manner. Further, any other method of obtaining the needed reference frame can be performed.

After the reference P-frame is obtained, the video is encoded in step 788 while maintaining the same quantizer levels as the original encodings of the end sections. The quantizer levels are obtained as described above. The resulting encoded video is illustrated in FIG. 33D.

Step 790 then substitutes the newly encoded video into the originally encoded video and the final product, as illustrated in FIG. 33E is obtained. This encoded video containing substituted encoded video has minimal decoding artifacts at the edit points.

2. Re-Encoding in a Closed Group of Pictures Mode

As an alternative to the procedure described in FIGS. 33A–34, it is possible to perform a different procedure for the encoding of the beginning of the new video while still reducing decoding artifacts. In this procedure, the manner of treating the trailing end of the video is the same as described above with respect to FIGS. 33A–34.

As an example of this alternative embodiment, use FIG. 33A as the original encoded video and FIG. 33B as the unencoded video to be substituted into FIG. 33A. No original unencoded video is added at the beginning edge of FIG. 33B, and as described for FIG. 33C, two GOPs (one second) of corresponding original unencoded video are added to the end of FIG. 33B and the video to be encoded is as illustrated in FIG. 35A.

Figure 35A:
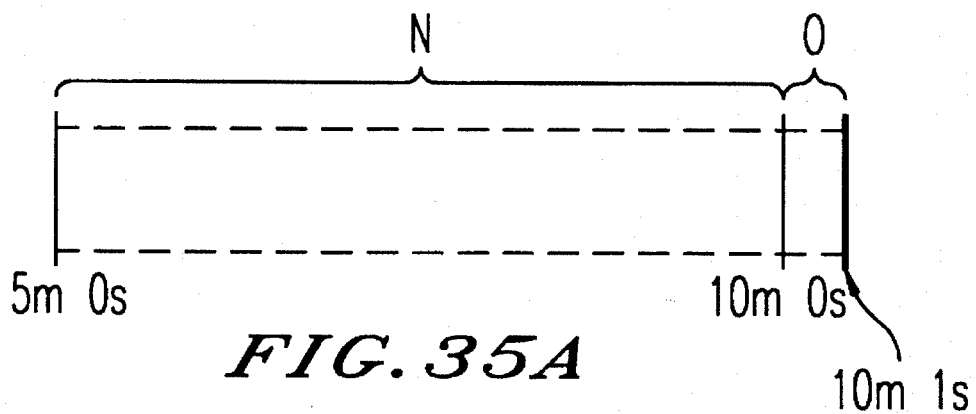
FIG. 35A illustrates an unencoded new section of video with an unencoded section of the original video at the trailing end.
Figure 35B:
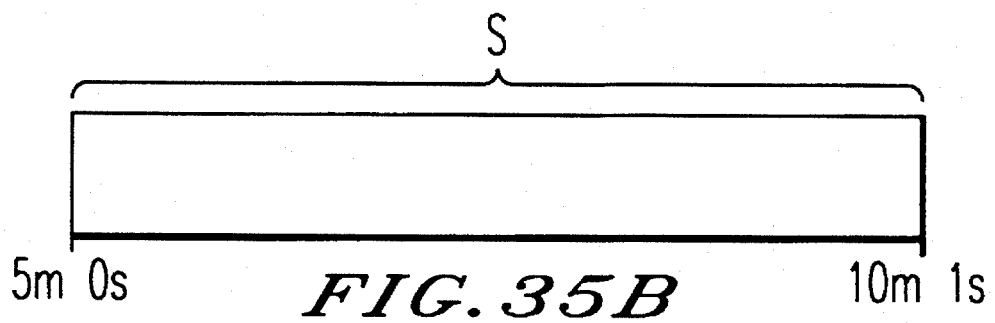
FIG. 35B illustrates a section of encoded video to be substituted into the originally encoded video illustrated in FIG. 33A.

If the encoder encodes the video of FIG. 35A in the closed GOP mode for the first GOP of the video while increasing the bits for the B-frames without a second reference picture, the visible decoding artifacts at the start edit point will be eliminated. The encoding of the end portion using the same quantizer levels as used for the original encoding from 10 m 0 s to 10 m 1 s is the same as described above with respect to FIGS. 33A–34, and the resulting encoded video is illustrated in FIG. 35B. The closed GOP mode is described in the MPEG-2 standard at section 6.3.8. The closed Group Of Picture mode flag is set to 1 which indicates that encoded B-frames have been encoded using only backward prediction and the reference frame of the previous GOP is not used. However, as one of the reference frames normally used for the bidirectional frames is not available, the B-frames will have reduced quality, unless a procedure is performed to eliminate the reduced quality.

In order to solve the problem of reduced quality of B-frames encoded in the closed GOP mode, the number of bits for the B-frames having only one direction of prediction is increased so that the quality of the frame is not substantially reduced. As the B-frame has only one direction of prediction, the number of bits is preferably increased to approximately the number of bits used for ordinary P-frames. However, the number of bits may vary, depending on the desired picture quality.

Figure 35C:
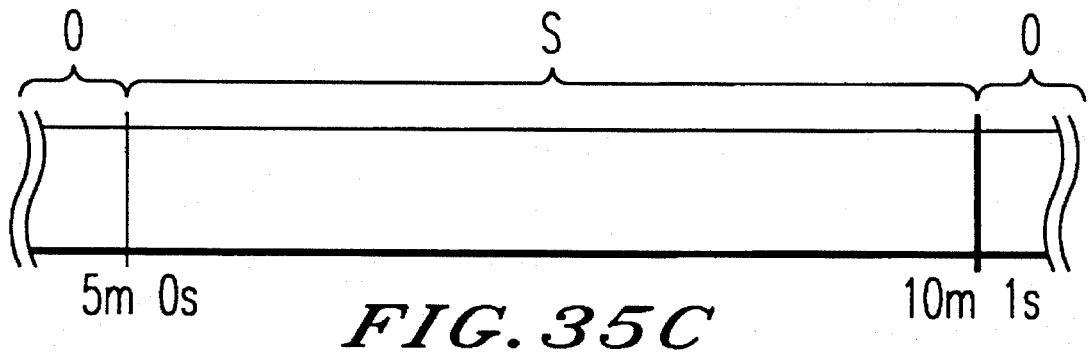
FIG. 35C illustrates the originally encoded video of FIG. 33A containing the substitute encoded video of FIG. 35B.

The encoded video of FIG. 35B can be directly substituted into the previously encoded video, as illustrated in FIG. 35C.

A flowchart describing the process of using the closed GOP mode is illustrated in FIG. 36. In FIG. 36, the video is encoded into the compressed format in step 800 and the new section of video which is to be substituted into the encoded video is determined in step 802 in a similar manner as described with respect to steps 780 and 782. Next, step 804 adds GOPs as needed (one or two GOPs) of unencoded original video to the trailing end of the new section of video.

Step 786 then encodes the video. The first GOP of the new video is encoded in the closed Group Of Pictures mode and the number of bits for the bidirectionally predicted frames which are missing the reference frame is increased to approximately the number of bits used for single direction predicted frames, P-frames. If the total number of bits for the encoded video is to stay the same, the extra bits needed for the bidirectional frame must be removed from other frames. This may be accomplished above as described in the sections on spatial and/or temporal manual editing. Next the remainder of the new section of video is normally encoded. Last the added period at the trailing end of the new video is encoded using the same quantizer values as were used during the original encoding of the added period to prevent decoding artifacts at the end point of the edit segment. Finally, the newly encoded video is substituted into the originally encoded video in step 808.

By either of the processes described above and illustrated in FIGS. 34 and 36, the final version of the encoded video containing the substitute encoded sections has a reduced number of decoding artifacts and therefore, the visible video glitches are reduced, increasing the quality of video as compared to if no correction steps were taken to prevent the decoding artifacts. The examples described above relate to edit points at boundaries of GOPs. However, the above teachings can be applied to edits which are not at GOP boundaries.

The process to reduce decoding artifacts is carried out using workstations 10, 30, and 40 along with the playback VTR 51 and the video encoder 50. However, other hardware alternatives are possible and the above aspect of the invention may be implemented using any general purpose computer or specific hardware to perform the process. The calculations used to determine the edit points and to determine the video to be added at the end of the new section of video to be encoded are performed either in workstation 10 or workstation 30.

IX. RATE-QUANTIZER MODELING USED FOR ENCODING

To accurately estimate the number of bits that will be needed to represent a series of macroblocks resulting from an encoding process, a frame can be pre-encoded using several quantization levels that are representative of normal quantization levels for a frame. The frame then can be actually encoded using the representative quantization levels as well as other quantization levels. In the preferred embodiment, illustrated in FIG. 1A, workstation 10 loads predetermined quantization levels into the video encoding device 50. The video encoding device 50 then performs the pre-encoding. The most accurate method of generating a quantization model would involve encoding each frame at each possible quantization level and recording the statistics on the resulting number of bits used. However, this process would require n passes over the raw video where n is the total number of quantization levels used to encode the raw video. As this method is prohibitively long, this invention provides an improved method, which generates similar results to the optimal method in a fraction of the time needed for the conventional method. The method involves assigning various parts of plural frames with different quantization levels such that a representative bit-rate versus quantization level average can be calculated for each of the plural frames during a pre-encoding phase. This saves n−1 pre-encodings for each frame while generating accurate quantization level versus bit-rate statistics. These statistics can then be interpolated to estimate the number of bits to be used by a macroblock whose quantization level versus bit-rate was not determined in the pre-encoding process. In two alternate embodiments, the method pre-encodes a majority of frames from the raw video or all the frames of the raw video.

FIG. 37A shows a frame of raw video that has two different quantization levels assigned on a macroblock by macroblock basis in the pre-encoding process so that a two point quantization level versus bit-rate line is generated for plural frames and the results are stored for the plural frames. In alternate embodiments, the quantization levels could be assigned in groups or strips of macroblocks. FIG. 37B illustrates the uniform distribution of four quantization levels across a frame where the quantization levels are assigned in different positions in the frame to avoid statistical anomalies based on position. In the illustrated frame, for each row, j, the first quantization level in the row is $q_{j\ mod\ 4}$. This results in a four point quantization level versus bit-rate curve. FIG. 37C shows the same process as FIG. 37B, but the quantization levels are assigned in a block fashion. Although a single pass of this process produces an accurate quantization level versus bit-rate curve, in an alternate embodiment, this process is repeated a number of times across the plural frames to generate more accurate statistics that approach the statistics that would be gathered by analyzing each frame at each quantization level.

Figure 38:
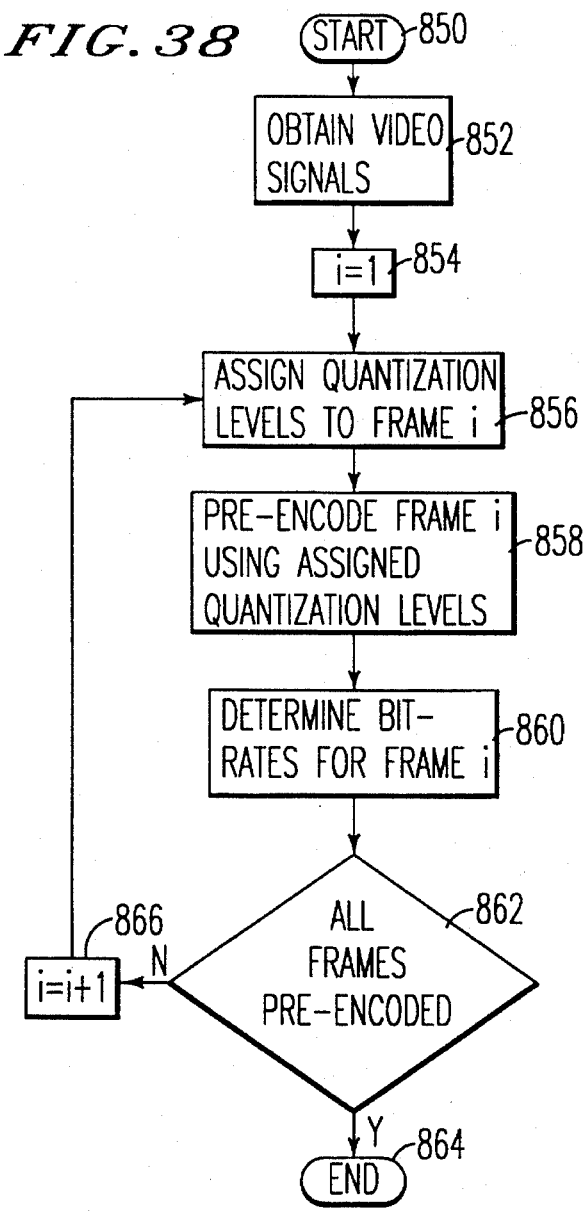
FIG. 38 is a flowchart which illustrates the process of obtaining video signals and pre-encoding them to determine a bit-rate for each quantization level specified in the pre-encoding phase.

FIG. 38 illustrates the general process of determining the quantization level versus bit-rate characteristics of plural frames. The process starts in step 850 and continues in step 852 by obtaining video signals which represent the raw video to be pre-encoded. In step 854, the process signifies that the first frame, i=1, where i is the frame index, is to be pre-encoded. Continuing to step 856, the quantization levels for $frame_{i=1}$ are assigned uniformly across the frame to prevent statistical anomalies. In step 858, $frame_{i=1}$ is pre-encoded using the quantization levels assigned in step 856. The results of step 858 are determined in step 860 such that the bit-rates for each quantization level assigned in step 856 is recorded for $frame_{i=1}$. In step 862, the method determines whether or not all of the plural frames have been pre-encoded. Since only one frame has been pre-encoded, the process continues to step 866 where it designates the second frame as the frame to be encoded by adding one to the frame index, i. Control is then returned to step 856 which assigns quantization levels to $frame_{i=2}$. The process of assigning, pre-encoding and determining the bit-rates in steps 856, 858, 860 and 862 are continued for all remaining frames. When step 862 determines that all of the plural frames have been pre-encoded, the process ends by moving to step 864. When step 864 has been reached, a quantization level versus bit-rate curve is approximated by using the quantization levels assigned in step 856 and their corresponding bit-rates.

Having generated quantization level versus bit-rate curves for plural frames of a raw video, the pre-encoding process moves on to an encoding process by which parts of the raw video are encoded to fit on a digital storage medium, i.e., a compact disc. One, plural, a majority or all of the raw video segments may be encoded in this second phase. If the raw video segments are to be encoded automatically, an encoder uses an activity measure of each macroblock combined with a corresponding quantization level versus bit-rate curve to determine quantization levels to be assigned to macroblocks of each frame in the segments. Each frame in the segments are then encoded and their resultant number of bits are compared with an estimated number of bits based on the quantization levels assigned. In cases where the resultant number of bits varies greatly from the expected number of bits, the automatic encoder attempts to compensate for the variation by changing the quantization levels of the next set of macroblocks to be encoded. This sequential process allows an automatic encoder to encode segments of the entire raw video to match a target number of bits.

Figure 39:
FIG. 39 is two recorded frames and their associated quantization levels versus bit-rates.

In addition, the quantization level versus bit-rate curves of later frames in a video sequence can be used to regulate quality throughout a resultant encoded digital video. As is shown in FIG. 39, Frame N is known to generate fewer bits than Frame M for the same quantization levels. Therefore, Frame M requires more bits to generate the same quality image as in Frame N. When Frame N is encoded at a desired quality without using all its allocated bits, the encoder can carry the extra bits forward to be used in encoding Frame M which requires more bits per unit time for the same quality. This capability is not available in systems with only a single frame look ahead buffer when M>N+1.

X. COMBINING AUDIO, VIDEO, AND SUB-PICTURE DIGITAL SIGNALS USING DATA STRUCTURES

The above portion of this patent specification is primarily concerned with the techniques used during encoding of audiovisual information to generate encoded and compressed digital audiovisual signals. However, in order for the audio and video information to be combined, stored, and subsequently decoded in order to recreate or reconstruct the audiovisual information, such as on a television, it is necessary to combine and interleave the audio, video and other information which has been encoded so that it can be stored and subsequently decoded. The combining of the audio, visual, and other information has been briefly described above as a formatting process which occurs in the workstation 20 illustrated in FIG. 1A. Further details of the formatting process and resulting data structures and signals will now be given.

Turning now to FIG. 1A, the MPEG video and encoded audio are stored in the disk 21. Additionally, sub-picture information which includes subtitles and/or graphical representations which are displayed and/or overlaid on top of the video are earlier encoded by a separate workstation, for example, and the encoded sub-picture information is stored on a digital storage medium such as a floppy disk, tape, or other type of disk. This stored sub-picture information is read by one of the digital storage devices 22, combined in a formatting process with the encoded audio and video in disk 21, and formatted into a single data stream by workstation 20. The output of the formatting process is stored on the disk 21 and then written to a digital tape of the digital storage devices 22. The tape is then used to create optical discs by known optical disc manufacturing methods. Accordingly, not only is the invention related to the encoding of the audio and visual data but is also related to a process and system for combining encoded, audio, video, and sub-picture data into a data stream, the digital storage medium and data structures thereon which store the formatted audio, video, and sub-picture information, and is also related to a decoding process and a decoder which separates and reconstructs the audio, video, and sub-picture information for display to a user or consumer. It is to be noted that the data structures on the optical disc or within the formatted data pertain to specific electronic structural elements which impart a physical organization on the information stored in memory. These specific electronic structural elements are stored in an optical disc which can be used for a video on demand system or which are decoded for a user or consumer using a digital video disc player.

Before describing the specific features of the format structure of the disc or other storage medium for the encoded audiovisual information, known standards on which the invention improves will be described. ISO/IEC 13818-1 describes system aspects of MPEG video and audio which, along with the references cited therein, are incorporated herein by reference. ISO/IEC 13818-1, referred hereinafter as the MPEG system description, describes the basic multiplexing approach for video and audio streams. These streams are broken up into packets called Packetized Elementary Stream (PES) packets. These packets from different streams including audio, and video streams have a common time base and are combined into a single stream. Also described in the MPEG system description is the use of a transport stream which combines one or more programs with one or more independent time bases into a single stream. The MPEG system description describes the use of Presentation Time-Stamps (PTS) which are used to synchronize multiple elementary streams. The time-stamps are generally in units of 90 kHz and are used in conjunction with a System Clock Reference (SCR), the Program Clock Reference (PCR) and an optional Elementary Stream Clock Reference (ESCR). A complete description of the details of how the data is formatted according to the MPEG system description are found in ISO/IEC 13818-1.

In addition to using a formatting process based on ISO/IEC 13818-1, the data is also formatted and stored according to ISO 9660, 1988, Information Processing—Volume and file structure of CD-ROM for information interchange, which is incorporated herein by reference. This standard describes how the disc volume (not loudness but disc content) and the file structure is organized.

The preferred embodiment, at the current time, of the optical disc which is used to store the audio, video, and sub-picture data is a single layered double-sided disc having a capacity of 5 gigabytes per side with a total storage capacity of 10 gigabytes. Future formats will allow for a multi-layer disc in order to increase storage capacity, and in addition to using a read-only disc, write-once and write-over technology can also be used. Other aspects of the disc which may be used with the present invention are describe in U.S. patent application Ser. No. 08/304,849 filed Sep. 13, 1994, and entitled "Optical Disk and Optical Disk Apparatus", which is incorporated herein by reference. The outside diameter of the disc is preferably 120 mm.

Figure 40:
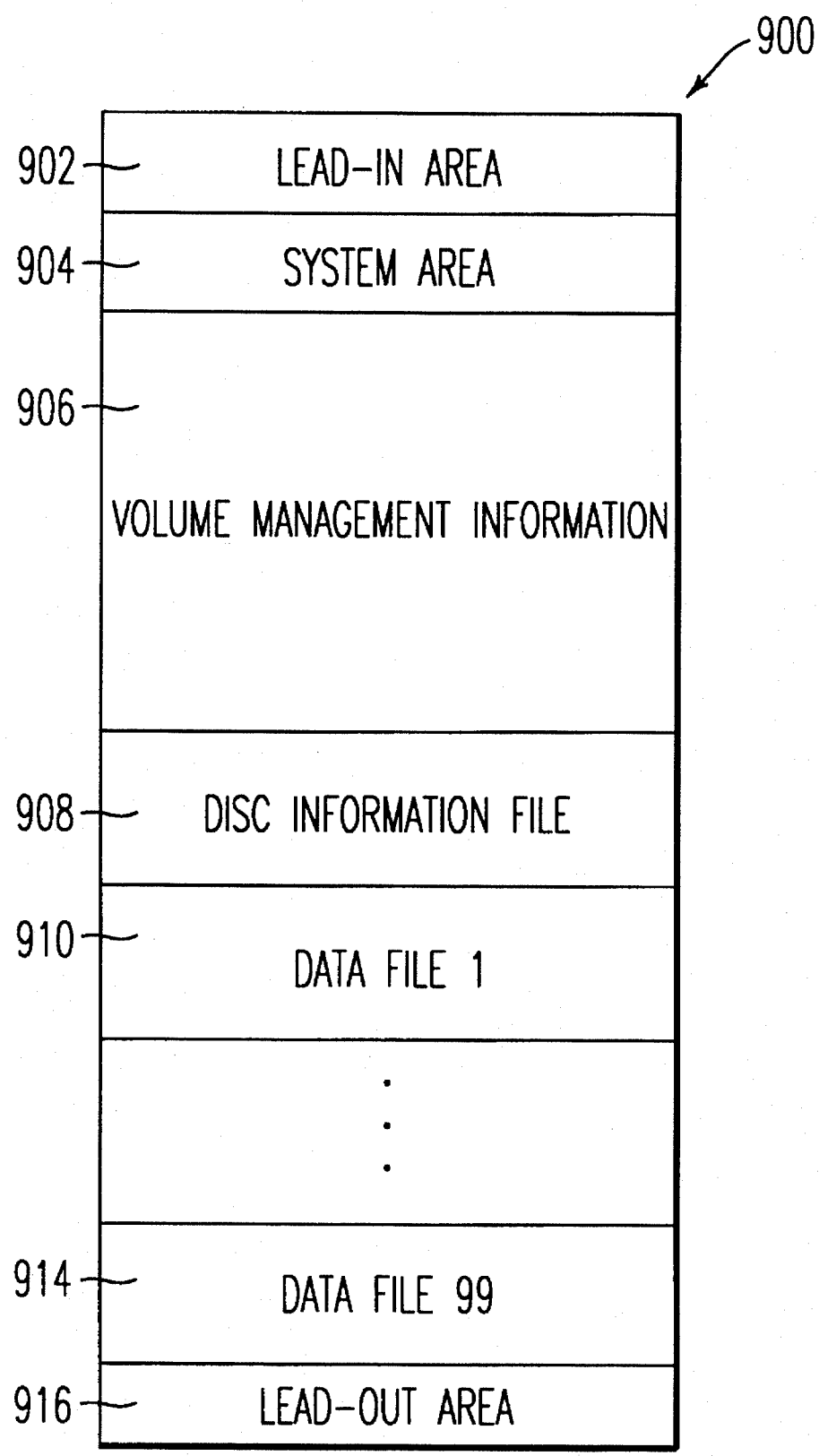
FIG. 40 illustrates an outline of the final format of the encoded data which is ultimately included on an optical disc.

FIG. 40 illustrates the structure of the formatted output of workstation 20 which is ultimately included on an optical disc. This structure 900 includes a lead-in area 902. The lead-in area contains individual fields which controls subsequent processing of the data read from the disc. Exemplary lead-in information included in lead-in area 900 is illustrated in FIG. 3 of U.S. Pat. No. 5,400,077 to Cookson et al, which is incorporated herein by reference.

The system area 904 and volume management information 906 comply with ISO 9660. The volume management information 906 includes a primary volume descriptor, a volume descriptor set terminator, directory records, and path table records. The primary volume descriptor contains basic information of the disc volume such as a descriptor type indicating whether the disc is a video disc of audio disc, a standard identifier, indicating to what standard the disc conforms with, a system identifier, a volume identifier, the volume size, logical block size, path table size, path table size, etc. These and other fields of the system area and volume management information are described in detail in ISO 9660 and a description thereof is omitted for sake of brevity. Additionally, there is a supplementary volume descriptor, if desired, which conforms to ISO 9660.

The volume descriptor set terminator contains the volume descriptor type, the standard identifier, and the volume descriptor version. The directory records contain various directory information of the disc in accordance with ISO 9660. The path table records contain an L-type path table and an M-type path table, as described in ISO 9660.

The disc information file 908 includes further information about the content of the disc and menu information which a user may choose when playing the optical disc. Details of the disc information file 908 are described with respect to FIG. 41.

Each disc contains a minimum of one data file 910 up to a maximum of 99 data files. For example, if there are two different audiovisual programs on the disc, the disc information file 908 would contain the information necessary to generate a menu for the user to choose which of the data files the user wish to use. The data files are described in detail with respect to FIGS. 42–56. The lead-out area 916 but may contain other information describing the disc, how processing is performed, or information concerning related discs.

Figure 41:
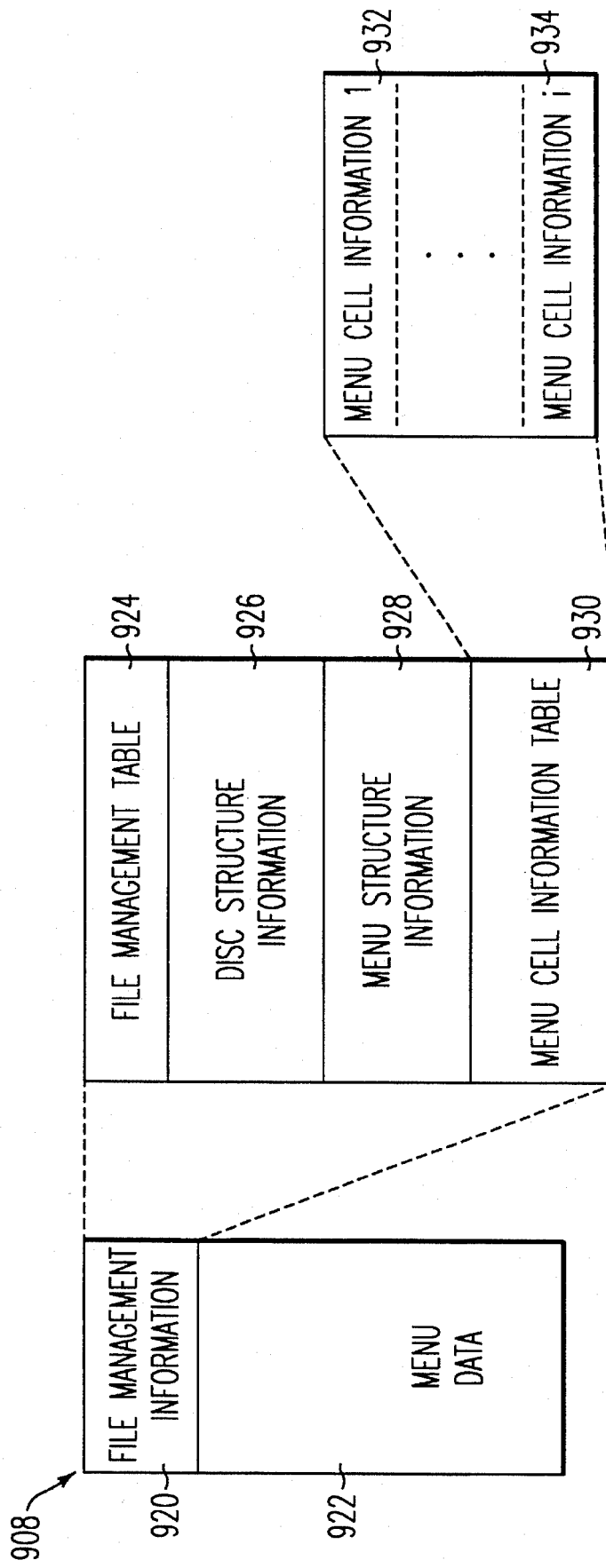
FIG. 41 illustrates the disc information file 908 of FIG. 40.

FIG. 41 illustrates the disc information file 908 of FIG. 40. The disc information file 908 includes file management information 920 and menu data 922 which is information making up a menu with which a user interacts. The menu data includes video data, audio data, and sub-picture data. The file management information 920 includes a file management table 924, disc structure information 926, menu structure information 928, and a menu cell information table 930 which includes a plurality of menu cell information fields 932 and 934.

The file management table 924 includes information related to every aspect of the disc information file. Included within the file management table 924 are a file name which describes the same contents as the corresponding file identifier in the corresponding directory record of the volume management information 906 for identifying a file name. The file identifier identifies the type of file which in this case is a disc structure information file. There is a field which describes the size of the file using the number of logical blocks. Throughout this writing, the term "logical block" is used as defined in ISO 9660. There is an entry describing the size of the file management table using a number of logical blocks, a start address of the disc structure information 926 using the relative logical block number from the head of the file, a start address of the menu structure information 928 described using the relative logical block number from the head of the file, a start address of the menu cell information table 930 using the relative logical block number from the head of the file. If there is no menu data, the value for this field will be zero. There is a field which describes the start address of the menu data 922 using the relative logical block number from the head of the file. When no menu data exists, this entry is zero.

The file management table 924 also contains a field which describes video attributes of video for the menu data. This information includes whether the video compression mode was MPEG-1 or MPEG-2, the frame rate of the video (either 29.97 frames per second or 25 frames per second), a field indicating whether the display aspect ratio is ¾ or 9/16, and a display mode field indicating both pan-scan and letter box modes are permitted, indicating that the pan-scan mode is permitted but the letterbox mode is prohibited, or indicating that the pan-scan mode is prohibited and the letter box mode is permitted.

Similar to the field describing the video attributes, there is also a field describing the audio stream in the file management table 924. Included within this field is an indication of the audio coding mode including whether the audio was encoded according to Dolby AC-3, whether the audio is MPEG audio, or whether the audio is linear PCM audio (16 bits at 48 kHz). There is also an indicator of whether the audio is monaural, stereo, or digital surround.

The file management table 924 further contains a field which describes the sub-picture stream attributes for the menu data 922. This field indicates a run-length sub-picture coding mode will be used for the sub-pictures, as described below. The file management table 924 also contains a field describing 16 sets of color pallets used in all sub-pictures for the menu. The pallet numbers from 1 through 16 contain a luminance signal Y, a color difference signal Cr=R−Y, and a color difference signal Cb=B−Y.

The disc structure information 926 includes configuration information of the video and audio files stored on the disc. The disc structure information 926 includes a file name which describes the same contents as the corresponding file identifier in the directory record which is used for identifying a file name. There is a file identifier field which identifies the file as a disc structure information file. There is a field for indicating the number of data files on the disc such as data files 910 and 914 illustrated in FIG. 40. There is also a field indicating the type of each of the data files including whether the file contains both video and audio information or only audio information, and whether or not the file is a karaoke file.

The disc structure information 926 also contains a field describing the sub-picture and audio information in the data file. Indicated within this field are the number of sub-picture channels. Each sub-picture channel may be used to display different sub-picture information such as different sub-picture languages. There is also an indication of the number of audio streams, an indication of the language code of each sub-picture channel in the order of channel number, a sequential description of the language code of the audio stream in the order of the audio stream number, and a description of parental management and angle information of the files. The parental management information is used to describe the parental level of a particular sequence of information to be displayed. It is the maximum parental level of specific cells contained within a sequence. The levels vary from 1 through 5 and the higher the level, the more restriction over what is heard and seen. Details of the sequence and cells and parental management scheme are explained below. There is also a field which describes the number of angles of a video sequence. For example, if a music video had three different camera views throughout the entire music video, the user may select which particular camera angle is desired to be viewed. There is also a field indicating the number of programs in a sequence.

The menu structure information 928 contains the start cell number of each menu type. A display sequence includes a plurality of cells. One sequence can contain up to 256 cells, for example. A cell is an integral number of GOPs (group of pictures) between a playback information (PBI) pack, to be described later, and a pack immediately before the next PBI pack. Data for video is separated into cells as a record unit in which the data should be reproduced successively. A cell contains the information for display and is divided depending on its purpose. It is desirable that the first audio pack and the first sub-picture pack in a cell include a presentation time-stamp (PTS) close to a PTS in the video head pack recorded behind a PBI pack at the head of a cell. Different cells are displayed depending on the desired angle and parental restriction of the program. As an example, suppose there was a section of a movie which was inappropriate for younger audiences. There can be two sequences sharing cells, depending on the parental management level which may be viewed. For example, for unrestricted viewing, cells 1, 2, 3 and 5 may be viewed for a particular sequence. For a restricted level of viewing, the cells viewed for the sequence may be 1, 2, 4 and 5.

Regarding the different angles, it is possible to have each video recorded at plural camera angles which proceed simultaneously and whose time required for reproduction is substantially equal. Each angle is constituted by one cell called an angle cell. A set of plural angle cells which precede simultaneously is called an angle block. If an angle block is defined in plural locations in the sequence, the number of angle cells and the camera angle of each angle number must be the same through the angle blocks.

A menu cell is the cell constituting the menu screen which informs the user of the contents of each video or audio file in a volume. A set of menu cells is recorded together in the disc information file as data for the menu. The menu cell types, also referred to as menu types, are classified into the title menu, a program menu, an audio menu, a sub-picture menu, and an angle menu. A menu screen includes video for the menu. Items for selection are displayed on the screen of reproduction equipment are recorded as sub-picture data of the menu cell.

The menu cell information table 930 is a table on which plural menu cell information such as 932 and 934 in FIG. 41 are stored. One menu screen includes one menu cell. The menu cell information includes a plurality of fields. A first field indicates whether or not copying of information of the disc is permitted, the level of parental management, the menu cell type such as whether the menu is a title menu, program menu, audio menu, sub-picture menu, or angle menu, and the language code of the menu. Each language is assigned a code and the specific code appearing in the language code sub-field indicates the language used with the menu.

There is also a field which describes the start number of selection items displayed by the sub-picture on the menu screen and the number of the selection items. The selection item start number describes the smallest number of selection items on the menu screen, there is a field which indicates whether or not a next page of the menu exists, and a number which describes the number of items between 1 and 16 which may be selected. The menu cell information also includes the lower 32 bits of the system clock reference (SCR) in the start pack of the menu cell, a field which describes the start address of the menu cell with a relative logical block number from the head of the file, and a field which describes the number of logical blocks constituting the menu cell.

The menu data 922 contains the actual information which is displayed for the menu. This information is constructed in the same manner as the information in the data files 910 and 914 in FIG. 40 is constructed and accordingly, an in depth description of each aspect the menu data 922 is omitted to prevent redundant descriptions. The items which are selected on the menu screen are formed by sub-picture information. The processing of menu selections by a disc player is performed using a microprocessor executing computer code. When a menu selection for a title is made, the result of the selection is reproduced from the beginning of the file or sequence number corresponding to the selected title number. For program menu selections, the selected program is reproduced from the beginning of the selected program. For audio selections from the menu, the audio stream is set to correspond to the selected audio stream. Similarly, for sub-picture menu selections the sub-picture channel number is set equal to the selected sub-picture channel. Last, an angle selection from the menu changes the angle cell number to equal the selected number. Other information, as desired, may be included in and selected through menus.

Figure 42:
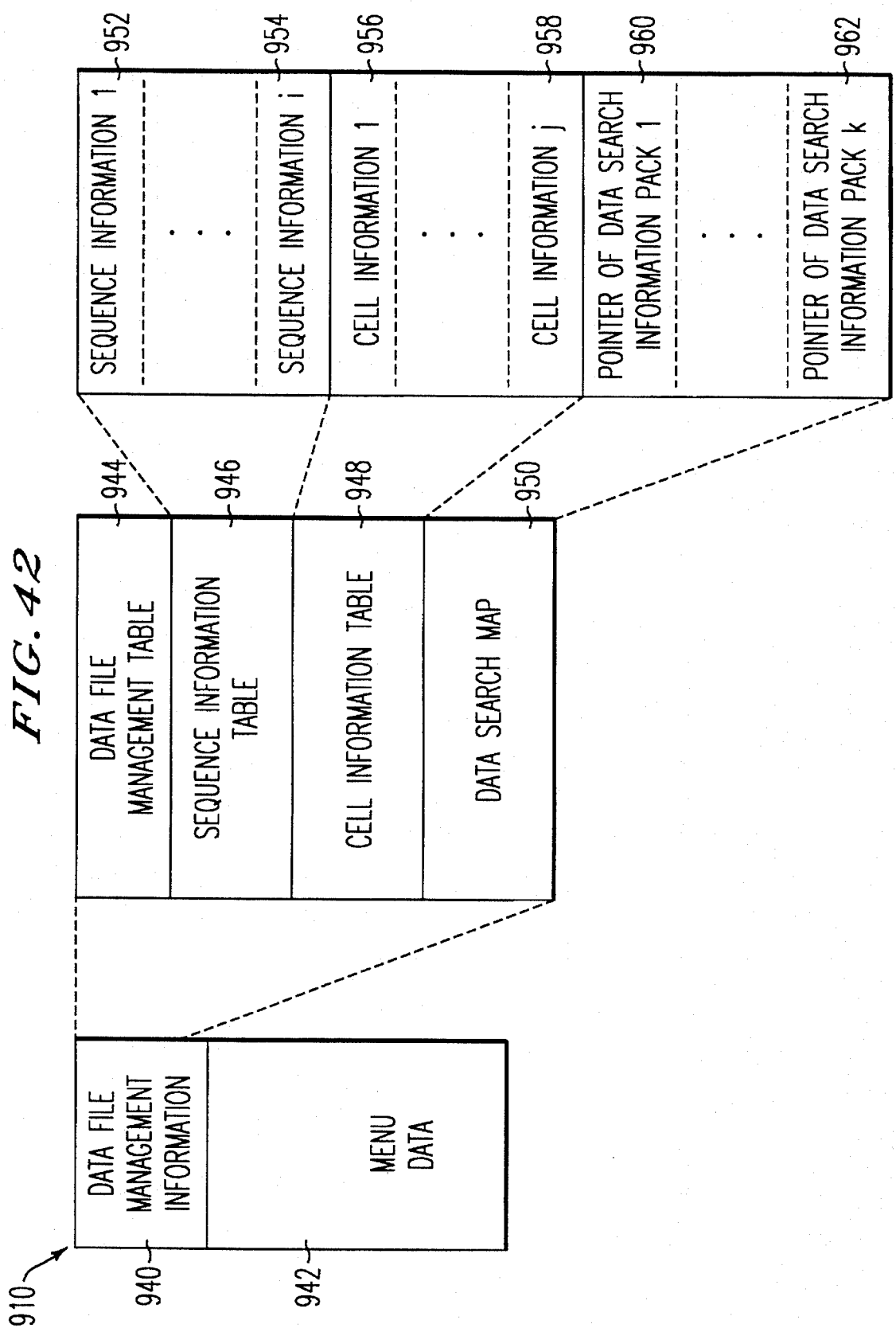
FIG. 42 illustrates the data file management information contents of the data files illustrated in FIG. 40.

The data files such as the data file 910 of FIG. 40 contain two sections, as illustrated in FIG. 42; data file management information 940 and the actual data 942 used to display audio, video, and sub-picture information. The data file management information 940 includes four major components; the data file management table 944, the sequence information table 946, the cell information table 948, and a data search map 950.

The data file management table 944 includes information related to every aspect of the data file 910. This information includes a field for the file name which is the same contents as the corresponding file identifier in the directory record for identifying the file name, the file identifier which indicates that the file contains both audio and video information, the size of the file as defined by the number of logical blocks, the size of the file management table, the number of sequences for the file, the number of cells for the file, the number of disc structure information (DSI) packs, a start address of the sequence information table 946, a start address of the cell information table 948, a start address of the data search map, a start address of the data 942, a field describing the video attributes of the data 942 including the video compression mode such as MPEG-1 or MPEG-2, the frame rate including whether the frame rate is 29.97 frames per second or 25 frames per second, a display aspect ratio indicating whether the display aspect ratio is ¾ or 9/16, or whether the display mode permits one or both of pan-scan and letterbox format.

The data file management information further includes a field describing the number of audio streams in the file, the audio stream attributes such as the audio coding mode, the audio mode such as monaural, stereo, or digital surround, the audio type which indicates whether or not there is a specific language included, and a field for a specific code which indicates the code number of the language.

The data file management table 944 further includes a field describing the number of sub-picture channels, a field describing the sub-picture channel attributes such as a field which indicates run-length coding of the sub-pictures is used and whether or not there is a specified language and the language which is specified. Additionally, there is a field indicating the Y, Cr, and CB colors for 16 color pallets used in all sub-picture channels of the file. There is also a field describing the size of the sequence information table, a field describing the smallest cell number and number of consecutive cells which follows, and the range of cell numbers used within one sequence of the file. The cell numbers used within one sequence should be included in a set of numbers figured out by letting 32 consecutive numbers make a set, and placing the smallest cell number to be the first number of the set. This field includes a sub-field including the number of cells used in the sequence, and the smallest cell number used in the sequence.

The sequence information table 946 includes a plurality of sequence information entries 952 and 954. A sequence is the order in which cells within the range specified by this sequence are reproduced selectively. There are two types of sequences; completion and connection. A completion-type sequence is terminated after reproducing itself. Connection-type sequences are sequentially reproduced. The sequence information number such as sequence information 1, indicated by reference number 952, and sequence information i, indicated by 954, is equal to the sequence number and is numbered in the described order in the sequence information table beginning with 1. The sequence information entries of the sequence information table are described in the order of completion-type sequences or connection-type sequences. Each sequence information contains field indicating the sequence type, the number of included programs, the number of included cells, the sequence reproduction time, the number of connection-type sequences, the connectable sequence number, and sequence control information.

The sequence type field of the sequence information describes copy and parental management of the sequence. There is a sub-field indicating whether copying is permitted or prohibited, a sub-field specifying the level of parental management from 1–5, a sub-field indicating the sequence type which may be one of a completion-type sequence, a connection-type head sequence, a connection-type midsequence or a connection-type end sequence. There is also an application type sub-field which indicates whether or not the sequence is for use is a karaoke application.

The number of included programs field describes the number of programs, up to 100 in a sequence. The number of included cells field describes the number of total cells in a particular sequence, up to 256 cells in total. The sequence or reproduction time describes the total reproduction time of this sequence in units by hour, minute, second, and video frame.

The number of connection-type sequences field includes the number of sequences which can be connected immediately after them, the maximum number being 8. The connectable sequence number field describes sequence numbers of connectable sequences and the level for parental management of the sequence for the numbers specified. The selection number of connectable sequences are assigned from one in the described order. This field contains sub-fields for the parental management number, and a sub-field for the sequence number. The last field of the sequence information is the sequence control information which describes the cells included in the sequence in the order of reproduction. This field is also used to describe angle blocks which is a set of plural cells. The reproduction time of those cells is substantially equal. Each reproduction section is constituted by one cell. An angle block includes nine cells at most with the first cell numbered 1. The sub-fields of the sequence control information include a program number which defines a program as a reproduction unit combining plural cells which are sequentially reproduced. There is a sub-field for cell reproduction control which indicates whether to proceed to the following cell sequentially, to pause, or whether the end of a sequence has been reached, there is a block mode sub-field which indicates if a block is not a configuration cell, whether there is a first cell of block configuration, whether it is a cell in a block configuration, or a final cell in a block configuration. There is a block type sub-field which indicates if there is not a block or whether there is an angle block. Last, there is a sub-field which indicates the cell numbers of the cells to be reproduced.

The data file management information 940 further includes a cell information table 948 containing a plurality of cell information entries 956 and 958. Each cell information entry includes cell type information which indicates whether copying is permitted or prohibited, and the level of parental management. There is also a field indicating cell reproduction time which describes the total cell reproduction time of the cell by hour, minute, second and video frame. There is a field which describes the lower 32 bits of the system clock reference described in the first pack of the cell, a field which describes the address at the cell's starting point with the relative logical block number from the beginning of the file, and a field which describes the number of logical blocks included in the cell.

The last section of the data file management information 940 is the data search map 950. The data search map includes a plurality of pointers of data search information packs 960 and 962. These pointers, referred to as playback information (PBI) pack pointers, give the address of the playback information pack which exists in the data 942. In order to perform a fast forward or fast reverse mode and allow viewing of the information, it is best to rely on intra pictures in the MPEG-2 video sequence. These intra pictures are located using playback information packs within the data 942 whose addresses are contained in the data search map. A further description of the PBI pack is given below.

Figure 43:
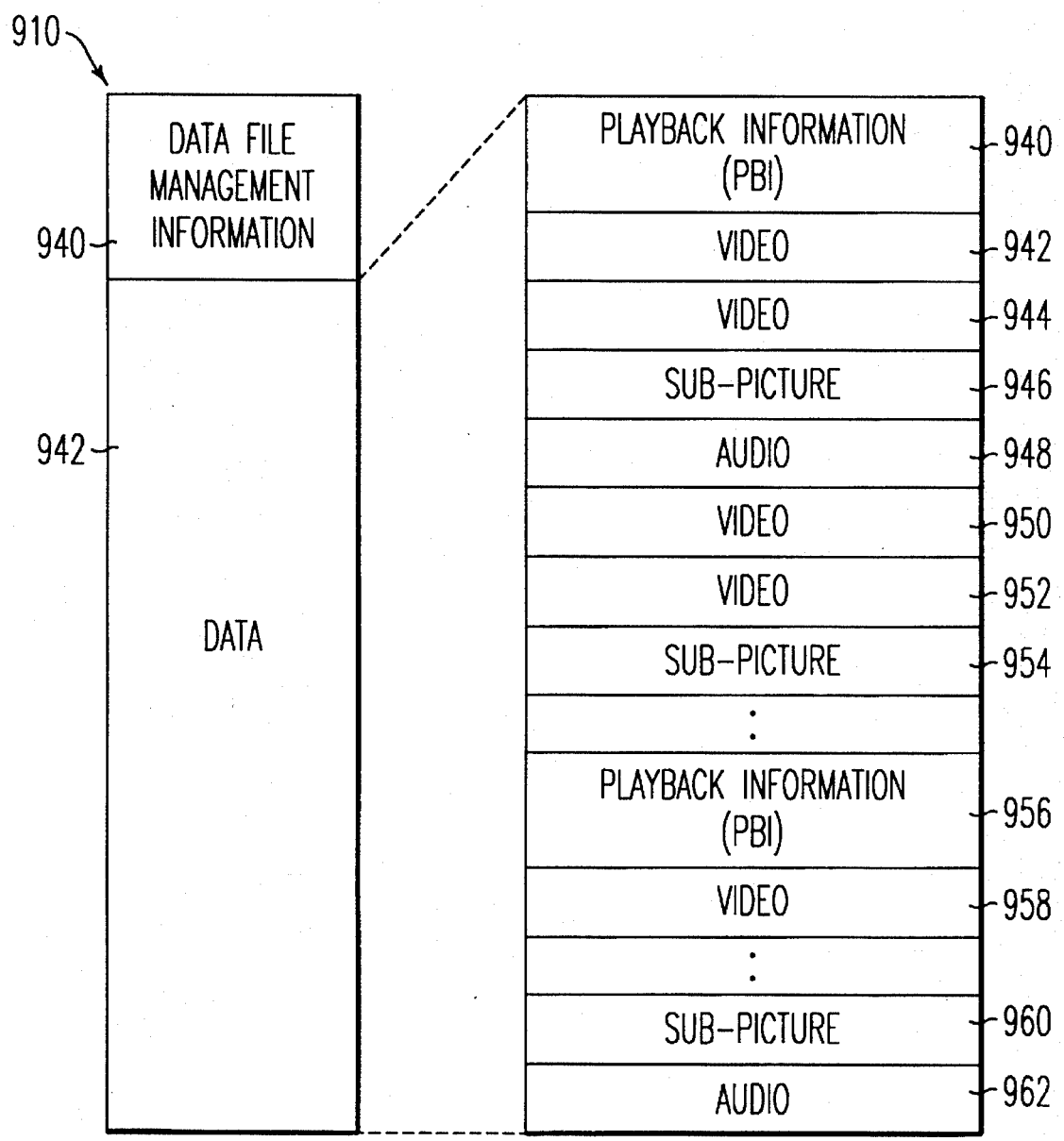
FIG. 43 illustrates the details of the data stored in the data files of FIG. 40.

The data 942 of the data file 910, illustrated in FIG. 43, includes interleaved packs of playback information (PBI), video, sub-picture, and audio information. For example, in FIG. 43, the data includes playback information 940, video information 942 and 944, sub-picture information 946, audio information 948 etc. The structure of the information within the data 942, and presentation timing complies with the program stream defined in the MPEG system description (ISO/IEC 13818-1). However, the playback information and sub-picture information and the manner in which this information is stored, encoded, and decoded constitute part of the present invention.

The various information making up the data 942 in FIG. 43 includes information packs. Exemplary packs 970A and 970B are illustrated in FIGS. 44A and 44B. Each pack comprises a pack header 972A or 972B, and a packet 982A or 982B which includes video, audio, sub-picture, or playback information data.

The structure of pack 970A is used when the packet 982A occupies between 2034 and 2027 bytes. The stuffing field 980A allows 1 to 8 bytes of stuffing to bring the total size of the pack to 2048 bytes. When the packet for video, audio, sub-picture, or playback information is less than 2027 bytes, a pack structure 970B as illustrated in FIG. 44B is used which has a stuffing 980B of one byte and a packet for padding 984 which makes the total number of bytes for the packets 982B and 984B to be 2034 bytes. The packet headers 972A and 972B each contain a pack start field 974, a system clock reference 976, a multiplex (MUX) rate field 978 and a stuffing field 980. The packets in FIG. 44A and 44B are constructed in accordance with ISO/IEC 13818, and described in §2.5.3.4 thereof pertaining to the semantic definition of fields in a program stream pack.

FIG. 45 illustrates a playback information (PBI) pack. The pack header 972 is constructed as described with respect to FIGS. 44A and 44B. The system header 986 of FIG. 45 is constructed in conformance with the requirements of the program stream system header described in ISO/IEC 13818-1. The semantic definition of fields within the system header is described in §2.5.3.6 of ISO/IEC 13818-1.

The packet header 988 is constructed in accordance with the fields set forth in the semantic definition of fields in PES packet described at §2.4.3 of ISO/IEC 13818-1. However, only fields up to the presentation time-stamp are needed in the packet header 988.

The playback information pack further includes a sub-stream ID field 990. This is an 8 bit field which indicates the identification of the sub-stream. The different identifications which may be used are a sub-picture stream, a video blanking information (VBI) stream, an AC-3 stream, or a linear PCM stream. It is also possible to include other stream types such as an MPEG audio sub-stream. As the sub-stream ID 990 precedes the data of the video blanking information 992, the sub-stream ID is set to indicate that the information which follows is a video blanking information stream. The data of the video blanking information 992 may be constructed in accordance with ISO/IEC 13818-1 and conform to the semantics required for ISO/IEC 13818-1.

Also included within the playback information pack illustrated in FIG. 45 is a packet header 994 for a data search information packet which includes the data of the data search information 996. The packet header 994 includes a packet start code prefix having a 24 bit value of 000001h, a stream identification indicating that the data search information 996 does not conform to previously defined standards, and a field indicating a packet length. As the data search information 996 is not disclosed in the MPEG standard, the stream ID indicates that the information which follows is a private type of data stream.

The specific content of the data of the data search information 996 illustrating FIG. 45 is shown in FIG. 46. The data search information 996 includes general information 1000, angle address information 1020, highlight information 1022, synchronous reproduction information 1024, and PBI pack address information 1036.

Figure 47:
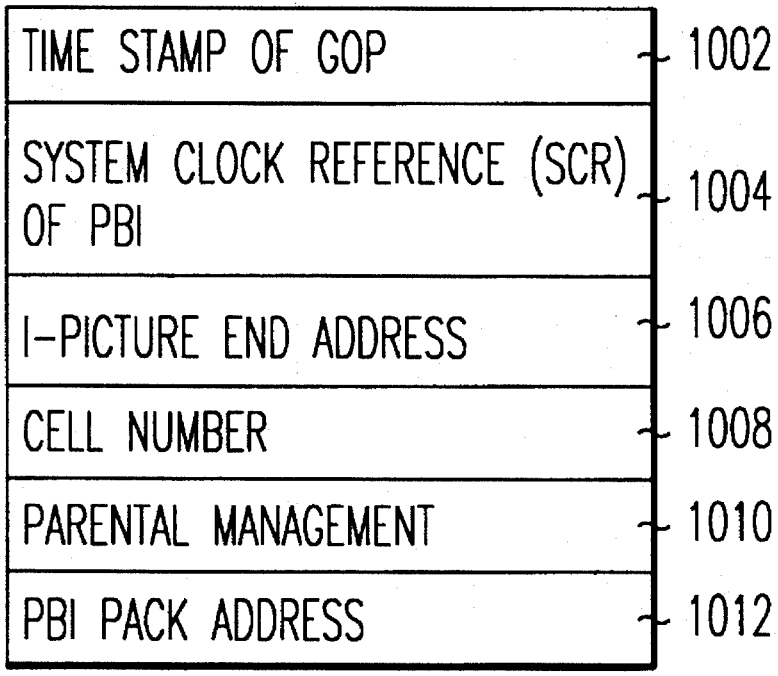
FIG. 47 illustrates the general information of FIG. 46.
Figure 48:
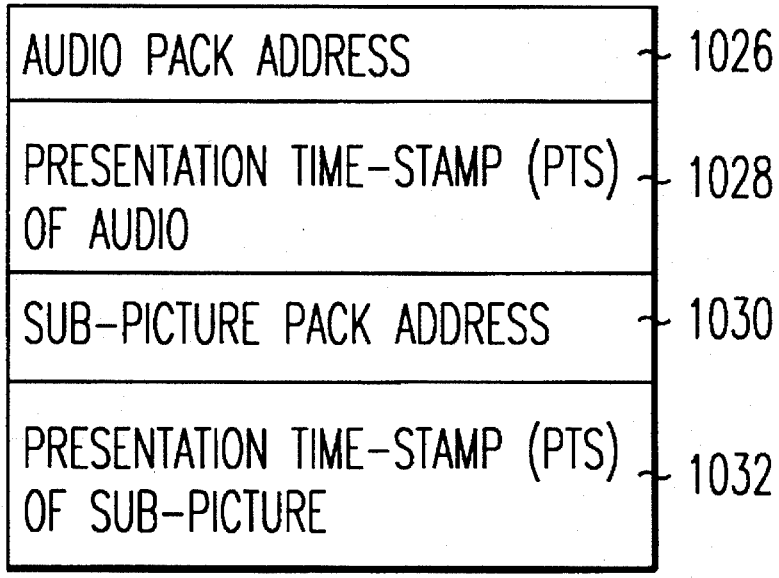
FIG. 48 illustrates the synchronous reproduction information illustrated in FIG. 46.

The general information 1000 is illustrated in further detail in FIG. 47. As previously stated, a purpose for the data search information is to allow a quick search of the digitally encoded video and specifically allows a rapid location of an intra picture for trick-modes executed during video decoding. Therefore, the playback information pack illustrated in FIG. 46 is the head pack of each group of pictures (GOP) and allocated immediately before the video head pack starting with an I-picture. The general information 1000 includes a time-stamp of the GOP 1002 which is the reproduction start time of an I-picture. Next, there is a system clock reference (SCR) of the PBI. This describes the lower 32 bits of the SCR described in the PBI pack header. 1006 indicates the end address of the I-picture and describes by the relative logical block number from the beginning of the file, the address of the pack on which the final data of the I-picture is recorded. The cell number is stored in field 1008 and describes the cell number to which the GOP belongs. Field 1010 describes the parental management information including the level of restriction and also whether or not copying is permitted. Last, field 1012 describes the PBI pack address which is the address of this PBI pack using the relative logical block number from the head of the file.

Field 1020 of the data search information 996 illustrated in FIG. 46 is the angle address information. The angle address information includes address information of other angles. The angle address information includes nine fields, each pertaining to a different angle cell number. For each field in the angle address information 1020, if a cell to which a specific PBI pack belongs constitutes an angle block, the field in the angle address information describes the address of the PBI pack for the angle cell number which has the closest video start presentation time-stamp not exceeding the video start presentation time-stamp of the corresponding data search information. If no angle cell exists or if an angle block is not constituted, the angle address information for a specific cell is set to zero.

The third section of the data search information 996 is the highlight information 1022. The highlight information describes the position of selection items on the menu screen and their color and contrast to be changed when selected. This information is used only when the cell is part of a menu. The highlight information includes a field describing the selection item start number and the number of items displayed by the sub-picture on the menu screen. The specific sub-fields of the selection item start number and number of items include a sub-field which describes the smallest number of selection items on the menu screen, a sub-field which describes whether or not a next page of the menu exists, and a sub-field which describes the number of selection items on the menu screen. The second field of the highlight information includes position, color, and contrast of the selection item. This field describes a rectangular display area for each selection item on the menu screen and the corresponding color and contrast to be changed, when selected. The rectangular display area is defined in an X-Y coordinate plane. Information in this field describing the position, color, and contrast of the selection item include defining the rectangular area of the menu, and information describing how the various types of pixels are changed when selected. As will be described in more detail later, a sub-picture allows for four different types of pixels. There are first and second emphasis pixels which may be used to display text or other information, pattern pixels which are used to display patterns such as line drawings or other graphical patterns, and background pixels. When these four different types of information are highlighted or selected, it is necessary to know the color which will be chosen when the item is highlighted and also the contrast of the pixel, when highlighted. Therefore, there are eight sub-fields within the highlight information describing the color and contrast of the four different types of pixels when they are selected.

The fifth item within the data search information 996 is the synchronous reproduction information 1024. The synchronous reproduction information 1024 is illustrated in detail in FIG. 48. The purpose of the synchronous reproduction information is to be able to find the start time and address information of the audio and sub-picture which is synchronized with the video data. The synchronous reproduction information 1024 illustrated in FIG. 48 contains the audio pack address which is the target of the presentation time-stamp of the audio. The most significant bit of this field indicates whether the audio pack is located before or after this PBI. The presentation time-stamp (PTS) of the audio 1028 describes the PTS of the audio packet having the reproduction start time just behind the reproduction start time of the I-picture with the relative presentation time-stamp from the video start PTS. The presentation time-stamp of the audio allows for up to eight audio streams to have the presentation time-stamp stored therefore. Additionally, there may be a sub-field indicating whether or not the audio packet comprising audio frames which is reproduced during the GOP. If there is no audio for the picture, it will not be necessary to store or decode the presentation time-stamp of the audio. As there are up to eight audio channels, each audio channel has corresponding address and time stamp fields.

Data structure 1024 also includes a sub-picture pack address 1030 which describes the address, relative to the PBI pack, of the sub-picture pack at issue. The presentation time-stamp of the sub-picture describes synchronization of corresponding sub-picture information. There are sub-fields which indicates whether or not a sub-picture unit which is to be reproduced during the GOP reproduction exists, whether or not the reproduction start time of the sub-picture is before the video presentation time-stamp, the production start time of a sub-picture unit reproduced during the GOP reproduction, and the reproduction termination time of a sub-picture unit reproduced during the GOP reproduction. As up to 32 sub-pictures which may be included into a single data stream, each sub-picture which exists has a corresponding address and time-stamp field.

The last section illustrated in FIG. 46 of the data search information 996 is the PBI pack address information. The PBI pack address information comprises addresses of other PBI packs within the file and allows other PBI packs to be quickly located. The PBI pack address information describes the address of the surrounding PBI packs using relative logical block numbers. The PBI pack address information includes two fields which describe the next and previous PBI pack addresses, respectively. There are fifteen fields which define, using the relative logical block number from the current PBI pack address, the address of the PBI pack which belongs to the GOP immediately ahead of the GOP with its accumulated reproduction time being between $n \times 0.5$ seconds and $(n+1) \times 0.5$ seconds, and when more than one PBI pack falls in this range, selecting the PBI pack closest to $n \times 0.5$ seconds, $1 \leq n \leq 15$.

There are fifteen fields which define, using the relative logical block number from the current PBI pack address, the address of the PBI pack which belongs to the GOP with its accumulated reproduction time being between $n \times 0.5$ seconds and $(n+1) \times 0.5$ seconds, and when more than one PBI pack falls in this range, selecting the PBI pack closest to $n \times 0.5$ seconds, $-15 \leq n \leq -1$.

There are two fields which define, using the relative logical block number from the current PBI pack address, the address of the PBI pack which belongs to the GOP immediately ahead of the GOP with its accumulated reproduction time being between $n \times 0.5$ seconds and $[n \times 0.5 + 1]$ seconds, and when more than one PBI pack falls in this range, selecting the PBI pack closest to $n \times 0.5$ seconds, $n=20$ or $n=60$.

There are two fields which define, using the relative logical block number from the current PBI pack address, the address of the PBI pack which belongs to the GOP with its accumulated reproduction time being between $n \times 0.5$ seconds and $[n \times 0.5 + 1]$ seconds, and when more than one PBI pack falls in this range, selecting the PBI pack closest to $n \times 0.5$ seconds, $n=-20$ or $n=-60$.

The structure of a video pack 1040 is illustrated in FIG. 49. The video pack contains a pack header 972 constructed in accordance with the headers 972A or 972B illustrated in FIGS. 44A and 44B. The packet header 1046 for the video is constructed in accordance with ISO/IEC 13818-1 as is the video data 1048. However the video data 1048, represented as MPEG video signals is preferably encoding in accordance with the techniques described above.

An MPEG encoded group of pictures is illustrates as 1050 in FIG. 50. The manner of breaking up this GOP 1050 into a plurality of video packs 1040 to generate the video stream 1060 is illustrates at the bottom portion of FIG. 50. The group of pictures 1050 is broken up into appropriate units to fit into the video packs. The last video pack 1040G, video pack j, does not take up the full 2048 bytes used for each of the packs and therefore, stuffing is used to make the last video pack j equal to 2048 bytes.

FIG. 51A illustrates a video pack for MPEG audio. This video pack 1080 includes a pack header 972, a packet header 1084 constructed in conformance with the MPEG requirements, and the encoded MPEG audio data 1086.

FIG. 51B illustrates an audio pack 1090 constructed in conformance with either linear PCM audio or Dolby AC-3 audio. For the packet illustrated in FIG. 51B, the pack header 972 is arranged as described above, the packet header 1094 is constructed in conformance with the MPEG requirements with the stream_id field set to indicate a private audio data stream corresponding either to linear PCM or AC-3. The sub-stream id 1096 indicates whether the audio data is for liner PCM or AC-3 (or MPEG). The audio frame pointer 1098 includes a number of frames header which indicates the number of audio frame headers within the audio packet and also includes a first access unit pointer which indicates the head of the first access unit of the audio frame using a relative byte number from the last byte of the pointer. It is standard for linear PCM audio to be broken into audio frames, each frame including a frame header and frame data. The audio frame pointer 1098 may similarly be used with dolby AC-3. The audio data 1100 is constructed in accordance with the corresponding audio encoding method.

FIG. 52 illustrates an encoded audio stream 1100. This audio stream is converted into a stream of audio packs 1120 comprising individual packs 1122. Each pack is 2048 bytes in length and the last audio pack 1122G, audio pack j, is adjusted by adding stuffing bits in order to bring its length to 2048 bytes.

A novel feature of the present invention is the use of sub-pictures and the interleaving of sub-picture packs with audio and video information. Sub-picture information allows the display of any graphical information and allows for overlapping the sub-picture information over the MPEG video. A major difference between the sub-picture information used by the present invention and conventional closed caption subtitles is that the sub-picture information is bit mapped graphics whereas closed captioning transmits character codes to display characters within character sets which are stored in the decoder. Accordingly, conventional closed captioning is limited by the character set within the decoder. However, as the sub-picture information is bit mapped, any type of characters including foreign language characters may be displayed without the need to store character sets within the decoder for each language.

Each display screen of sub-picture information is called a sub-picture unit. There is a sub-picture unit 1140 illustrated in FIG. 53. A sub-picture unit contains one screen of bit mapped pixel data and this screen of pixel data is displayed across a plurality of video frames. The sub-picture unit 1140 includes a sub-picture unit header 1142. The sub-picture unit header 1142 includes a field describing the size of the sub-picture unit and the start address of the display control sequence table 1146, relative to the number of bytes from the head of the sub-picture unit.

The pixel data 1144 is run-length compressed bit mapped information. The pixels may be background pixels which form the background of the displayed information, pattern pixels which allow the display patterns within the sub-picture including graphical line drawings, and two types of emphasis pixels which allow graphics or characters to be displayed which have two different attributes. The bit mapped information may be created using conventional graphics generating techniques. The run length compression is performed in accordance with the following rule. If one to three pixels of the same kind follow, enter the number of the pixels in the first two bits and the pixel data in the following two bits. The four bits are considered a unit. If four to fifteen pixels of the same kind follow, specify zero in the first two bits and enter the number of pixels in the following four bits and the pixel data in the next two bits. The eight bits are considered to be one unit. If sixteen to sixty-three pixels of the same kind follow, specify zero in the first four bits and enter the number of the pixels in the following six bits and the pixel data in the next two bits. The twelve bits are considered to be one unit. If sixty-four to 255 pixels of the same kind follow, specify zero in the first six bits and enter the number of the pixels in the following eight bits and the pixel data in the next two bits. The sixteen bits are considered to be one unit. If the same pixels follow to the end of a line, specify zero in the first fourteen bits and describe the pixel data in the following two bits. The sixteen bits are considered to be one unit. If the byte alignment does not result when the description for pixels on one line is completed, insert dummy data of four bits for adjustment. It is also possible to use other compression mechanisms to represent the image data, as desired. For example, JPEG or GIFF formats may be used to represent the sub-picture images.

The display control sequence table 1146 contains a plurality of display control sequences 1146A, 1146B, 1146C, etc., which describe the chronological order in which control sequences occur. The display control sequence table contains information regarding how the information in the sub-picture unit is displayed. For example, words forming a single sub-picture unit may appear one-by-one or in groups over time, or their colors may change, which is useful when using sub-pictures to display karaoke information.

Each display control sequence (DCSQ) allows for commands changing the pixel data to be executed over a time period during which the sub-picture unit is displayed. The first field of a display control sequence is a display start time. This field describes the execution start time of the display control command included in the DCSQ having a relative PTS from the PTS described in the sub-picture packet with a sub-picture unit header. From the first video frame after the described execution start time, display control is started according to the DCSQ display control start time. The second field of each DCSQ is the address of the following display control sequence. This field describes the start address of the following DCSQ with the relative byte number from the first sub-picture unit. If no following DCSQ exists, this field describes the start address of this DCSQ with a relative byte number from the first sub-picture unit. Thereafter, the DCSQ contains one or more display control commands. These commands allow the attributes and display of the pixel data to be controlled and changed. The commands include a command to forcedly start the display of a sub-picture unit, irrespective of the on/off state of the sub-picture. For example, if a user uses a menu to turn off sub-pictures, it is possible to override the user's setting by setting this command. Another command starts the display of an updated sub-picture unit. This command must appear once in each DCSQ. There are commands to set the colors and contrast of the above-described four types of pixels including the two types of emphasis pixels, the pattern pixel, and the background pixel. A command exists which sets the rectangular area display and position of the pixel data making up the sub-picture. This command allows the setting of the upper and lower X and Y coordinates. There is also a command used to set the head address of the pixel data used for displaying. This command allows the head address of both the top and bottom field to be entered. In the extended fields, each head address of the pixel data for the top field and bottom field with the relative byte number from the head of the unit is used. The first pixel data represents the first pixel on the line. This command must be used at least in the first DCSQ, DCSQ0.

There is a command which may appear in a DCSQ to change the color and contrast of the pixel data. This command is not to be used when the highlight information of the data search information is used. The command to change the color and contrast of pixel data includes pixel control data to control the color and contrast of the pixel data during display. The content of the control described in the pixel control data is executed for every video frame after the specified start time and continued until new pixel control data is encountered or a new sub-picture unit is encountered. The pixel control data includes line control information used to specify fines on which the same change is made. Also, pixel control information can be used to specify a position on a line at which the change is made. The line control command allows the changing of the start line number, the number of change points, and the change termination line number. The pixel control information includes the change start pixel number, and the new color and contrast for the emphasis pixels 1 and 2, the pattern pixels, and the background pixels. There is also a command which indicates the end of a display control sequence. Each DCSQ must end with this command.

Over a time period of video frames such as for a movie, there are many different sub-picture units which may be used. The sub-picture units are broken into sub-picture packs 1150, as illustrated in FIG. 54. The sub-picture pack contains a pack header 972, as described above, a packet header which conforms to the MPEG system requirements, a substream ID which indicates that the following data is sub-picture data, and the sub-picture data 1158 itself.

The sub-picture units such as sub-picture unit 1140 is divided into sub-picture packs 150, as illustrated in FIG. 55. The last sub-picture pack 1050G contains padding to make it 2048 bytes in length.

FIG. 56 illustrates the manner in which successive sub-picture units are displayed. When the time equals to the time of a PTS described in a new sub-picture packet, the sub-picture unit currently being displayed (1160) is cleared (1162) and when the time specified by the display control sequence of the next sub-picture unit occurs, that sub-picture is displayed (1164). Between 1160 and 1162, there is a dividing line between the sub-picture unit n and the sub-picture unit n+1. This dividing line occurs at the PTS described in the packet header of the sub-picture unit n+1. The actual display time for sub-unit n+1 is set forth in the DCSQ of sub-picture n+1.

The creation of the pixel data used for the sub-picture information may be performed using a computer to create bit maps of the information which is desired to be displayed. The process of creating bit-mapped information is well-known in the art.

FIGS. 40–56 emphasize the data structures used to encode the audio, video, and sub-picture information. However, by the disclosure of the data structures in FIGS. 40–56, one of ordinary skill in the art of MPEG encoding and in particular with the assistance of the MPEG system description ISO/IEC 13818-1, could format encoded audio, video, and sub-pictures into the data structures. Similarly, with the knowledge of the structures in which the data is stored, the decoding of the data structures to generate the video, audio, and sub-picture information can be performed by one of ordinary skill in the art.

An exemplary video decoder which constitutes part of the present invention includes an optical disc reader which reads data stored on the optical disc. The information which is read is parsed using conventional parsing techniques in order to decode the information. The video, audio, sub-picture, and PBI packs must all be decoded. The video may be decoded using commercially available MPEG decoders as are the audio packs decoded using conventional decoders. The sub-picture information is decoded by constructing sub-picture units from the sub-picture packs in an inverse manner as they were encoded. Specifically constructed hardware or a general purpose microprocessor programmed using software coding may be used to decode the sub-picture information. The playback information packs, as illustrated in FIG. 45 contain data search information 996. The data search information is processed using a programmed microprocessor and is different from the audio, video, and sub-picture decoders. As the menu functions are also performed by a programmed microprocessor, the highlight information 1022 included within the data search information and all other menu functions are performed by the programmed microprocessor and not by the sub-picture decoder. Additional information regarding the operation of the invention, the data structures, encoding and decoding process are described in Japanese Patent Applications 7-81298, and 7-85693, both of which are incorporated herein by reference.

The encoding system of the present invention allows the control of quality within pictures. This control is important as the people creating the final video product will be able to closely control the final product of the encoding system. Therefore, even though digital video encoding results in decoding artifacts which are not present in analog video, the final digital product will be quite acceptable. The teachings in any of the above sections are applicable to the other sections.

The determinations, calculations, and steps of the present invention may be conveniently implemented using a conventional general purpose digital computer programmed according to the teachings of the present invention, as will be apparent to those skilled in the computer art. Appropriate software coding can readily be prepared by skilled programmers based on the teachings of the present disclosure, as will be apparent to those skilled in the software art.

The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical disks, CD-ROMs, and magneto-optical disks, ROMs, RAMs, EPROMs, EEPROMs, magnetic or optical cards, or any type of media which is suitable for storing electronic instructions. The present invention further includes a computer program product which is a storage medium including encoded data output by the present invention stored on any of the above described media suitable for storing electronic instructions or data.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for processing video signals included in video frames to determine characteristics of the video frames, comprising the steps of:

a) obtaining video signals included in plural video frames;

b) assigning plural quantization levels to one of said plural video frames;

c) pre-encoding said one of said plural video frames using said plural quantization levels to obtain plural bit-rates corresponding to each of said plural quantization levels;

d) determining bit-rates for each of said plural quantization levels resulting from said pre-encoding step; e) repeating steps b–d sequentially for plural succeeding video frames; and f) encoding a plurality of said plural video frames after determining the bit-rates for each of said plural video frames.

2. The method of claim 1, wherein the step of obtaining comprises:

obtaining said video signals from a video camera.

3. The method of claim 1, further comprising the step of:

storing the plural determined bit-rates.

4. The method of claim 1, wherein the step of assigning comprises:

assigning said plural quantization levels uniformly across each of said plural video frames.

5. The method of claim 1, wherein the step of assigning comprises:

assigning two quantization levels uniformly across each of said plural video frames in a checkerboard pattern.

6. The method of claim 1, wherein the step of assigning comprises:

assigning four quantization levels, $q_1$, $q_2$, $q_3$, $q_4$, uniformly across each of said plural video frames such that a first quantization level of each row, j, is $q_{j \bmod 4}$.

7. The method of claim 1, further comprising the steps of:

g) determining a target number of bits for said plurality of said plural video frames; and h) assigning a first set of quantization levels for each frame in said plurality of said plural video frames using said target number of bits and the plural determined bit-rates.

8. The method of claim 7, wherein the step of encoding comprises the steps of:

i) encoding one video frame of said plurality of said plural video frames into an encoded frame with a resultant number of bits;

j) estimating an encoded number of bits for a succeeding video frame;

k) adjusting the first set of quantization levels for said succeeding video frame based on said target number of bits, said bit-rates for succeeding video frames, the estimated encoded number of bits and the resultant number of bits; and l) repeating steps i–k sequentially for plural succeeding video frames.

9. The method of claim 7, wherein the step of determining a target number of bits comprises:

determining the target number of bits automatically.

10. The method of claim 7, wherein the step of determining a target number of bits comprises:

determining the target number of bits through user-intervention.

11. The method of claim 7, wherein the step of assigning further comprises:

assigning said first set of quantization levels based on an activity measure of plural macroblocks of corresponding video frames.

12. The method of claim 1, wherein step e) repeats for a majority of video frames in said plural video frames.

13. The method of claim 1, wherein step e) repeats for all video frames in said plural video frames.

14. A memory containing data structures for storing video generated according to claim 1, audio signals, and information used for processing of menus, comprising:

a data structure stored in said memory including:
  a field for storing a number of menu cells, a cell being a unit of information;
  a field for a start cell of a title menu;
  a field for a start cell of an audio selection menu;
  a field for a start cell of a menu used to select sub-picture information, the sub-picture information being used to present bit mapped information different from the video;
  a field for a start cell for a menu used to select a plurality of programs, when a plurality of programs exist in the memory; and
  a field for a start cell for an angle menu used to select a camera angle, when a plurality of angle views exist in the memory;

a menu cell information table containing table entries for each menu to be displayed, each of said table entries including:

a field indicating whether a menu corresponding to the table entry is a title menu, a program menu, an audio menu, a sub-picture menu, or an angle menu;
  a field indicating a number of selection items;
  a field describing at least a portion of a system clock reference of a start portion of the corresponding menu cell;
  a field describing a start address of the corresponding menu cell; and
  a field describing a number of blocks of the corresponding menu cell;

a data structure for storing information displayed for each menu;

a data structure for storing encoded audio signals; and a data structure for storing said video generated according to claim 1.

15. A memory according to claim 14, wherein the memory is an optical disc.

16. A memory containing data structures for storing video generated according to claim 1, audio signals, and file management information, comprising:

a data structure for storing file management information, including:
  a file management table storing address and size information of information in the memory;
  a sequence information table storing information describing an order in which cells are reproduced, a cell being a unit of information, the sequence information table including a table entry for each sequence, each table entry including:
    a field storing whether a corresponding sequence is a completion-type sequence which terminates after being reproduced, a head of a connection-type sequence which is part of sequences which are sequentially reproduced, a mid of a connection-type sequence, and an end of a connection-type sequence;
    a field storing a number of cells in the corresponding sequence;
    a field storing a reproduction time of the corresponding sequence; and
    a field storing a sequence which is reproduced after the corresponding sequence;
  a cell information table storing information describing cells, the cell information table including a table entry for each cell, each table entry including:
    a field describing a reproduction time of a corresponding cell;
    a field describing at least a portion of a system clock reference of the corresponding cell
    a field describing an address of the corresponding cell; and
    a field describing a number of logical blocks of the corresponding cell;

a data structure for storing encoded audio signals; and a data structure for storing said video generated according to claim 1.

17. A memory according to claim 16, wherein the memory is an optical disc.

18. A memory containing data structures for storing video generated according to claim 1, audio signals, and descriptive information including timing information, comprising:

a data structure containing descriptive information, including:
  a field for storing a system clock reference of the descriptive information data structure;

a field for storing a start time of a corresponding video picture which is decoded without reference to other pictures;

a field for storing a time stamp of audio information having a reproduction start time immediately before the reproduction start time of said corresponding video picture;

a field for storing an address of said audio information, a first bit indicating whether the audio information is located before or after the description information data structure; and a field describing addresses of other descriptive information data structures occurring both before and after said descriptive information data structure;

a data structure for storing encoded audio signals; and a data structure for storing said video generated according to claim 1.

19. A memory according to claim 18, wherein the memory is an optical disc.

20. A memory containing data structures for storing video generated according to claim 1, audio signals, and sub-picture information, comprising:

a data structure stored in said memory for storing a sub-picture unit, including:

a field for storing a sub-picture unit header;

a field for storing a bit mapped image; and a field for storing a display control table including a plurality of table entries, each of said table entries including:

a sub-field which stores a display start time of the bit-mapped image;

a sub-field which stores an address of a subsequent table entry; and a sub-field for storing at least one display control command selected from a group of commands which include a commands indicating a display area, pixel color, pixel contrast, and color and contrast changes of the pixels which occur as video frames are displayed;

a data structure for storing encoded audio signals; and a data structure for storing said video generated according to claim 1.

21. A memory according to claim 20, wherein the sub-picture unit data structure comprises a plurality of packs containing information in the sub-picture unit data structure.

22. A memory according to claim 21, wherein the memory is an optical disc.

23. A system for processing video signals included in video frames to determine characteristics of video frames, comprising:

means for obtaining video signals included in plural video frames;

means for assigning plural quantization levels to a first plurality of said plural frames of the video signals;

means for pre-encoding each video frame in said first plurality of said plural video frames using said quantization levels to obtain plural bit-rates corresponding to each of said plural quantization levels;

means for determining said plural bit-rates for each of said plural quantization levels for each video frame in said first plurality of said plural video frames generated by said means for pre-encoding; and means for encoding a second plurality of said plural video frames after determining said plural bit-rates for each video frame in said first plurality of said plural frames.

24. The system of claim 23, wherein said means for obtaining comprises:

means for obtaining said video signals from a video camera.

25. The system of claim 23, further comprising:

means for storing the determined bit-rates.

26. The system of claim 23, wherein said means for assigning comprises:

means for assigning said plural quantization levels uniformly across each of said plural video frames.

27. The system of claim 23, wherein said means for assigning comprises:

means for assigning two quantization levels across each of said plural frames in a checkerboard pattern.

28. The system of claim 23, wherein said means for assigning comprises:

means for assigning four quantization levels, $q_1$, $q_2$, $q_3$, $q_4$, uniformly across each of said plural frames such that a first quantization level of each row, j, is $q_{j \bmod 4}$.

29. The system of claim 23, further comprising:

means for determining a target number of bits for said second plurality of said plural video frames; and means for assigning a first set of quantization levels for each frame in said second plurality of said plural video frames using said target number of bits and the plural determined bit-rates.

30. The system of claim 29, further comprising:

means for encoding one video frame of said second plurality of said plural video frames into an encoded video frame with a resultant number of bits;

means for estimating an encoded number of bits for a succeeding video frame; and means for adjusting the first set of quantization levels for said succeeding video frame based on said target number of bits, said bit-rates and the estimated encoded number of bits for succeeding video frame and the resultant number of bits of said one of said second plurality of frames.

31. The system of claim 29, wherein the means for determining a target number of bits comprises:

means for determining the target number of bits automatically.

32. The system of claim 29, wherein the means for determining a target number of bits comprises:

means for determining the target number of bits through user-intervention.

33. The system of claim 29, wherein the means for assigning further comprises:

means for assigning said first set of quantization levels based on an activity measure of plural macroblocks of corresponding video frames.

34. The system of claim 23, wherein the means for assigning comprises:

means for assigning plural quantization levels to a majority of said plural video frames.

35. The system of claim 23, wherein the means for assigning comprises:

means for assigning plural quantization levels to all of said plural video frames.

* * * * *